US012350824B2

(12) United States Patent
Brogardh et al.

(10) Patent No.: US 12,350,824 B2
(45) Date of Patent: *Jul. 8, 2025

(54) PARALLEL-KINEMATIC MACHINE WITH VERSATILE TOOL ORIENTATION

(71) Applicant: COGNIBOTICS AB, Lund (SE)

(72) Inventors: Torgny Brogardh, Molndal (SE); Klas Nilsson, Lund (SE); Adam Nilsson, Brooklyn, NY (US); Mattias Svahn, Dalby (SE); Edvin Malm, Malmö (SE); Carlos Sedglach, Malmö (SE)

(73) Assignee: COGNIBOTICS AB, Lund (SE)

( * ) Notice: Subject to any disclaimer, the term of this patent is extended or adjusted under 35 U.S.C. 154(b) by 113 days.

This patent is subject to a terminal disclaimer.

(21) Appl. No.: 18/215,660

(22) Filed: Jun. 28, 2023

(65) Prior Publication Data

US 2023/0339099 A1 Oct. 26, 2023

Related U.S. Application Data

(63) Continuation-in-part of application No. 17/753,054, filed as application No. PCT/EP2020/072999 on Aug. 17, 2020, now Pat. No. 11,731,265.

(Continued)

(30) Foreign Application Priority Data

Aug. 19, 2019 (EP) .................................. 19192225

(51) Int. Cl.
  *B25J 9/16* (2006.01)
  *B25J 9/00* (2006.01)
  *B25J 9/10* (2006.01)

(52) U.S. Cl.
  CPC .......... *B25J 9/0036* (2013.01); *B25J 9/0033* (2013.01); *B25J 9/0042* (2013.01); *B25J 9/106* (2013.01);

(Continued)

(58) Field of Classification Search
  CPC ...... B25J 9/0033; B25J 9/0036; B25J 9/0042; B25J 9/106; B25J 9/1623; B25J 9/1664; G05B 2219/40267; G05B 2219/50162
  See application file for complete search history.

(56) References Cited

U.S. PATENT DOCUMENTS 5,816,105 A    10/1998  Adelstein
6,099,217 A  *  8/2000  Wiegand ................ B23Q 17/22
                                                       901/41

(Continued)

FOREIGN PATENT DOCUMENTS

CN     1715008 A     1/2006
CN   101712151 A     5/2010

(Continued)

OTHER PUBLICATIONS

International Search Report on corresponding PCT application (PCT/EP2020/072999) from International Searching Authority (EPO) dated Oct. 26, 2020.

*Primary Examiner* — Dale Moyer

(74) *Attorney, Agent, or Firm* — Shore IP Group, PLLC; Howard J. Klein

(57) ABSTRACT

A parallel kinematic machine (PKM) includes a support platform and first, second, and third support linkages. The first, second, and third support linkages together include at least five support links. The PKM further includes a tool base having a shaft joint, a tool base shaft, and a tool platform. The tool base shaft is connected to the support platform via the shaft joint, rigidly connecting the tool platform and the tool base shaft. The PKM also includes one or more tool linkages, each including a tool link connected at one end, via a tool base joint, to the tool base, and at the other end connected, via a tool carriage joint, to a movable carriage. Each tool linkage is configured to rotate the tool base shaft around at least one axis relative to the support (Continued)

platform by transferring a movement of the respective tool linkage to the tool base shaft.

20 Claims, 36 Drawing Sheets

Related U.S. Application Data

(60) Provisional application No. 63/051,221, filed on Jul. 13, 2020.

(52) U.S. Cl.
CPC ........... *B25J 9/1623* (2013.01); *B25J 9/1664* (2013.01); *G05B 2219/40267* (2013.01); *G05B 2219/50162* (2013.01)

(56) References Cited

U.S. PATENT DOCUMENTS

| | | |
|---|---|---|
| 2003/0053901 A1 | 3/2003 | Roy et al. |
| 2004/0037663 A1* | 2/2004 | Zarske ................ B23Q 1/5462 409/201 |
| 2004/0052628 A1 | 3/2004 | Thurneysen et al. |
| 2005/0129495 A1* | 6/2005 | Brogardh ............... B25J 9/0072 414/680 |
| 2007/0248428 A1 | 10/2007 | Ota |
| 2007/0255453 A1 | 11/2007 | Brogardh |
| 2017/0108098 A1 | 4/2017 | Abdallah et al. |
| 2020/0370274 A1 | 11/2020 | Nilsson |

FOREIGN PATENT DOCUMENTS

| | | |
|---|---|---|
| CN | 103302510 A | 9/2013 |
| CN | 107081760 A | 8/2017 |
| JP | 2000112649 B | 4/2000 |
| WO | 03106115 A1 | 12/2003 |
| WO | 2005120780 A1 | 12/2005 |
| WO | 2011060315 A2 | 5/2011 |
| WO | 2020234138 A1 | 11/2020 |

* cited by examiner

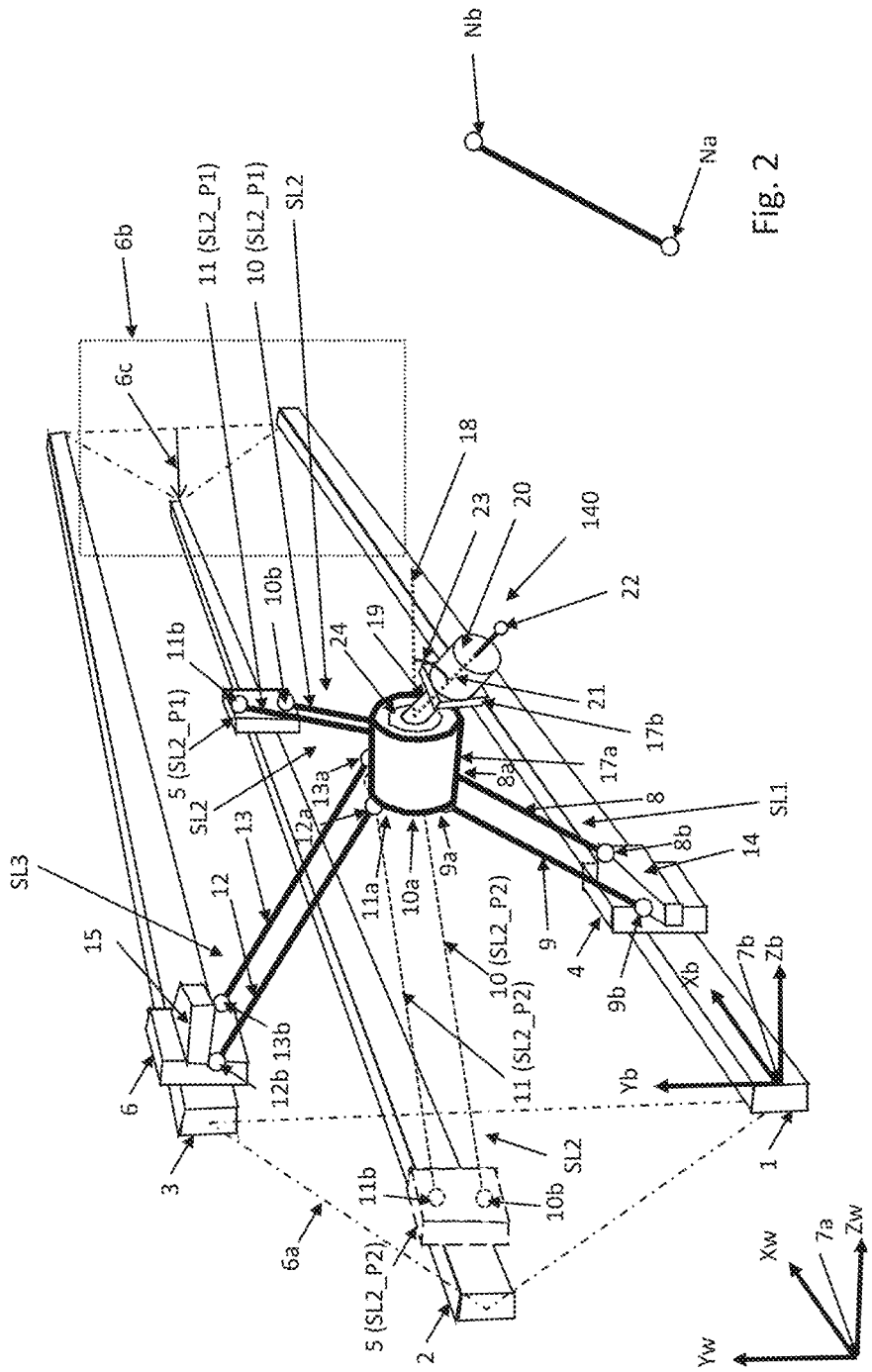

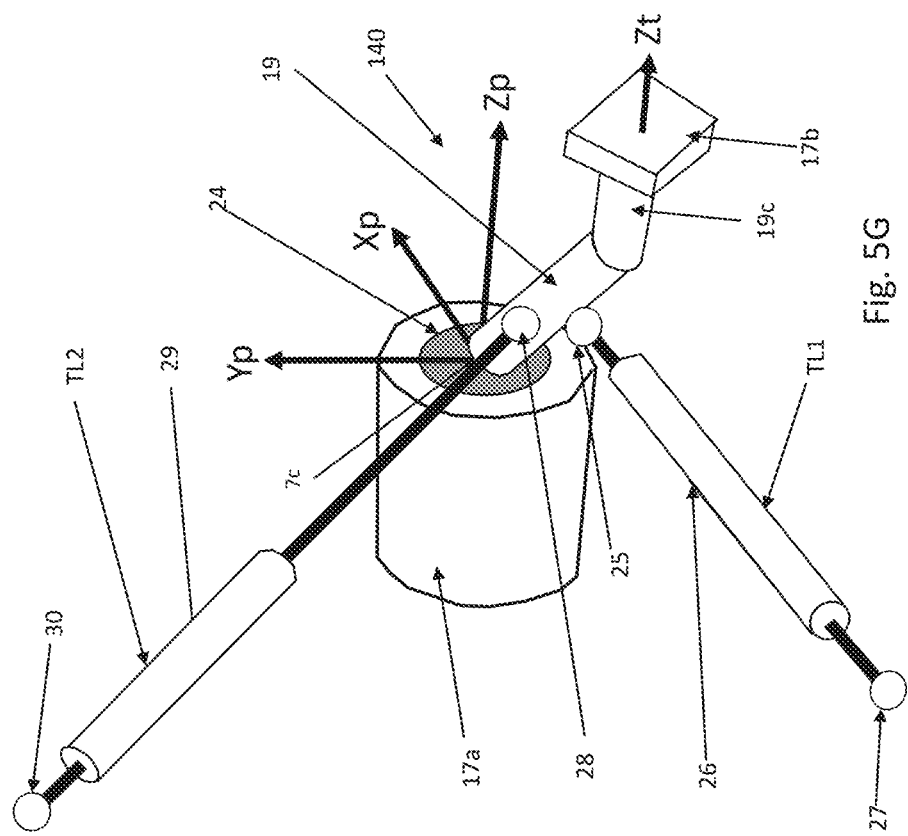
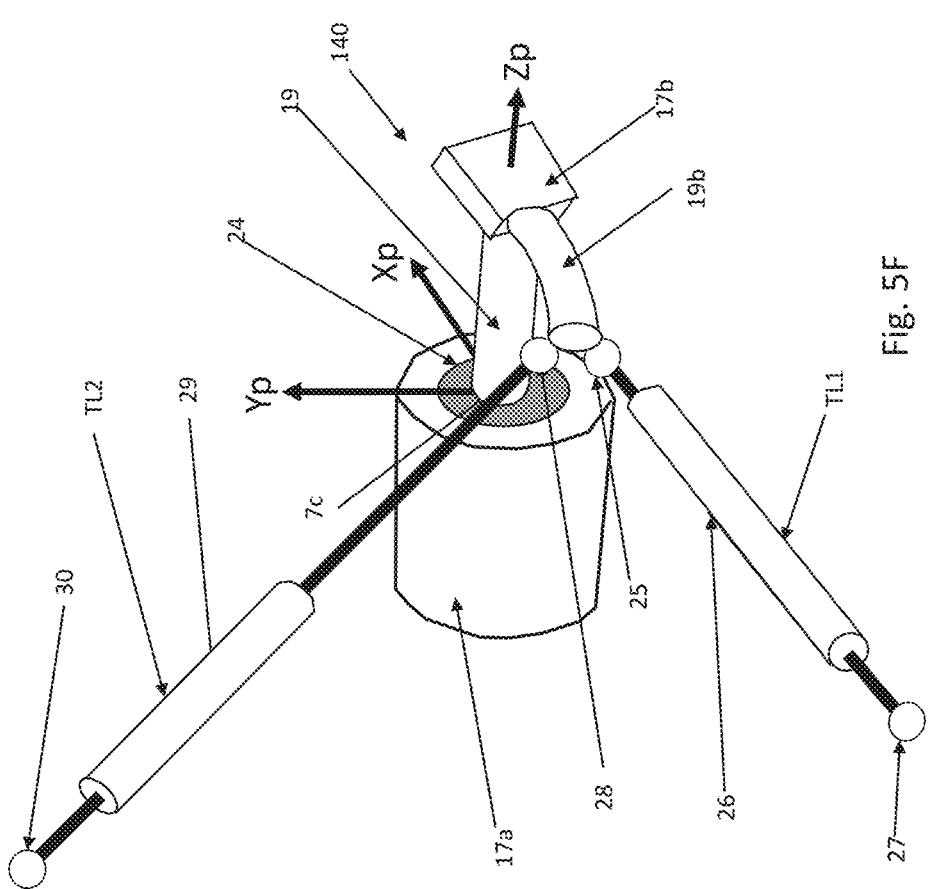

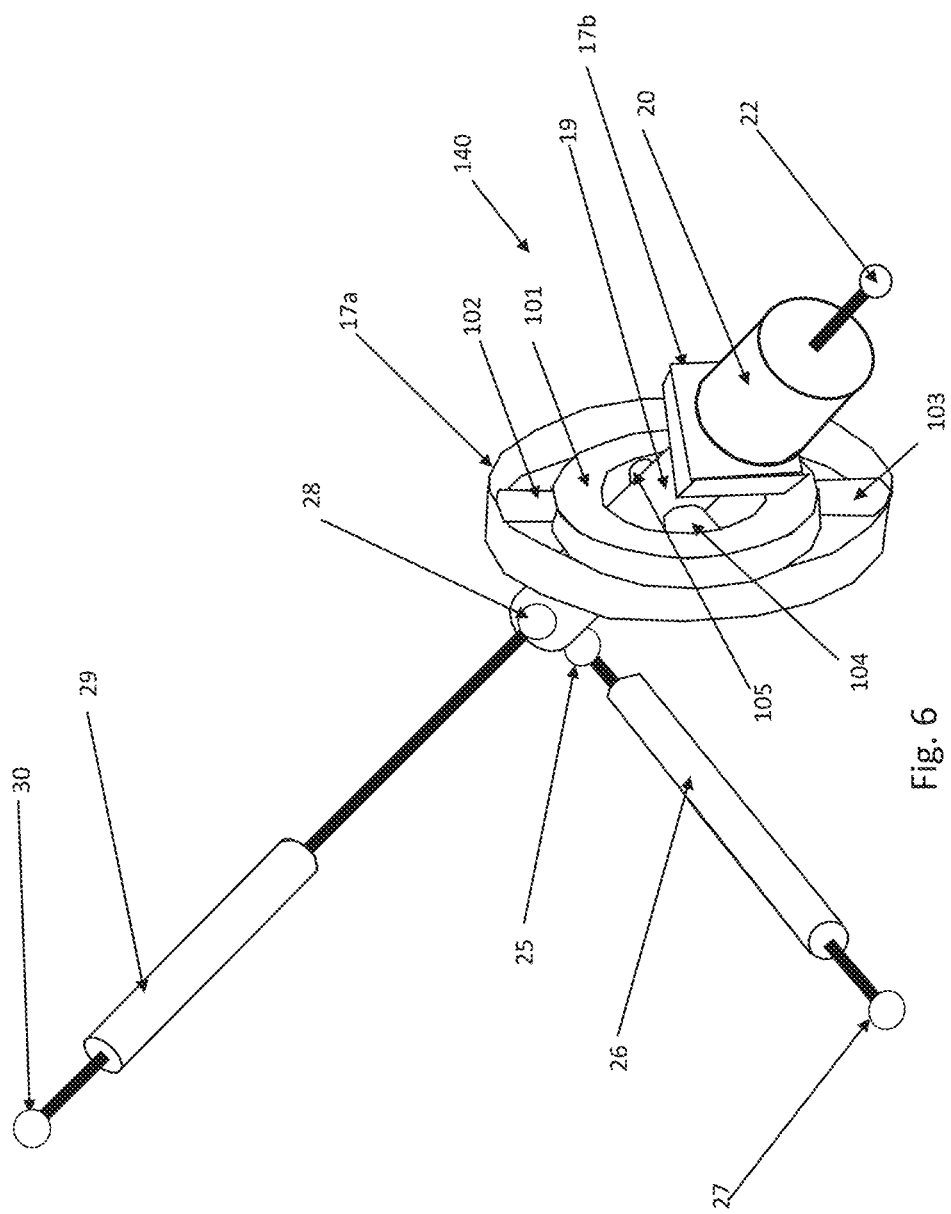

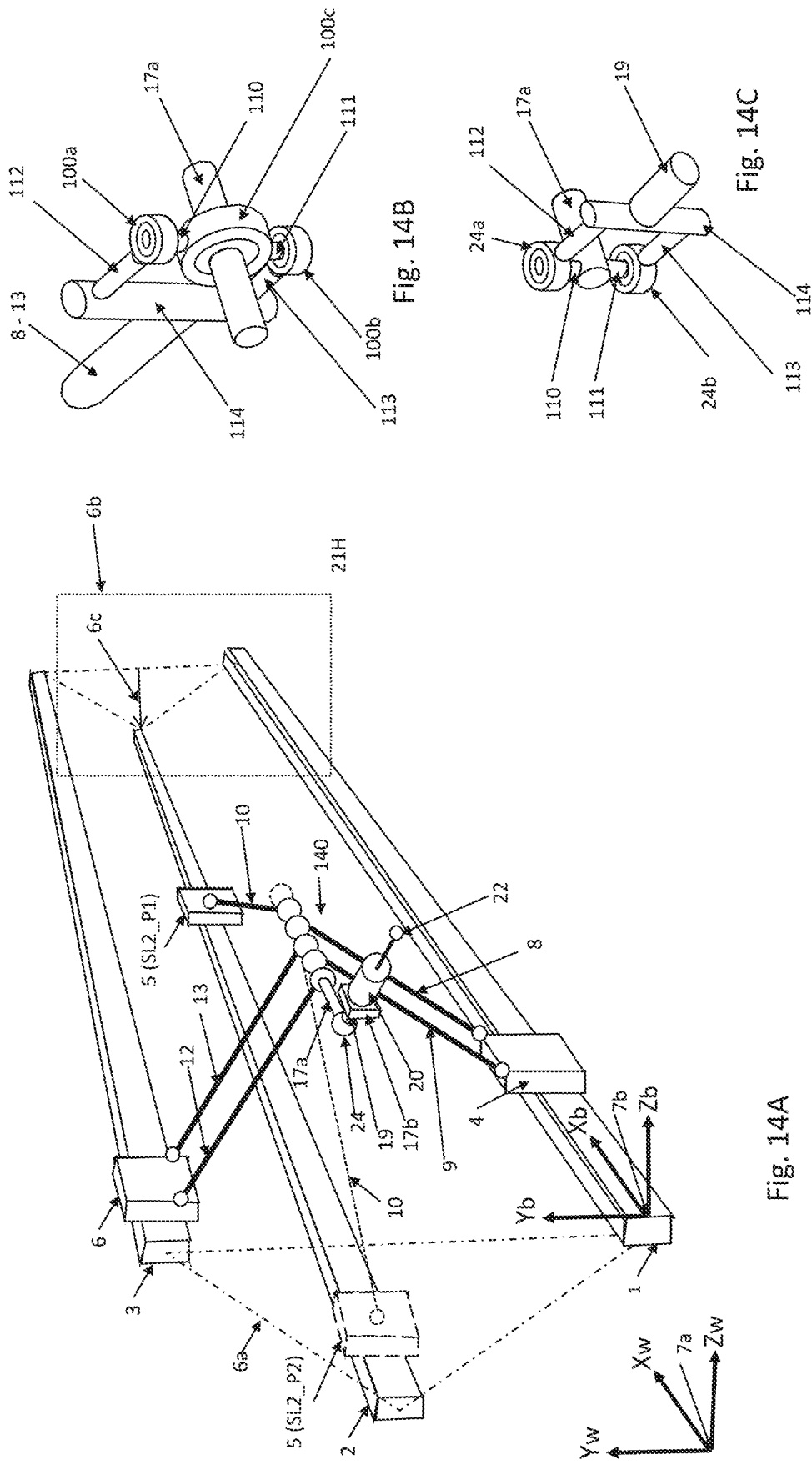

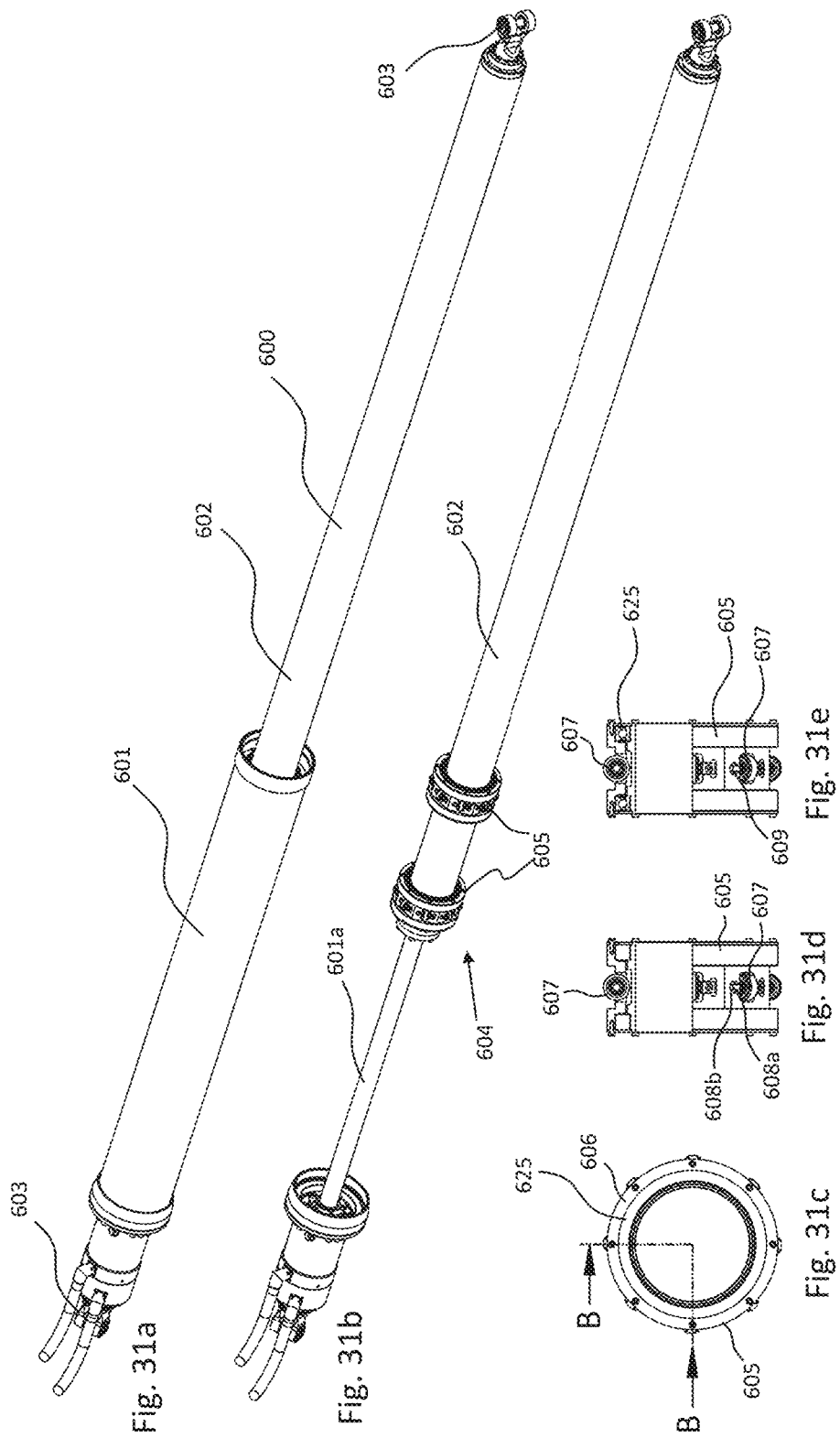

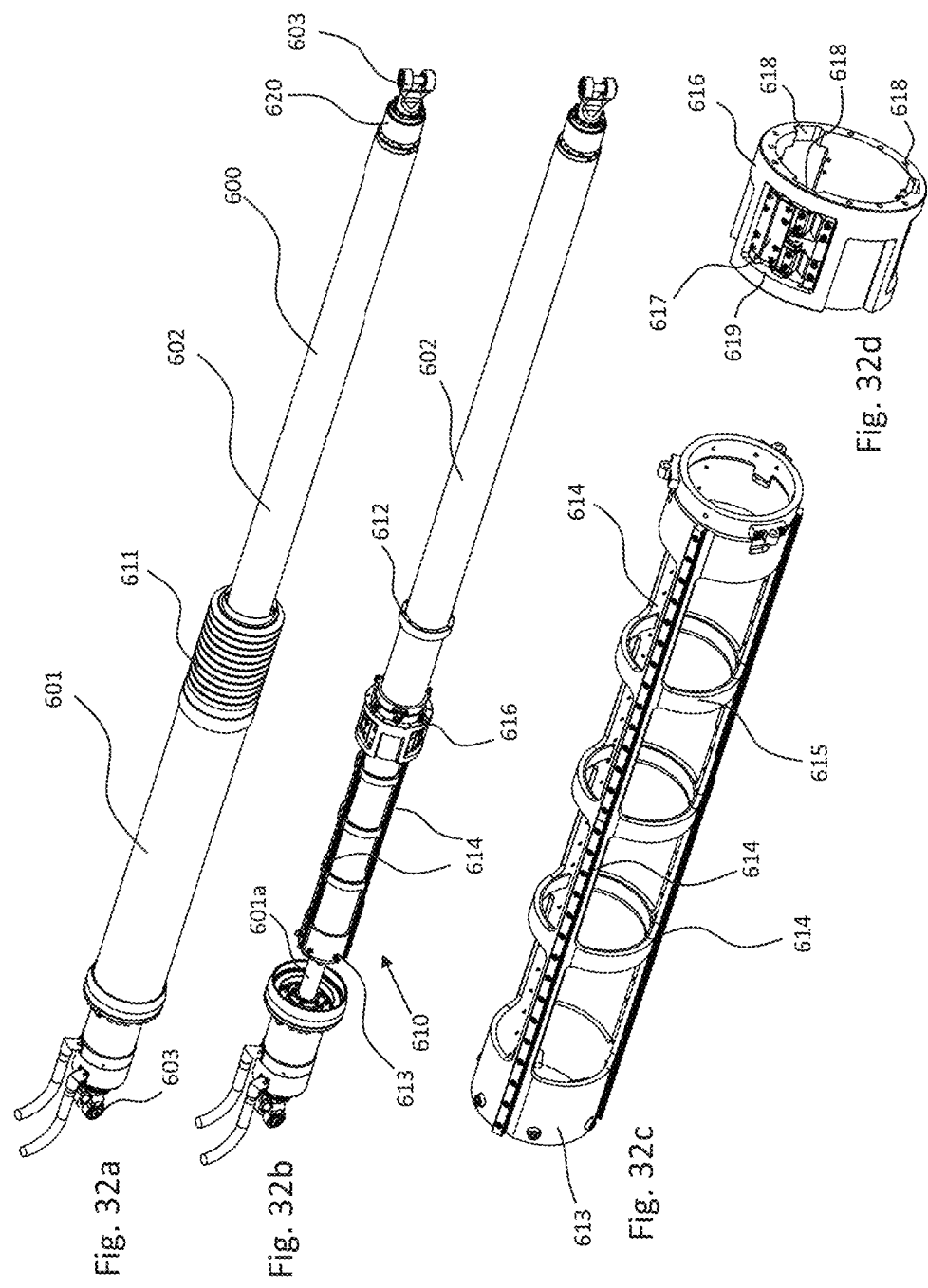

PARALLEL-KINEMATIC MACHINE WITH VERSATILE TOOL ORIENTATION

CROSS-REFERENCE TO RELATED APPLICATIONS

This application is a Continuation-in-Part of co-pending U.S. application Ser. No. 17/753,054, filed Feb. 16, 2022, which is the US national phase of International Application No. PCT/EP2020/072999, filed Aug. 17, 2020, which claims the benefit and priority of U.S. Provisional Application No. 63/051,221. The subject matter of all the aforesaid applications is incorporated herein by reference in the entireties.

TECHNICAL FIELD AND BACKGROUND

The present disclosure relates to the technical field of parallel kinematic machines, and in particular to parallel kinematic machines with the capability to orientate a tool.

There is a growing need for flexible manipulators that can be scaled up to work with high precision on very large objects like aerospace components and long vehicles. The manipulator concepts used today are based on serial kinematics, meaning very heavy manipulators that are monolithic and not adapted for modularization and flexibility. The weight of these manipulators increases with requirements on high tool forces and high stiffness as in processes such as friction stir welding, milling and drilling. The solutions used today with very heavy serial kinematics manipulators for these processes lead not only to high machine- and installation cost but also to severe limitations in speed, acceleration and controllability. For many years parallel kinematics has been studied as a solution to these problems and some promising concepts are summarized in the paper "The Linear Delta: Developments and Applications" by Mohamed Buouri, EPFL, Lausanne, presented at ISR2010. However, no linear delta has so far succeeded to meet the application requirements. One reason is that the only way to obtain large tilting angles of the tool carried by the platform is to use a separate wrist mounted on the platform. Such a wrist will add significant weight, especially in applications requiring large tool forces as in material removal and friction stir welding. Moreover, such wrists will reduce the stiffness because it means serial kinematics connected in series with the parallel kinematics of the linear delta structure.

WO 2005/120780 describes a five degrees of freedom (DOF) linear parallel kinematic manipulator with a tilting platform. Linear actuators are mounted in two or three of the six parallel kinematic links between carriages and the platform. By changing the lengths of these links, it is possible to tilt the platform carrying the tool. However, the stiffness of the manipulator will be too much reduced if the tool is tilted more than +/−25 degrees. In many applications, as for example friction stir welding, it is necessary to obtain tilt angles of up to 45 degrees and therefore another parallel kinematic concept is desired.

Another concept is described in "Adaptive Control of the Hexaglide, a 6 dof Parallel Manipulator" by M Honegger et al, published in proceedings from Robotics and Automation conference in 1997. This concept, using six linear actuators with one link between each actuator carriage and the platform, targets six DOF parallel kinematics control of a platform with tooling mainly for milling applications. However, also with this solution the tilting angles will be too small and moreover it is a very expensive concept with six linear guideways.

Document CN107081760A describes a six-degree-of-freedom (6DOF) mechanical arm based on two translational parallel mechanisms. The arm comprises a machine base, an arm main body and two 3DOF translation parallel mechanisms arranged on the machine base. The arm main body comprises a near end moving platform and a far end moving platform, a push rod and a tail end actuator. Each moving platform is connected to the machine base by a translational parallel mechanism with six links. One end of the push rod is rotatably connected with a first rotational joint to the near end moving platform, and the other end of the push rod penetrates through the far end moving platform. The push rod and the far end moving platform are connected through a far end kinematic pair including one linear joint and one second rotational joint. The near end and far end moving platforms move parallel in relation to each other and by changing the distance between the first rotational joint and the second rotational joint the push rod will slide in the linear joint and the $6^{th}$ DOF is obtained. The sliding movement of the push rod relative to the second rotational joint is used to control the tail end actuator. In this way it is described how a gripper can be opened and closed by a link arrangement and an end effector can be rotated by a screw arrangement. The main problem of this mechanical arm with respect to stiffness is the way the push rod is connected to the links of the far end moving platform. These links are at first connected to the far end moving platform with rotational joints and then via the far end moving platform connected to the push rod via at first a rotational joint and then a linear joint. Connecting joints in series will drastically reduce the stiffness and the linear joint makes it impossible for the far end moving platform to take care of axial forces in the push rod. Thus, while the described dual PKM solution can be useful for some handling application, for instance if it desirable to have all motors at the machine base, the design of CN107081760A is not useful for process applications such as machining or frictions stir welding where accuracy is needed despite high forces being exerted on the end-effector. Moreover, the workspace of the mechanical arm according to CN107081760A is very small in relation to the volume of the mechanical arm structure and the mechanical arm will be very expensive with 6 linear actuators at the machine base, 12 links, 26 rotational joints and 1 linear joint. Yet another reason for seeking an alternative, in the context of this disclosure, is that the mechanical arm in CN107081760A cannot work with fewer components even if for example only 5 DOF is needed, which due to rotational-symmetric tooling is the most common case in process applications.

SUMMARY

It is thus an object of the disclosure to alleviate at least some of the drawbacks with the prior art. It is a further object of the disclosure to provide a parallel kinematic machine, PKM, that has high stiffness for a large working range. It is a further object to provide a PKM that has high tool accessibility. It is a still further object to provide a PKM that also has a low weight.

These objects and others are at least partly achieved with the parallel kinematic machine according to the independent claim, and by the embodiments of the dependent claims.

According to a first aspect, the disclosure relates to a parallel kinematic machine, PKM, comprising a support platform, a first support linkage, a second support linkage and a third support linkage. The first support linkage comprises one or more support links, each connected at one end to the support platform via a first support joint, and at the other end connected to a first carriage via a first carriage joint. The first carriage is movable along a first path, and the first support linkage is arranged to transfer a first movement to the support platform. The second support linkage comprises one or more support links, each connected at one end to the support platform via a second support joint, and at the other end connected to a second carriage via a second carriage joint. The second carriage is movable along a second path, and the second support linkage is arranged to transfer a second movement to the support platform. The third support linkage comprising one or more support links, each connected at one end to the support platform via a third support joint, and at the other end connected to a third carriage via a third carriage joint. The third carriage is movable along a third path, and the third support linkage is arranged to transfer a third movement to the support platform. The first support linkage, the second support linkage and the third support linkage together comprise at least five support links. The PKM further comprises a tool base comprising a shaft joint, a tool base shaft and a tool platform, wherein the tool base shaft is connected to the support platform via the shaft joint, and wherein the tool platform and the tool base shaft are rigidly connected. The PKM comprises one or more tool linkages, each comprising a tool link connected at one end via a tool base joint to the tool base, and at the other end connected via a tool carriage joint to a carriage arranged for movement along a path. Each tool linkage is configured to rotate the tool base shaft around at least one axis relative to the support platform, by transferring a movement of the respective tool linkage to the tool base shaft.

The PKM provides high tool accessibility together with high stiffness, by mounting a shaft joint to the support platform and connecting one or more tool linkages that can move the tool base shaft connected to the shaft joint such that a tool connected to the tool platform is oriented in relation to the support platform. Thus, large parallel kinematics tool tilting is achieved. Moreover, the forces and torques on the tool will be favorably transformed and distributed into forces in the tool linkages and the support links in such a way that the PKM will obtain a high stiffness. For example, forces perpendicular to the tool will efficiently be captured by the tool linkages, reducing the torques on the support platform and thereby reducing the forces in the support links. Forces in the tool direction will be taken care of by the support platform and will thus not affect the tool linkages. The PKM has a low weight as no actuator for tilting located at the support platform is needed. Instead, the tilting is controlled with linkages that have a comparable low weight. The tool platform and the tool base shaft are further rigidly connected, whereby the stiffness of the tool platform is enhanced.

According to some embodiments, the tool platform and the tool base shaft are rigidly connected such that the tool platform follows every movement of the tool base shaft. Thereby the tool platform can be efficiently controlled in two to three DOF by the movements of the tool linkages.

According to some embodiments, the tool platform is arranged for attaching an end effector onto the tool platform. Thus, the tool platform provides a base for a tool, and when attached to the tool platform the tool will follow the movement of the tool platform.

According to some embodiments, at least one of the one or more tool linkages is configured to have a controllable, variable length. In this way the tool platform orientation can be accurately controlled without having any bulky wrist actuator located on the tool platform. This is especially important when the tool is subjected to high forces and/or torques in applications such as friction stir welding and machining.

According to some embodiments, the one or more tool linkages comprises a first tool linkage comprising a first tool link connected via a first tool carriage joint to one of the first, second and third carriages, or to a fourth carriage being different from the first, second and third carriages, wherein the first tool linkage is configured to rotate the tool base shaft around a first axis relative the support platform, by transferring a movement of the first tool linkage to the tool base shaft. In the case of having a separate fourth carriage connected to a tool link, a constant tool link length can be used, and no actuator is needed to be mounted on the tool link. As a result, even lower moving mass is obtained for the PKM without having any bulky wrist actuator located on the tool platform. This advantage needs to be balanced with the disadvantage that the length of the path needs to be increased to make room for the extra carriage.

According to some embodiments, the one or more tool linkages comprises a second tool linkage comprising a second tool link connected via a second tool carriage joint to a carriage arranged for movement along a path different from the path of the first tool linkage, wherein the second tool linkage is configured to rotate the tool base shaft around a second axis relative the support platform, the second axis being non-parallel with the first axis, by additionally transferring a movement of the second tool linkage to the tool base shaft. In this way the tool platform can be oriented in two DOF with low moving mass without having any bulky wrist actuator located on the tool platform. Two DOF is the most common requirement in robot installations, where the tool is subjected to high forces and/or torques.

According to some embodiments, the second tool linkage is connected via the second tool carriage joint to one of the first, second and third carriages, or to a fifth carriage being different from the first, second third and fourth carriages. In the case of having two separate carriages, each connected to a tool link, a constant tool link length can be used for two DOF control of the tool platform giving low moving mass without having any bulky wrist actuator located on the tool platform.

According to some embodiments, the first tool linkage is connected via the first tool carriage joint to the first carriage, or to the fourth carriage being movable along the first path. The second tool linkage is connected via the second tool carriage joint to the third carriage, or to a fifth carriage being movable along the third path. The second path is arranged between the first path and the third path. Thereby a large working range of the tool platform may be achieved, and a high stiffness.

According to some embodiments, each tool linkage includes only one tool link and where each tool link is mounted on a different carriage.

According to some embodiments, the one or more tool linkages are mounted to the tool base and in relation to the tool base shaft such that a symmetrical working range is obtained with respect to the orientation of the tool platform. Thereby a large symmetric working space is obtained.

According to some embodiments, the tool base joint of each tool linkage is rigidly connected to a shaft of the tool base. Thereby the stiffness of the tool platform may be enhanced.

According to some embodiments, the tool base joint of each tool linkage is rigidly connected to the tool base shaft directly or via the tool platform. Thereby the stiffness of the tool platform may be still further enhanced.

According to some embodiments, a distance between each tool base joint and the shaft joint is constant when the orientation of the tool base shaft is manipulated. This is a consequence of having each tool base joint rigidly connected to the tool base shaft directly or via the tool platform that gives a high stiffness. Thus, the distance between each tool base joint and the shaft joint does not vary when the tool base shaft is manipulated.

According to some embodiments, each of the tool links is connected to the tool base shaft via rotational bearings. For example may spherical bearings, cylindrical bearings, roller bearings be used. Thus, no linear bearing is needed to connect the tool links to the tool base shaft, whereby an increased working space may be achieved.

According to some embodiments, the one or more of the first support linkage, the second support linkage, and the third support linkage, comprises two parallel support links. In this way it is possible to obtain movements of the support platform in such a way that its orientation will be constant. This makes it possible to obtain a larger symmetrical rotation range of the tool platform. It will also make it possible to optimize the stiffness of the PKM, since the angle between the tool base shaft and the support platform will be well defined in the whole workspace, which makes it easier to optimize the placements of the joints on the support platform.

According to some embodiments, the two parallel support links have the same length. This will further increase the possibility to obtain optimal support platform movements with respect to the tool platform rotation range and stiffness.

According to some embodiments, the PKM is configured to move the tool base shaft in four, five or six DOF. Six DOF will be important in applications where a non-symmetric tool is used for full manipulation, for example in assembly applications. Five DOF is advantageous for higher stiffness and lower cost in application with rotationally symmetric tools, such as grinding applications. As for CNC machines, some material removal (such as milling) is more efficiently performed with a four-DOF machine. By using controlled mechanical locking of these three DOF, the configuration can be changed by the controller, for instance to automatically optimize the accomplished tool stiffness.

According to some embodiments, the tool base comprises an actuator configured to operate a tool, wherein the actuator is attached to the tool platform. The tool platform is an interface structure between the tool and the PKM. In applications, where the tool needs to be rotated or vibrated or moved in other ways (processing movements) in relation to the tool platform, a process actuator is needed. This actuator will be mounted on the tool platform in order to generate the processing movements simultaneously with the controlled position and orientation of the tool platform as controlled by the PKM.

According to some embodiments, the shaft joint has two degrees of freedom, DOF. In most applications the tool needs to be oriented in two DOF and then the most efficient solution is to use a two DOF shaft joint and two tool linkages.

According to some embodiments, the first support linkage, the second support linkage and the third support linkage are configured to constrain movement of the support platform in at least five degrees of freedom, DOF. Simulations have shown that it will not be possible to obtain high tool platform stiffness if the support platform is constrained in less than five DOF. In the case of constraining five DOF of the support platform, the not constrained DOF is used for tool platform orientation control, which has the advantage that the total number of PKM links will be reduced by one. This needs to be traded against a lower maximum tool platform stiffness.

According to some embodiments, the first support linkage, the second support linkage and the third support linkage are configured to move of the support platform in at least three DOF. In most applications, it is an advantage to control the position of the tool platform in three DOF, which makes it necessary to control the position of the support platform in three DOF.

According to some embodiments, the shaft joint comprises a cardan joint. The shaft joint is critical with respect to the stiffness of the tool platform and it must be very stiff with respect to forces and torques delivered by the tool base shaft to the shaft joint. Therefore, bearings or bushings with high stiffness may be needed in the shaft joint, meaning large bearing surfaces and a cardan joint is well suited to integrate large bearing surfaces into the joint structure. The cardan joint is also well suited for integrating transmission assemblies into its structure.

According to some embodiments, the tool base comprises a shaft joint transmission assembly connecting the tool base shaft and the support platform, wherein the shaft joint transmission assembly is arranged to increase orientation range of the tool base shaft. This will make it possible to increase the orientation working range of the tool platform. The stiffness of the tool platform will at least be high enough for many material removal applications. Moreover, the light weight moving structure will make it suitable for very fast processes as laser cutting, deburring of aluminum and water jet cutting and, in these applications, the somewhat possible lower stiffness is acceptable.

According to some embodiments, the shaft joint transmission assembly comprises a gearing mechanism comprising a first support arm, a first mechanism bearing and a second mechanism bearing connected by the first support arm. The shaft joint transmission assembly further comprises a first mechanism shaft defining a proximal axis of rotation. The first mechanism bearing is mounted to the first mechanism shaft. The first mechanism shaft and the support platform are rigidly connected. The shaft joint transmission assembly further comprises a second mechanism shaft defining a distal axis of rotation. The second mechanism bearing is mounted to the second mechanism shaft. The shaft joint transmission assembly further comprises a gearing linkage connecting the first mechanism shaft to the second mechanism shaft. The gearing linkage comprises: a first bearing joint, a second bearing joint and a mechanism link. The mechanism link is connected to the support platform via the first bearing joint and connected to the second mechanism shaft via the second bearing joint. The first bearing joint and the second bearing joint are arranged at different sides of a plane defined by the proximal axis of rotation and the distal axis of rotation. The gearing mechanism is arranged to transfer rotation of the first support arm around the proximal axis of rotation to a correspondingly increased rotational movement around the distal axis of rotation in a same direction as the first support arm, of the tool base shaft. Thus, a gearing linkage may be used to increase rotational movement of the tool base shaft in a versatile way.

According to some embodiments, the gearing mechanism includes a third mechanism shaft defining another distal axis of rotation, and a third mechanism bearing. The third mechanism shaft is connected via the third mechanism bearing to the first support arm. The first support arm is supplemented with a second support arm. The third mechanism bearing is mounted on the first support arm and the second mechanism bearing is mounted on the second support arm. The second support arm is mounted on either the first support arm or on the third mechanism shaft. At least one link connects the first support arm directly, or via the third mechanism bearing and the third mechanism shaft, with the second mechanism shaft. Thus, the rotational movement of the tool base shaft may be still further increased.

According to some embodiments, the shaft joint defines a first proximal axis of rotation and a second proximal axis of rotation that is perpendicular to the first proximal axis of rotation. The shaft joint transmission assembly comprises a first distal shaft defining a first distal axis of rotation, a second distal shaft defining a second distal axis of rotation being perpendicular to the first distal axis of rotation. The tool base shaft is arranged to rotate with movement of the first distal shaft around the first distal axis of rotation and with movement of the second distal shaft around the second distal axis of rotation. The shaft joint transmission assembly further comprises a first support arm pivotally connecting the shaft joint with the first distal shaft and the second distal shaft, a first gearing linkage connected between the shaft joint and the first distal shaft and arranged to transfer rotation of the first support arm around the first proximal axis of rotation to a correspondingly increased rotational movement of the tool base shaft around the first distal axis of rotation. The shaft joint transmission assembly further comprises a second gearing linkage connected between the shaft joint and the second distal shaft arranged to transfer rotation of the first support arm around the second proximal axis of rotation to a correspondingly increased rotational movement of the tool base shaft around the second distal axis of rotation. The achieved increased rotational movements are beneficial for workpiece reachability in many industrial applications such as welding, grinding and milling.

According to some embodiments, each of the first gearing linkage and the second gearing linkage comprises a pair of a first mechanism joint and a second mechanism joint, a mechanism link and a mechanism lever. The mechanism link is connected at each end to one of the first mechanism joint and the second mechanism joint. The first mechanism joint is connected to the shaft joint at a distance from the first proximal axis of rotation, and the second mechanism joint is connected to the first distal shaft or the second distal shaft via the mechanism lever. The first mechanism joint and the second mechanism joint of each pair are arranged at different sides of a plane defined by the first distal axis of rotation and the first proximal axis of rotation, or a plane defined by the second distal axis of rotation and the second proximal axis of rotation, respectively. The shaft joint transmission assembly as connected between the tool links and the tool platform will significantly increase the orientation range of the tool platform with a minimum of components, making it possible to obtain a high stiffness transmission as needed for high precision and high tool force applications as machining, drilling and grinding.

According to some embodiments, the shaft joint transmission assembly comprises a backhoe mechanism or gearing wheels. These mechanical solutions to increase the orientation range of the tool platform can be made in a compact way and can be used to further increase the orientation range of the tool platform According to some embodiments, the tool base comprises a bracket assembly pivotally connected to the support platform via two shafts to pivot around a first rotational axis and wherein the backhoe mechanism or gearing wheels are pivotally connected to the bracket assembly via an input shaft to pivot around a second rotational axis, wherein the first rotational axis is perpendicular to the second rotational axis. In this way a compact shaft joint transmission assembly with high stiffness can be obtained for 2 DOF large tool rotation. Moreover, it is possible to connect two tool linkages to one input lever of the shaft joint transmission assembly, which is favorable when needing high stiffness in the whole workspace. This solution makes it possible to obtain +/90 degrees tool rotation at high stiffness and high accuracy, which is often needed in applications as milling and grinding.

According to some embodiments, the one or more tool linkages are connected to the input shaft via the respective tool base joint and one or more lever shafts. This gives flexibility in design, especially when stiffness needs to be adapted to different parts of the workspace and when simple exchange of shaft joint transmission assemblies for different applications is needed. From stiffness point of view the best solution is to connect the tool linkages to the same input lever shaft, but this is not always possible to obtain the flexibility needed by the applications.

According to some embodiments, each tool base joint and tool carriage joint of the one or more tool linkages has at least two DOF. When these joints are implemented as two DOF cardan joints, very high joint stiffness and rotation capabilities can be obtained.

According to some embodiments, each tool base joint and/or each tool carriage joint of the one or more tool linkages has three DOF. In order to reduce the size of these joints, ball-and-socket joints or rod ends can be used. The smaller size of these joints must be traded against the larger rotation capabilities possible to obtain for a cardan joint.

According to some embodiments, the one or more tool linkages comprises a third tool linkage comprising a third tool link, wherein the third tool linkage is configured to rotate the tool base shaft around a third axis being non-parallel with the first and second axes, by additionally transferring a movement of the third tool linkage to the tool base shaft. In this way it is possible to rotate the tool platform in three DOF. This is needed for non-symmetrical tools or in applications where tool rotation is needed for increased accessibility.

According to some embodiments, the third tool linkage is connected via a third tool carriage joint to one of the first, second and third carriages, or to a sixth carriage being different from the first, second and third carriages. This makes it possible to rotate the tool platform in three DOF with minimum PKM moving mass (arm inertia) without having any bulky wrist actuator located on the tool platform.

According to some embodiments, the first path, the second path and the third path are parallel paths. Thereby it is possible to implement a PKM which is very long in one direction. This is very important for processing of long objects as components for trains, ships, buildings and airplanes.

According to some embodiments, the tool link of each tool linkage is connected via the tool carriage joint to a carriage arranged for movement along a different one of the first path, the second path and the third path. Thus, the same paths, e.g. guideways, may be used for moving the tool linkages as moving the support linkages and there is no need to arrange more than three guideways at the installation. Thereby the cost of the PKM may be kept down. Further, as the tool linkages are movable with carriages along mutually different paths, the tool platform may be rotated to positions in a large working range with high stiffness. Thus, tool linkages that are arranged to control different rotational degrees of freedoms of a tool arranged to the tool platform, are mounted via carriage joints on different carriages arranged to move along different paths.

According to some embodiments, the PKM comprises a control unit configured to control the rotation of the tool base shaft by controlling the movement of the one or more tool linkages. The control unit is for example a CNC (computer numerical control) or a robot controller. This is needed to fulfill the requirements of the processes with high tool forces and tool torques. High performance control algorithms must be implemented, controlling up to eight actuators based on kinematic and dynamic models of a complex PKM structure.

According to some embodiments, the control unit is configured to control position and orientation of the tool base shaft by additionally controlling one or more of the first movement of the first support linkage, the second movement of the second support linkage and the third movement of the third support linkage. In this way the position of the support platform can be accurately controlled, which is a prerequisite for high performance tool position and orientation control.

According to a second aspect, the disclosure relates to a method for controlling movement of a parallel kinematic machine, PKM. Besides controlling the support linkages, the tool linkages should also be controlled, and in total it is necessary to control all linkages of the PKM using the information of the kinematics and dynamics of the PKM and also the stiffness of all PKM components. In this way precise control of the PKM movements can be obtained also under high tool forces and torques.

According to a third aspect, the disclosure relates to a computer program with instructions to cause the parallel kinematic machine according to the first aspect, to execute the steps of the method according to the second aspect, and to any one of the embodiments of the second aspect as described herein.

According to a fourth aspect, the disclosure relates to a computer-readable memory having stored there on the computer program of the third aspect.

According to a fifth aspect, the disclosure relates to a control unit comprising the computer-readable memory according to the fourth aspect.

BRIEF DESCRIPTION OF THE DRAWINGS

FIG. 1 illustrates a PKM with support linkages and two platforms, according to one example embodiment.

FIG. 2 illustrates a link with a carriage joint at one end and a support platform joint at the other end.

FIG. 5F illustrates an alternative arrangement comprising a support platform, a tool base and two tool linkages, where the tool linkages are mounted to the tool base shaft via an offset element.

FIG. 5G illustrates a still further alternative arrangement comprising a support platform, a tool base and two tool linkages, where the tool base shaft has a bent shape.

FIG. 6 illustrates a tool base according to a first embodiment, giving the possibility to mount the tool base joints on a tool base shaft carrying the tool, and in this case on the opposite side of the tool relative to the support platform.

FIG. 14A illustrates a PKM with support linkages and two platforms, according to another example embodiment with only five support links.

FIG. 14B illustrates a design of a support platform joint according to one embodiment.

FIG. 14C illustrates a shaft joint with one degree of freedom.

FIG. 23b illustrates an alternative design of the tool base in FIG. 23a.

FIG. 31a illustrates a telescoping link according to one embodiment of the disclosure.

FIG. 31b illustrates the telescoping link of FIG. 31a without an outer section.

FIG. 31c is an end view of a roller mechanism shown in FIG. 31b.

FIGS. 31d and 31e are axial views of the roller mechanism shown in FIG. 31c, with section B-B of FIG. 31c removed.

FIG. 32a illustrates a telescoping link according to another embodiment of the disclosure.

FIG. 32b illustrates the telescoping link shown in FIG. 32a without an outer section.

FIG. 32c is a perspective view of a component of the telescoping link shown in FIG. 32b.

FIG. 32d is a perspective view of a linear motion guideway block shown in FIG. 32b.

DETAILED DESCRIPTION

Figure 3:
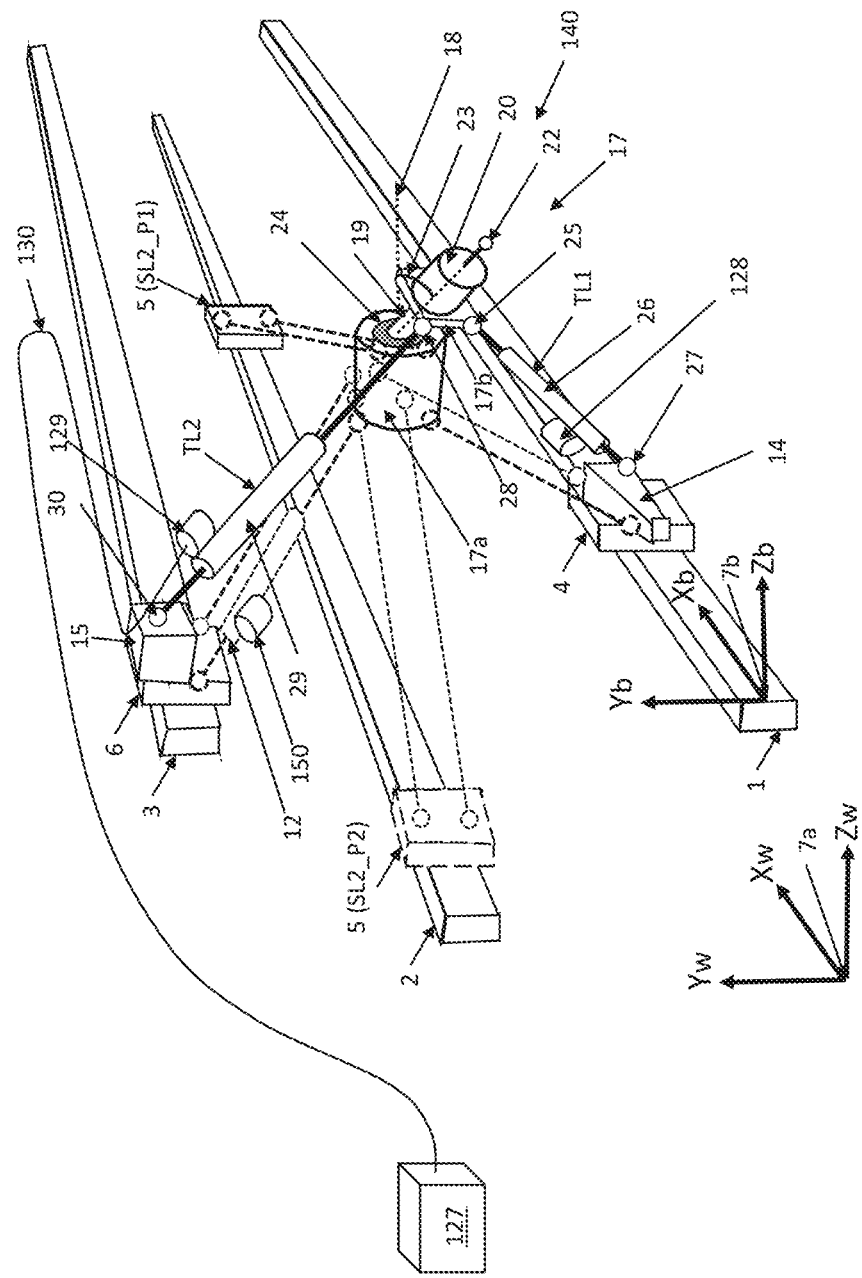
FIG. 3 illustrates a PKM according to an embodiment, comprising two tool linkages mounted between carriages and the tool platform to control the tilting angles of a process actuator attached to the tool platform. The tool linkages are arranged to have a variable length.

In the following, embodiments of a parallel-kinematic machine, PKM, with versatile tool orientation will be explained. Versatility refers to advantages in terms of very high stiffness, lightweight modular manipulator structure, no bulky or heavy CNC wrist needed, very good tool accessibility, and to large tool rotation capabilities. Specifically, for the targeted applications such as machining and friction stir welding, neither standard serial robot arms nor machine tools such as CNC machines provides the desired versatility. This is due to fundamental physical limits as skilled persons have experienced, and hence the following is based on the PKM as the only viable approach.

A PKM is generally a mechanical system that comprises a plurality of linkages that act in parallel to support and move a platform. According to notions in the PKM literature, the end-flange of a PKM arm is referred to as a platform. The end-flange of a standard robot arm is where the tool or end-effector is mounted; end-effectors/tools are in the standard case mounted on the PKM platform.

Since no single PKM structure of the prior art known to the Applicant can be made to fulfill the versatility requirement at reasonable cost, with the stiffness and orientation workspace of the tool being the main deficiencies, it could be an alternative to enhancing the linkage structure of a single PKM by combining two (or more) PKMs such that orientation results from relative positions. However, prior art such as CN107081760A (based on double Deltas) and US2003/0053901 (based on double tri-pods) show complexity without the required versatility. A set of PKMs in parallel is also a PKM, but typically at higher cost and complexity.

The PKM disclosed herein takes a radically new approach, with a single novel PKM having dual platforms that are stiffly connected in series, each with mechanical support by different types of linkages dedicated to position stiffness and orientation stiffness, respectively. One platform, being the outer one that forms the actual end-flange from an application point of view, is referred to as a tool platform. The other platform, being the inner one that forms base support for outer large and stiff wrist motions, is referred to as a support platform. These platforms being stiffly connected means that motion in some DOF (typically two rotational DOF) are utilized as part of the kinematic structure whereas the other DOF (typically four DOF) are rigidly connected. How to arrange and actuate these utilized (to the PKM internal) DOF for industrial applicability is part of the present invention.

The support platform pose is accomplished by means of support linkages that are attached between base path motions and the support platform. The support linkages are mainly configured to position the support platform in target positions. Since the base path motions can be arbitrarily long, the resulting workspace can be made very large. The links of the PKM can be made in a lightweight material, such that the moving structure of the PKM can be made lightweight and thus can move the tool very fast with high acceleration.

The tool platform is connected to the support platform via a shaft joint and a tool base shaft in series. One, two or three tool linkages are arranged to rotate the tool base shaft and the thereto rigidly connected tool platform such that the target tool pose is accomplished. Each tool linkage comprises a tool link with a joint at each end. The tool links are typically very rigid with respect to axial forces. The tool linkages may also, in some implementations, include actuation equipment, such as, for example, motor-driven ball screws. In combination with the arrangement of the shaft joint, this provides for the desired high orientation stiffness.

In total, this dual-platform arrangement with dedicated linkages forms a manipulator that is outstanding in applications with high forces and/or torques on the tool, as it provides the desired high stiffness to the PKM, also for the tool orientation.

In contrast to CN107081760A, in the present disclosure, the tail end actuator (for example a milling spindle or a grinding tool) is to be mounted on a tool platform, there is no far end moving platform, no rotational joint and no linear joint between a far end moving platform and a push rod. In some embodiments, for very high stiffness of the tool platform, the tool platform is directly connected to rotational joints on the tool links (1-3 tool links for 4-6 DOF manipulation) that control the orientation of the tool platform. When large tool rotation is needed, a gearing transmission (e.g., a shaft joint transmission assembly) is mounted between the tool platform and the links that control the orientation.

Besides very high stiffness, the PKM of the present invention has a very large workspace, which can be infinite in one direction and it can be adapted to the number of DOF needed in the application. In the very high stiffness embodiments, only 3 linear actuators on the machine base plus one optional actuator for each tool rotational DOF, only 6 links plus one optional link for each tool rotational DOF, 13 rotational joints plus two optional rotational joints for each tool rotational DOF and no linear joint are needed.

The same references are used for the same features in all figures and will not be repeated where already mentioned.

It will furthermore be understood that although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure.

FIG. 1 illustrates a PKM comprising support linkages, namely a first support linkage SL1, a second support linkage SL2, and a third support linkage SL3. The PKM also comprises a support platform 17a and a tool base 140. This PKM in FIG. 1 is part of the PKMs in at least some embodiments of the disclosure.

The PKM in FIG. 1 is configured to be actuated by means of carriages 4, 5, 6 movable along paths 1, 2, 3 by means of actuation equipment, such as motors driving the carriages by rack-and-pinion transmissions configured to propel a carriage along a path. Such actuators are for example illustrated in FIG. 4. Thus, a first carriage 4 is configured to be moved on, thus along, a first path 1, a second carriage 5 is configured to be moved on, thus along, a second path 2, and a third carriage 6 is configured to be moved on, thus along, a third path 3. A path is for example a guideway. The path is typically linear but may instead have a curved shape, as used in some handling robots. For applications needing high stiffness manipulation, motor driven ball screws, rack- and pinion or direct drive solutions may preferably be used to move the carriages along the paths. In case of more carriages, the PKM comprises actuators for moving also these carriages along the paths, see e.g. FIG. 4. In FIG. 1, the paths are mounted on a framework, not shown in the figure, in such a way that the three linear paths are parallel. Hence, in some embodiments, the first path 1, the second path 2 and the third path 3 are parallel paths. One path (here the second path 2) is arranged between the two other paths (here first path 1 and third path 3). The paths 1, 2, 3 are defined in a base coordinate system 7b. This coordinate system has its Xb-axis parallel with the paths 1-3, and the Zb-axis is perpendicular to the plane defined by the first path 1 and third path 3. In FIG. 1 the axes of the base coordinate system 7b are parallel with corresponding axes of the world coordinate system 7a. However, depending on the installation- and application requirements, the paths can be mounted in different ways, for example with the base coordinate system rotated around the Zw- or Xw-axes of the world coordinate system 7a. The second path 2 is in the figure mounted at a negative Zb-value 6c, making it possible to obtain a workspace 6b reaching all the way to the plane defined by the first path 1 and the third path 3 (at low Zb-values). The second carriage 5 is illustrated in two different positions SL2_P1 and SL2_P2, showing two different assembly configurations of the machine. Generally, it is possible to obtain higher stiffness when the second carriage 5 is in the assembly configuration illustrated with position SL2_P1 than in SL2_P2, but then the paths need to be longer for the same workspace in the Xb-direction. For very long work objects as airplane fuselages and wings, trains, wind power blades, building components etc., the difference in path length will however not be that important and in these applications the carriage assembly configuration should be as illustrated with the second carriage 5 as in the position SL2_P1, where the second carriage 5 is on the opposite side of the tool base 140 in the Xb-direction than the first and third carriages 4 and 6. When using the assembly configuration according to position SL2_P2 the distance 6c, thus the offset of the second path 2 in the minus Zb-direction, must be large enough to obtain high stiffness. In the assembly configuration according to position SL2_P1 it is possible to mount the second path 2 with lower values of the distance 6c and it is also possible to have the distance 6c in the minus Zb direction to be zero. In this case the workspace 6b of the PKM, which is parallel with the YbZb-plane, will not be useful at low Zb-values because of high link forces and therefore low stiffness. However, it will be easier to implement the framework for the paths when all paths are in the same plane. Also, the framework for mounting linear actuators will be simpler and it will even be possible to mount the paths directly on a wall or fixed to the ceiling.

Each of the support linkages SL1, SL2, SL3 is connected between one of the mentioned carriages 4, 5, 6 and the support platform 17a. The first support linkage SL1 may comprise one or more support links. In this example embodiment it comprises two support links 8, 9, thus a first support link 8 and a second support link 9. Each of the support links 8, 9 is connected at one end to the support platform 17a via a first support joint 8a, 9a, and at the other end to a first carriage 4 via a first carriage joint 8b, 9b. Thus, the first support link 8 is connected at one end to the support platform 17a via a first support joint 8a, and at the other end to the first carriage 4 via a first carriage joint 8b. The second support link 9 is connected at one end to the support platform 17a via another first support joint 9a, and at the other end to the first carriage 4 via another first carriage joint 9b. As mentioned, the first carriage 4 is movable along the first path 1, and the first support linkage SL1 is arranged to transfer a first movement to the support platform 17a. The second support linkage SL2 may comprise one or more support links, in the illustrated example it comprises two support links 10, 11, thus a third support link 10 and a fourth support link 11. Each of the support links 10, 11 is connected at one end to the support platform 17a via a second support joint 10a, 11a, and at the other end connected to a second carriage 5 via a second carriage joint 10b, 11b. Thus, the third support link 10 is connected at one end to the support platform 17a via a second support joint 10a, and at the other end to the first carriage 4 via a second carriage joint 10b. The fourth support link 11 is connected at one end to the support platform 17a via another second support joint 11a, and at the other end to the first carriage 4 via another second carriage joint 11b. The second carriage 5 is movable along the second path 2. The second support linkage SL2 is arranged to transfer a second movement to the support platform 17a. The third support linkage SL3 may comprise one or more support links, in the illustrated example two support links 12, 13, thus a fifth support link 12 and a sixth support link 13. Each support link 12, 13 is connected at one end to the support platform 17a via a third support joint 12a, 13a, and at the other end connected to a third carriage 6 via a third carriage joint 12b, 13b. Thus, the fifth support link 12 is connected at one end to the support platform 17a via a third support joint 12a, and at the other end to the first carriage 4 via a third carriage joint 12b. The sixth support link 13 is connected at one end to the support platform 17a via another third support joint 13a, and at the other end to the first carriage 4 via another third carriage joint 13b. As mentioned, the third carriage 5 is movable along the third path 3, and the third support linkage SL3 is arranged to transfer a third movement to the support platform 17a. Thus, when a carriage is moved, it induces a movement to the link or links that are connected to the carriage. The movement of the links changes the position of the support platform 17a. Thus, by controlling movement of the carriages, the support platform 17a may be positioned in any position in the workspace of the PKM. In the embodiment in FIG. 1, the first support linkage SL1, the second support linkage SL2 and the third support linkage SL3 together comprise six support links 8, 9, 10, 11, 12, 13. However, in other embodiments, the number of support links may be four or five. A movement of link that is transferred to the support platform 17a may also be in induced by a linear actuator, as will be explained in the following.

The first carriage 4 includes a first mechanical interface 14. The third carriage 6 includes a second mechanical interface 15. A purpose of these interfaces is to adapt the carriage-mounting of the carriage joints 8b, 9b, 12b, 13b for the support links 8, 9, 12, 13 of the first support linkage SL1 and the third support linkage SL3 to an optimal mounting of the support joints 8a, 9a, 12a, 13a on the support platform 17a. This is made under the requirements that for each carriage the thereto connected two links of a support linkage SL1, SL3 should be parallel and have the same length. Thus, one or more of the first support linkage SL1, the second support linkage SL2 and the third support linkage SL3 comprises two parallel support links. The two parallel support links have essentially equal lengths. Although not illustrated, also the second carriage 5 may be provided with a mechanical interface, and the same requirement is then applicable also for the thereto connected second support linkage SL2. Linear bearings (for example roller bearings running on steel guideways) between the carriages 4, 5, 6 and the paths 1, 2, 3 can be made very stiff, whereby it is generally no problem, in view of stiffness requirements, to introduce offsets, between the carriage joints (including also tool carriage joints as will be explained in the following) and a standard mechanical carriage mounting interface. Instead, it is typically more important to adopt optimal mounting positions of the support joints on the support platform 17a.

The support platform 17a comprises a body where to the support joints 8a, 9a, 12a, 13a can be mounted. The body may be made of a rigid, lightweight material. The body may be solid or hollow. The body here has a shape of a cylinder but may alternatively have other primitive shapes such as a sphere, cuboid etc., or other shapes such as customized shapes.

The tool base 140 in FIG. 1 further comprises a shaft joint 24, a tool base shaft 19 and a tool platform 17b. The shaft joint 24 is arranged to the support platform 17a, for example directly mounted to the support platform 17a. The shaft joint 24 may be seen as having two parts that are movable in relation to each other. The support platform 17a is arranged to have one of the parts of the shaft joint 24 mounted to the support platform 17a. Thus, the one part of the shaft joint 24 is (rigidly) mounted to the support platform 17a. In other words, the shaft joint 24 is rigidly connected to the support platform 17a. Hence, the shaft joint 24 and the support platform 17a are rigidly connected, e.g. mounted. This also means that the support platform 17a is rigidly connected, e.g. mounted, to the shaft joint 24. The tool base shaft 19 is connected, for example mounted or otherwise rigidly connected, at one end to the other part of the shaft joint 24. Thus, the other part of the shaft joint 24 is mounted to the tool base shaft 19. Hence, the tool base shaft 19 is connected to the support platform 17a via the shaft joint 24. The tool base shaft 19 is connected at its other end to the tool platform 17b. More in detail, the tool platform 17b is rigidly connected to the tool base shaft 19. This of course also means that the tool base shaft 19 is rigidly connected to the tool platform 17b. The tool base shaft 19 is rigidly connected to the tool platform 17b, thus, the tool platform 17b is rigidly connected to the tool base shaft 19, such that the tool platform 17b follows every movement of the tool base shaft 19. Hence, the tool platform 17b and the tool base shaft 19 are rigidly connected. The tool platform 17b may be rigidly connected to the tool base shaft 19 in alternative ways. For example, the tool platform 17b may be rigidly mounted (e.g. directly) to the tool base shaft 19, for example by means of a welding or a screw joint. The tool platform 17b may alternatively be milled together with the tool base shaft to form one solid element together with the tool base shaft 19. Thus, the tool platform 17b and the tool base shaft 19 is then made in one piece. To be rigidly mounted or made in one piece are subsets of being rigidly connected implies being rigidly connected. Two parts being rigidly connected or rigidly mounted (to each other) means that the mechanical arrangement is such that relative motion between the parts is not physically possible in any (position or orientation) DOF, apart from negligible effects of material elasticity. Thus, there is no relative motion allowed (no relative motion is physically possible) between the tool base shaft 19 and the tool platform 17b. The tool base shaft 19 typically has an elongated shape. The tool base shaft 19 is made of a rigid material. The tool base shaft 19 is for example a rod. The tool platform 17b here comprises a body having a rectangular shape, but the tool platform 17b may have other shapes such as round, oval etc. The tool platform 17b provides an attachment interface between the tool base shaft 19 and an actuator of a tool, e.g. a process actuator. Thus, the tool base shaft 19 is attached to the actuator via the tool platform 17b. The tool base 140 is in some embodiments an assembly of at least the shaft joint 24, the tool base shaft 19 and the tool platform 17b. In some embodiments the tool base 140 comprises an end effector such as a process actuator 20 configured to operate a tool head 22. The process actuator 20 is attached or mounted to the tool platform 17b. Thus, in some embodiments, the tool platform 17b is arranged for attaching an end effector onto the tool platform 17b. Thus, the tool platform 17b provides a base for a tool, and when attached to the tool platform the tool will follow the movement of the tool platform 17b. The process actuator 20 may be detachably arranged to the tool platform 17b, such that it can be manually or automatically attached to the tool platform 17b and thereafter manually or automatically detached from the tool platform 17b. The process actuator 20 in FIG. 1 comprises the tool head 22 arranged at a distal part of the process actuator 20. The process actuator 20 may be a process actuator such as a spindle motor for milling or friction stir welding. The shaft joint 24 may be designed to have one, two or three degrees of freedom, depending on the requirements of the application. The shaft joint 24 makes it possible to change the orientation of the tool 22 in a more versatile way. For example, the shaft joint 24 is a high stiffness cardan joint, exemplified in FIG. 7. Such a two DOF joint makes it possible to tilt the tool base shaft 19 in two directions. The purpose with the shaft joint 24 is to make it possible to obtain any space angle 23 between the center line of the tool base shaft 19 and the line 18, which is parallel with the Zb-axis of the base coordinate system. Thus, the shaft joint 24 is arranged such that the tool base shaft 19 can be moved, that is, tilted, in relation to the support platform 17a. As an alternative to using a high stiffness cardan type shaft joint, a high stiffness ball joint or gimbal joint may be used, if the tool equipment also needs a $3^{rd}$ rotational degree of freedom, see FIG. 5C for an example.

FIG. 2 illustrates one of the six links in FIG. 1. Each link is typically attached (usually via a mechanical interface) to a carriage with a carriage joint Na having two or three DOF and to the support platform 17a with a support platform joint Nb having two or three DOF. In some embodiments, also the support platform joint has three DOF. "N" here represents any of the numbers of the joint references.

In the following it will be described how tool linkages may be attached to the tool base 140 such that the tool base shaft 19 and thus also the tool platform 17b and any thereto attached process actuator 20, can be tilted in relation to the support platform 17a. The tilting and optionally rotation of the tool platform 17b can of course be made by a traditional CNC-machine wrist mounted on the support platform 17a. However, with requirements of high accuracy and large process forces, such a wrist will be very heavy and bulky with low accessibility, and it will not be cost effective. To avoid these big problems, a shaft joint 24 together with a tool base shaft 19 between the support platform 17a and the tool platform 17b have been introduced as already described. Thus, in this disclosure, there is no motor mounted to the support platform 17a, arranged to orient the tool platform 17b.

FIG. 3 illustrates a PKM according to an embodiment of the disclosure. The PKM comprises two tool linkages TL1, TL2 mounted between carriages 4, 6 and the tool platform 17b to control the tilting angles of a process actuator attached to the tool platform 17b. The PKM generally comprises the same features as already described with reference to FIGS. 1-2, with the difference that some of the links of the support linkages are arranged to have a variable length. In this embodiment that has two tool linkages, the PKM is configured to move the tool base shaft 19 in five DOF.

Figure 7:
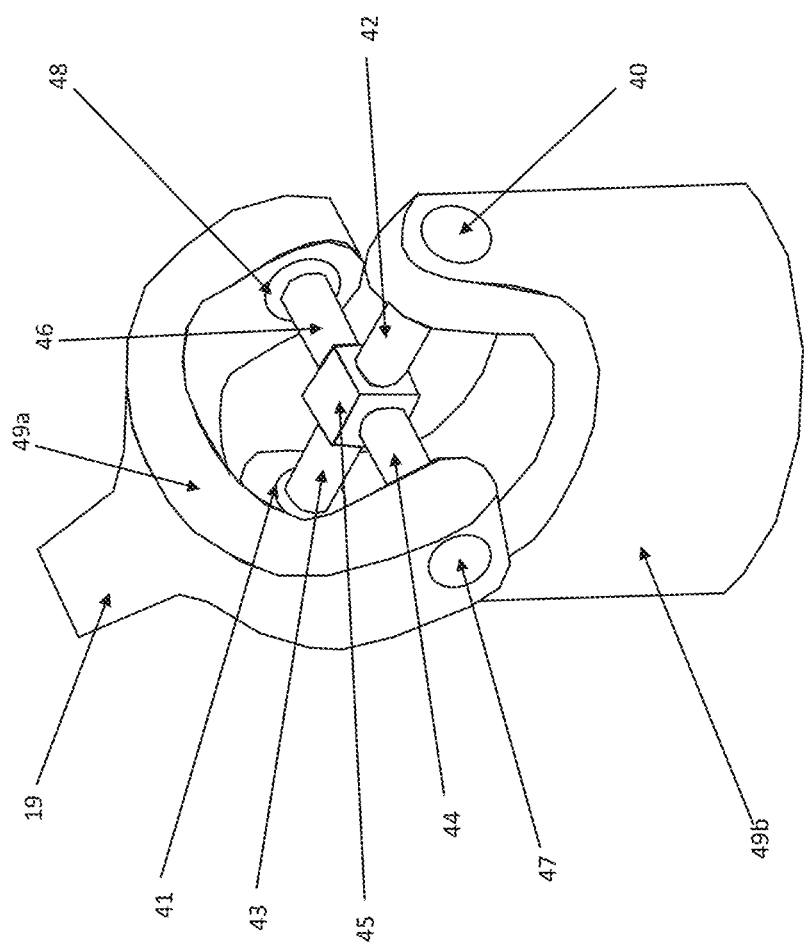
FIG. 7 illustrates one example implementation of the shaft joint.

FIG. 3 illustrates that the tool platform 17b already described in FIG. 1 can be actuated without use of any bulky and heavy actuators on the support platform 17a. Instead, two tool linkages TL1, TL2 have been introduced between two of the carriages (first carriage 4 and third carriage 6) and the tool platform 17b. In more detail, the PKM in FIG. 3 comprises a first tool linkage TL1 comprising a first tool link 26. The first tool link 26 is connected at one end via a first tool base joint 25 to the tool base 140 (in FIG. 3, to the tool platform 17b), and at the other end connected via a first tool carriage joint 27 to the first carriage 1. As mentioned, the PKM also comprises a second tool linkage TL2 comprising a second tool link 29. The second tool link 29 is connected at one end via a second tool base joint 28 to the tool base 140 (in the FIG. 3 to the tool platform 17b), and at the other end connected via a second tool carriage joint 30 to the third carriage 6. The first tool linkage TL1 is configured to rotate the tool base shaft 19 around a first axis relative the support platform 17, by transferring a movement of the first tool linkage TL1 to the tool base shaft 19. The second tool linkage TL2 is configured to rotate the tool base shaft 19 around a second axis relative the support platform 17a, the second axis being non-parallel with the first axis, by additionally transferring a movement of the second tool linkage TL2 to the tool base shaft 19. Thus, each tool linkage TL1, TL2 is configured to rotate the tool base shaft 19 around at least one axis relative to the support platform 17a, by transferring a movement of the respective tool linkage TL1, TL2 to the tool base shaft 19. The shaft joint 24 has two degrees of freedom, DOF. By having two tool linkages as in FIG. 3, it is thus possible to tilt the tool base shaft 19 by rotation around two non-parallel axes relative to the support platform 17a. The directions of these axes are determined by the mounting direction of the axes of the shaft joint. If for example a cardan joint is used with one cardan joint rotation axis parallel with the Xb-axis and one cardan joint rotation axis parallel with the Yb-axis, the tool base shaft 19 will be rotated around axes parallel with the Xb- and Yb-axes. Thus, in this case the first axis should be understood to be at least one axis parallel with the Xb-, Yb- or Zb-axes. The second axis should be understood to be at least one axis being non-parallel with the at least one first axis. However, it is not necessary that any axis of the cardan joint is parallel with the Xb- or Yb-axes. The use of a cardan joint as shown in FIG. 7 is preferable for 2-DOF rotational movement of the tool shaft since the bearings can be made with large bearing surfaces, meaning very high stiffness, both for forces and torques. In the case of 3-DOF rotational movement of the tool shaft, a bearing with its rotation axis coinciding with the center of the tool shaft can be used or alternatively a ball and socket joint or a rod end can be used.

Figure 4:
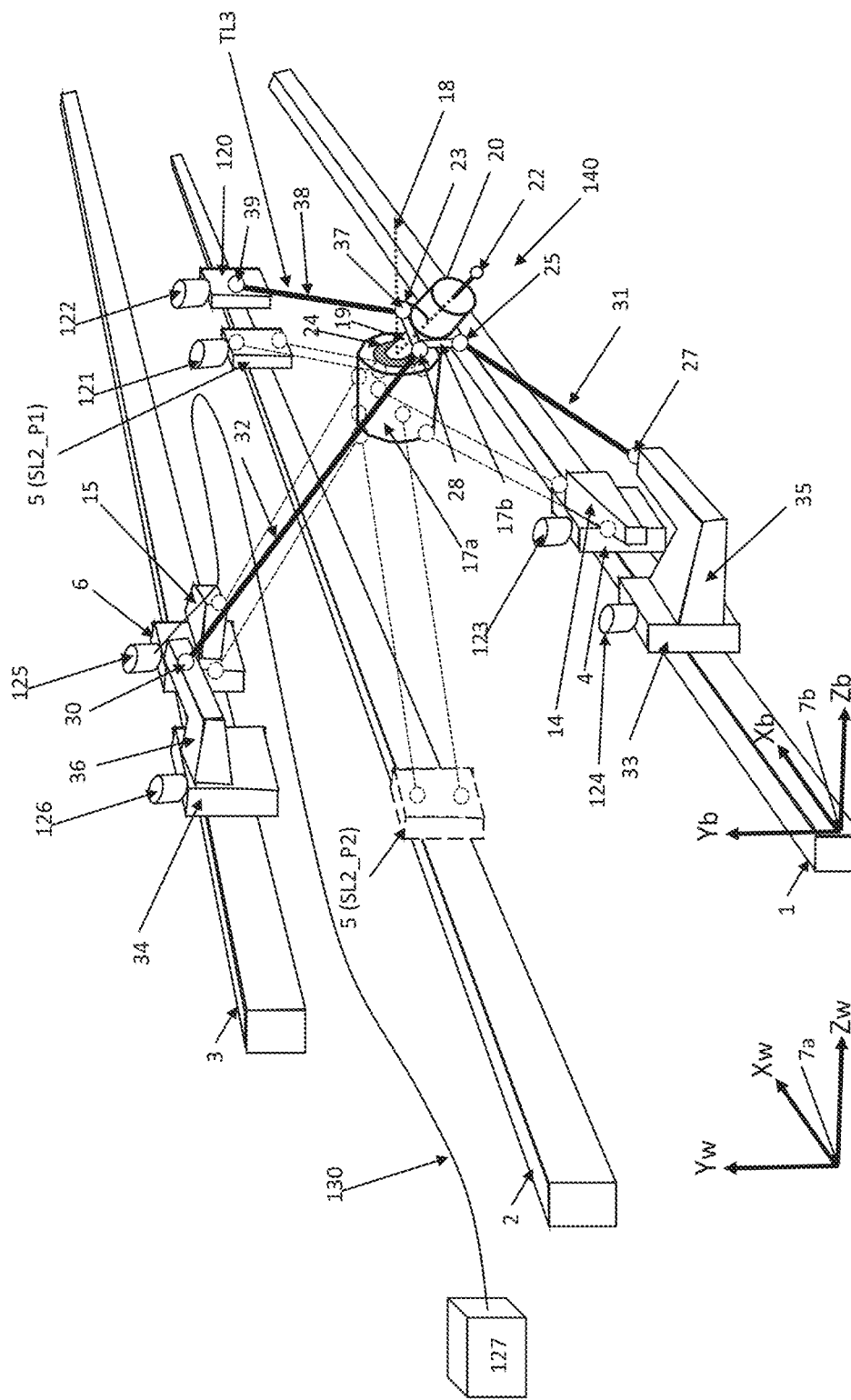
FIG. 4 illustrates a PKM according to an alternative embodiment, where the variable length tool linkages have been exchanged with tool linkages having links with constant lengths.

The illustrated tool linkages TL1, TL2 comprises linear actuators, for example with a telescopic mounting. With such a mounting, the first tool link 26 and the second tool link 29 may be referred to as being telescopic. A telescopic link here means that the link has parts that slide one with another. Thus, a telescopic link may comprise concentric, tubular sections that are designed to slide into one another, and thereby change the length of the link. Hence, each of the two tool linkages TL1, TL2 is configured to have a controllable variable length. A linkage that is configured to have a controllable, variable length, typically comprises at least one link that is arranged with a linear actuator for controlling the length of the at least one link. The linear actuator is configured to change the axial length of the link on a control signal from a control unit. A linear actuator of a tool linkage is typically configured to configure the tilt angle of the tool platform 17b. However, other alternative tool linkages may be used. For example, the tool links may have a static, non-variable length, as illustrated in FIGS. 4 and 5B. The variable length tool links 26, 29 are for example driven by motor driven high stiffness ball- and screw actuators. Such linear actuators control the lengths of the tool links 26, 29 and thus the distances between the first tool base joint 25 and first tool carriage joint 27 of the first tool linkage TL1 and the distance between the second tool base joint 28 and the second tool carriage joint 30 of the second tool linkage TL2. These tool carriage joints 27, 30 should have two DOF and these tool base joints 25, 28 should have three DOF to maintain a non-redundant mechanical system. Generally, when a tool link is arranged to have a variable length (i.e. with ball- and screw actuation), the carriage joint (including tool carriage joints) connecting the tool link to a carriage should have two DOF to make the actuator work, and the tool base joint connecting the tool link to the support platform 17a should then have three DOF, to maintain a non-redundant mechanical system. Thus, in some embodiments, each tool base joint 25, 28, 37 has at least two DOF. In some embodiments, each tool carriage joint 27, 30, 39 of the one or more tool linkages TL1, TL2, TL3 has at least two DOF. In some embodiments, each tool base joint 25, 28, 37 has three DOF. In some embodiments, each tool carriage joint 27, 30, 39 of the one or more tool linkages TL1, TL2, TL3 has three DOF, which is not the case when using variable length links actuated by linear actuators.

By controlling the length(s) of the tool link(s), it is possible to control the space angle 23 between the line 18, which is parallel with the Zb-axis, and the tool base shaft 19. This means that the tool base shaft 19 (connected with the process actuator 20) can be tilted in any direction by rotation around two non-parallel axes and with appropriate mounting of a two DOF shaft joint, these axes will be parallel with the Xb- and Yb-axes of the base coordinate system 7b. In order to obtain a symmetric high stiffness tilting range around the tilting angle zero (with tool base shaft 19 parallel with the Zb-axis of the base coordinate system), it is advantageous to calculate optimal size of the tool platform 17b. Thus, in some embodiments, the tool platform 17b is designed in such a way that the distances from where the tool base shaft 19 is mounted on the tool platform 17b to the tool base joints 25, 28 are tuned (by simulations) for minimum maximum (minmax) force in the tool links 26, 29 over the full range of tilting angles of the tool base shaft 19.

The concept of using tool links with variable lengths between the tool platform 17b and the carriages the tool links are attached to, has the important advantage that the angle between the tool links will be optimal (around 90 degrees) all over the work place of the PKM and consequently the forces and torques on the tool (attached to the tool platform 17b) will be efficiently distributed between the tool links, meaning that high stiffness is maintained. When, for example the lower first carriage 4 is moved in positive Xb-direction, in the figure, the base- and tool platforms 17a, 17b will be moved upwards, second tool linkage TL2 will get more horizontal and first tool linkage TL1 more vertical and it is easy to understand that it is possible to reach a position of the lower first carriage 4, where first tool linkage TL1 is vertical and second tool linkage TL2 horizontal, meaning optimal 90 degrees between first tool linkage TL1 and second tool linkage TL2 for controlling the orientation of the tool.

In FIG. 3, in comparison with FIG. 1, one of the support links 12, 13 has been replaced with a variable length support link 12, and the third support linkage SL3 thus comprises a linear actuator 150, schematically illustrated in FIG. 3. The variable length support link 12 and the linear actuator 150 may have a telescopic mounting. The linear actuator 150 controls the length of the support link 12 and thus the distance between the third carriage joint 12b and the third support joint 12a of the third support linkage SL3. The variable length support link 12 is in this embodiment typically driven by motor driven ball- and screw actuators. By using such linear actuation arrangement for two support links (typically in different support linkages) connected to the support platform 17a, it is possible to also rotate the support platform 17a in 2 DOF to some extent. This will be advantageous in cases when the shaft joint 24 has reached its maximum angle range or when it can increase the accessibility for the process actuator 20.

As understood from the above and below, any of the illustrated tool linkages TL1, TL2, TL3 or third support linkage SL3 may include a linear actuator with a telescopic mounting. Hence, any of the first tool link 26, the second tool link 29, the third tool link 38, and any of the support links may be referred to as being telescopic, hence, being a telescopic link. A telescopic link here means that the link has sections that travel or move one with another. The sections are typically nested inside each other. Each section is slightly smaller than the one before it, allowing them to move in and out smoothly. Thus, a telescopic link may comprise concentric, tubular sections that are designed to move into one another, and thereby change the length of the link. Alternatively, the sections may have rectangular shapes. The sections may be formed by carbon fiber. A telescopic link comprises an actuator for controlling movement of the link. For example, a telescopic link may be hydraulically operated. Hydraulic cylinders may then be located inside the telescopic sections and are responsible for the controlled movement of the link, by extending and retracting the telescopic sections. Alternatively, the telescopic link may incorporate a ball screw. A ball screw comprises a threaded screw shaft and a nut with recirculating ball bearings. The ball screw is typically integrated into the telescopic link structure, with the nut connected to one part of the link and the screw shaft attached to another. As the ball screw rotates, it imparts linear motion to the telescopic link, causing it to extend or retract. A telescopic link may have different designs, and FIGS. 31a-e and FIGS. 32a-f illustrate, respectively, first and second alternative example embodiments of telescopic links comprising a respective movement mechanism for facilitating movement or travelling of the sections in relation to each other. The movement mechanism also keeps the sections apart. Each movement mechanism comprises a spring mechanism to account for manufacturing and assembly errors.

FIGS. 31a-31e illustrate a telescopic link 600 according to one embodiment including a first movement mechanism 604, and different parts of the same. FIG. 31a illustrates the telescopic link 600 itself. The telescopic link 600 comprises several sections including an outer section 601 and an inner section 602, where the inner section 602 is arranged to travel or move inside the outer section 601. FIG. 31b illustrates the telescopic link 600 in FIG. 31a without the outer section 601. The actuator of the link 600 is a ball screw, and a screw shaft 601a of the actuator of the telescopic link 600 is here visible. The first movement mechanism 604 is arranged between the outer section 601 and the inner section 602 and is visible as the outer section 601 has been removed. The first movement mechanism 604 comprises one or more roller mechanisms 605. The one or more roller mechanisms 605 are arranged between the inner section 602 and the outer section 601. The roller mechanisms 605 are here arranged to the inner section 602, but they may alternatively be arranged to the outer section 601. The one or more roller mechanisms 605 facilitate movement of the sections in relation to each other. FIG. 31c illustrates the roller mechanism 605 in FIG. 31b in isolation, from an end view. FIGS. 31d-31e illustrate axial views of the roller mechanism 605 with section B-B in FIG. 31c removed, without (FIG. 31d) and with (FIG. 31e) balls of a revolute joint 625.

Each of the one or more roller mechanisms 605 comprises a tube-shaped holder element 606 including one or more rollers 607. Each roller 607 is positioned on a respective shaft 608a and is accommodated in a respective groove 608b in the outer surface of the tube-shaped holder element 606. The groove 608b has a longitudinal extension in the rotational direction of the tube-shaped holder element 606 matching the shape of the roller 607 and shaft 608a. When the roller 607 and shaft 608a are accommodated in the groove 608b, the shaft 608a is locked from movement in two directions, namely in axial direction and rotational direction. An additional locking with a pin bolt stops movement in the radial direction. The roller 607 is arranged to roll in the axial direction of the tube-shaped holder element 606. When accommodated in the groove 608b, part of the roller 607 stands out from the surface of the tube-shaped holder element 606, to be in contact with the inner surface of the outer section 601. The spring mechanism 609 of the first movement mechanism 604 comprises several springs, for example disc springs. The springs are arranged between the shaft 608a of each roller 607 and the tube-shaped holder element 606, typically in the grooves 608b. Hence, the rollers 607 are preloaded with springs. The tube-shaped holder element 606 fits snuggly to and around the inner section 602. When the outer section 601 is arranged to the telescopic link 600, the inner section 602 can move, i.e., roll, with the rollers 607 against the inside of the outer section 601. The spring mechanism 609 handles a tolerance of the assembly and ensures play free contact to the outer section 601.

The telescopic link 600 may include a first movement mechanism 604 with any number of roller mechanisms 605 for e.g., higher stiffness, more accurate guiding, etc. The telescopic link 600 is connected via joints located at opposite ends of the link, as has been explained herein. In other words, the first tool link 26, the second tool link 29, the third tool link 38, and the support links are connected via respective joints 25, 27, 28, 30, 37, 39, 8a, 8b, 9a, 9b, 10a, 10b, 11a, 11b, 12a, 12b, 13a, 13b, as explained herein. Such a joint may be a cardan joint 603. Due to kinematics of the tool linkages, the relative rotational angle (around a center-line along the link) of the cardan joints 603 at both ends of the link is subject to change during operation of the manipulator. To account for this rotation, a revolute joint 625 may be included. According to some embodiments, such joint being a revolute joint 625 is included in the roller mechanism 605. The roller mechanism 605 in FIGS. 31b-31e includes a revolute joint 625. A revolute joint is a type of joint that that allows rotational movement around a fixed axis. As the screw shaft 601a rotates, the lead screw nut (not shown) moves linearly along the thread. By having such roller mechanism 605 including a revolute joint 625, a reaction torque of the lead screw nut is reacted in the cardan joint 603 at either end of the link. Most practically, the reaction torque of the lead screw nut is reacted in the cardan joint 603 at the end of the link close to the tool platform 17a (if the link is a tool link), as there is cabling in the other end of the link. The roller mechanism 605 in FIGS. 31a-31e comprises eight rollers 607, but the number of rollers 607 may be less or more, for example one, two, three, four, five, six, seven, nine, ten, elven or twelfth rollers 607.

Figure 32E:
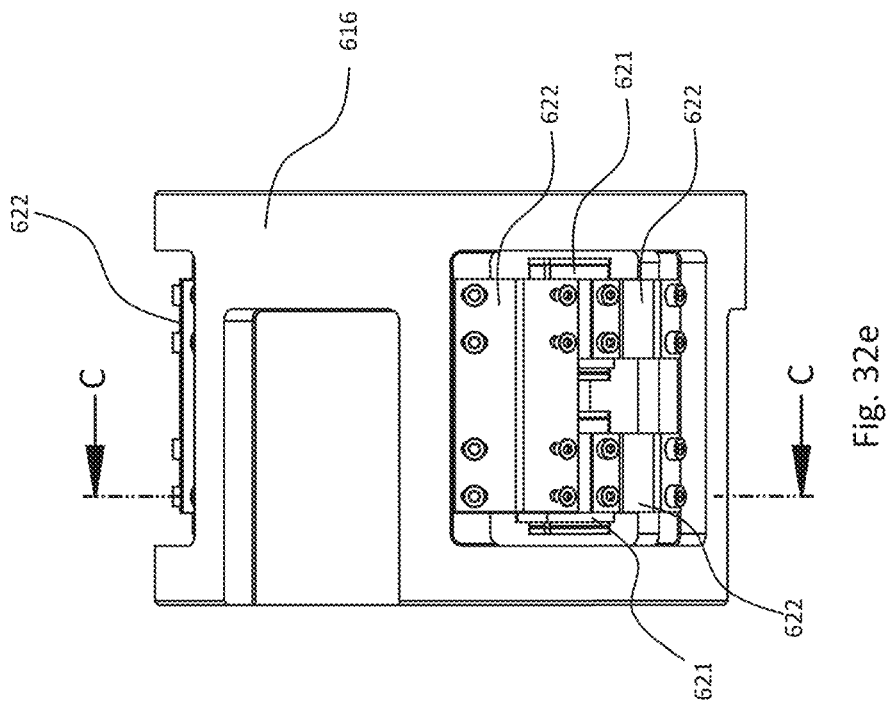
FIG. 32e is a side elevation view of the linear motion guideway block shown in FIG. 32d.

FIGS. 32a-32f illustrate a telescopic link 600 according to another embodiment, including a second movement mechanism 610. FIG. 32a illustrates the telescopic link 600 itself. The telescopic link 600 comprises several sections including an outer section 601 and an inner section 602, where the inner section 602 is arranged to travel or move inside the outer section 601. The second movement mechanism 610 is here also covered by an extendable protection element 611, e.g., a bellow, attached between the outer section 601 and the inner section 602, to protect the second movement mechanism 610. FIG. 32b illustrates the telescopic link 600 in FIG. 32a without the outer section 601 and without the extendable protection element 611. In FIG. 32b, an attachment device 612 in the shape of a circular element is illustrated, which is used for attachment of the extendable protection element 611 to the inner section 602. The telescopic link 600 comprises an actuator being a ball screw, whereof the screw shaft 601a is visible in FIG. 32b. The second movement mechanism 610 is arranged between the outer section 601 and the inner section 602 and is visible as the outer section 601 and extendable protection element 611 have been removed. The second movement mechanism 610 comprises a structure 613 and a linear motion guideway block 616 including one or more linear motion guideways 614. The one or more linear motion guideways 614 includes one or more linear rails included in structure 613 and corresponding carriages 621 arranged in the linear motion guideway block 616. Structure 613 is stationary fixed to the inner section 602. An example of structure 613 is illustrated in FIG. 32c in isolation.

Figure 32F:
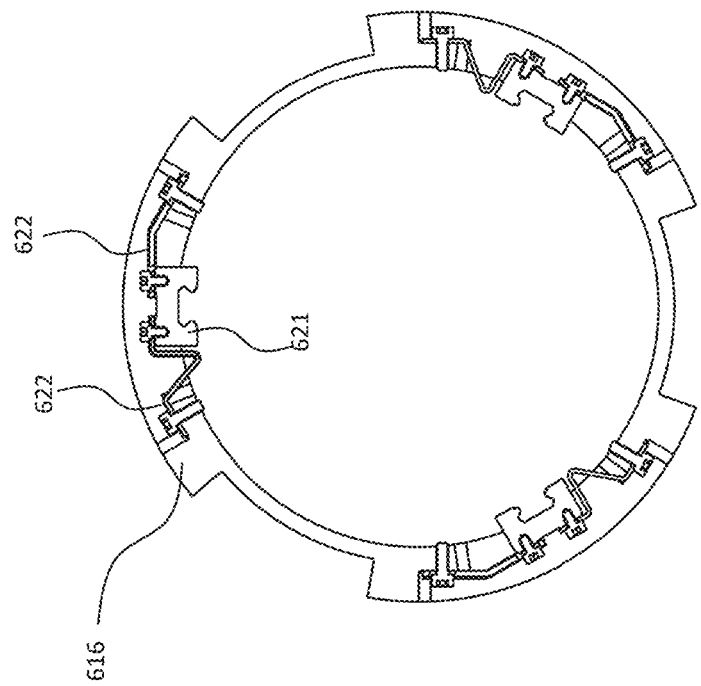
FIG. 32f is a cross-sectional view, taken along line C-C of FIG. 32e, of the linear motion guideway block shown in FIGS. 32d and 32e.

The movement mechanism 610 in the figures comprises three linear motion guideways 614, however, there may be more or less linear motion guideways 614. The linear rails are essentially equally distributed around the inner section 602. The linear motion guideways 614 are typically standard components, for example produced by THK, Hiwin, SKF or Schaeffler. The structure 613 includes several hollow sections where material has been removed to make the structure 613 lighter, leaving several circular elements 615 separating the hollow sections and holding the linear rails of the one or more linear motion guideways 614 in place to the inner section 602. The linear motion guideway block 616 here has a tube-shaped body. The linear motion guideway block 616 is stationary fixed to the outer section 601. An example of the linear motion guideway block 616 is illustrated in FIG. 32d in isolation. FIG. 32e illustrates the linear motion guideway block 616 in FIG. 32d from a side view. FIG. 32f illustrates the linear motion guideway block 616 in FIG. 32e in a cross-section along C-C. Linear motion guideway block 616 comprises longitudinal grooves 618 matching the rails of the linear motion guideways 614, such that the rails of the linear motion guideways 614 can move in the longitudinal grooves 618. The rails of the linear motion guideways 614 are also arranged to travel or move in carriages 621 mounted to the linear motion guideway block 616.

The linear motion guideway block 616 further comprises a spring mechanism 617. Spring mechanism 617 comprises springs 622 accommodated in throughgoing cutouts 619 of the linear motion guideway block 616. The springs 622 are for example made of spring steel. The springs 622 are mounted to the body of the linear motion guideway block 616 and the carriages 621 with fastening elements, for example screws. Hence, carriages 621 hang in the throughgoing cutouts 619 by means of the springs 622. For example, springs 622 connect each carriage 621 on two opposite sides of carriage 621 to the body of the linear motion guideway block 616. Here, two carriages 621 are arranged in each throughgoing cutout 619, but it may be less or more carriages 621 in each throughgoing cutout 619. The longitudinal grooves 618 are arranged on the inside of the linear motion guideway block 616 extending between the throughgoing cutouts 619 and the side faces of the linear motion guideway block 616. In FIG. 32d only one cutout 619 is accommodated with springs for ease of illustration, but it should be understood that springs 622 should be accommodated in all the cutouts 619, as in FIG. 32e-32f. The springs 622 can be compliant or stiff and will act as a load limiter to the linear motion guideways 614 to account for manufacturing and assembly errors. The load limiting function prolongs the life of the linear motion guideways 614. The springs 622 are here formed as thin sheets that will bend or flex when subjected to force. However, there are alternative designs of springs. Balls (not shown) provide smooth movement between the linear rail and corresponding carriages. The balls are thus in contact with both the linear rail and the respective carriage 621. In one embodiment, balls run in canals in a recirculating movement, referred to as recirculating linear ball bearings.

The structure 613 together with the linear motion guideway block 616 forms a sliding pair, or movement pair, of a prismatic joint of the telescopic link 600. In an alternative embodiment, the structure 613 is attached to the outer section 601 and the linear motion guideway block 616 is attached to the inner section 602. The telescopic link 600 is connected via joints located at opposite ends of the link, as has been explained herein. In other words, the first tool link 26, the second tool link 29, the third tool link 38, and the support links are connected via joints 25, 27, 28, 30, 37, 39, 8a, 8b, 9a, 9b, 10a, 10b, 11a, 11b, 12a, 12b, 13a, 13b as explained herein. Such a joint may be a cardan joint 603. Due to kinematics of the tool linkages, the relative rotational angle (around a center-line along the link) of the cardan joints 603 at both ends of the link is subject to change during operation of the manipulator. To account for this rotation, a revolute joint 620 may be included. According to some embodiments, such joint being a revolute joint 620 is added in series with the cardan joint 603, for example on the inner side of the cardan joint 603 on the right end of the telescopic link 600 in the figures. As an alternative, such cardan joint 603 with the revolute joint 620 may be changed for a ball joint at either end of the link. For practical reasons, near the support platform 17a (if the link is a tool link), as there might be cabling at the other end of the link.

The telescopic links described above may be serviceable items. To determine the service interval, temperature and travelled distance can be logged in a control unit or control system and be used as a service time indicator. In some embodiment, the telescopic link comprises a cooling arrangement (not shown) for cooling the actuator and providing an overpressure or air flow that reduces penetration of dust and particles in the movement mechanism. Compressed air is then input inside the outer section 601 at one end of the outer section 601, typically at the proximal end of the outer section 601, furthest away from the inner section 602. The air is output at the other end of outer section 601.

FIG. 3 also shows a control unit 127 that is arranged to control the movement of the PKM, using the actuators. Each linear actuator of a linkage comprises a motor that is arranged to actuate a variable length link of the same linkage. A linear actuator is thus an actuator arranged to cause linear motion of a link, and thus change the length of the link. The motor is controlled via the control unit 127. Thus, the second tool linkage TL2 comprises a linear actuator comprising a motor 129 connected to the control unit 127 via the cable 130a, for example mounted in a cable chain along the third path 3. Further, the first tool linkage TL1 comprises a linear actuator comprising a motor 128 connected to the control unit 127 via a cable (not shown), for example mounted in a cable chain along the first path 1. Also, although not illustrated, the third support linkage SL3 comprises a linear actuator comprising a motor (not shown) connected to the control unit 127 via the cable (not shown), for example mounted in a cable chain along the third path 3. It should be understood that any of the links of the PKM may be linear and the linkage comprising the variable length link will then typically comprise a linear actuator arranged to actuate the variable length link. Further, each linear actuator of a linkage typically comprises a motor that is arranged to actuate the variable length link of the same linkage. In other words, in some embodiments, at least one of the first, second and third tool linkages TL1, TL2, TL3 comprises an actuator configured to vary the length of the same tool linkage TL1, TL2, TL3.

The control of the process actuator 20 is made by a combined control of the support platform 17a and the tool base shaft 19. A platform control determines a position change of the shaft joint 24 to obtain the ordered position of the tool at the ordered orientation of the tool and a tool base shaft control is made such that the tool base shaft 19 makes the ordered orientation change of the tool. This combined control is obtained by a computer, e.g. the CNC or robot control unit 127, which makes use of the kinematics of the parallel kinematics of the whole machine structure. The parallel kinematic model in the computer includes geometric models and parameters representing the carriages, the links, the mounting positions of the joints on the carriages, the support platform 17a and the tool base 140. The geometric model may also comprise models and parameters representing any of the paths and the tool. Knowing the ordered position and orientation of the tool base shaft 19 of the tool base 140, the inverse kinematic model is used to calculate the needed positions of the actuators. When calculating trajectories of the tool, including positions and orientations of the tool base shaft 19, new kinematic calculations are made for each interpolation step along the commanded or programmed path. Hence, in some embodiments, the control unit 127 configured to control the rotation of the tool base shaft 19 by controlling the movement of the one or more tool linkages TL1, TL2, TL3. A movement of a tool linkage is accomplished by actuation of a carriage that the tool linkage is connected to, and/or by actuation of a linear actuator of a tool linkage. The movement of several tool linkages is typically synchronized to accomplish a desired rotation of the tool base shaft 19. In some other embodiments, which may be combined with the before mentioned embodiments, the control unit 127 is configured to control position and orientation of the tool base shaft 19 by additionally controlling one or more of the first movement of the first support linkage SL1, the second movement of the second support linkage SL2 and the third movement of the third support linkage SL3. The control unit 127 may store a computer program with instructions to cause the PKM according to any one of the embodiments herein to execute method steps as disclosed herein. The computer program may be stored on a computer-readable memory, such as a flash memory.

FIG. 4 illustrates a PKM according to an alternative embodiment, where the variable length tool linkages of FIG. 3 have been exchanged with tool linkages of constant lengths. The support linkages SL1, SL2, SL3 are in this figure shown with hatched lines such that they are not confused with the tool linkages TL1, TL2, TL3. However, the support linkages may be arranged as illustrated in any of the embodiments described herein, for example as illustrated in any of FIG. 1, 3, 14A, 15A or 16. The PKM illustrated in FIG. 4 comprises a third tool linkage TL3. The third tool linkage TL3 comprises a third tool link 38. The third tool linkage TL3 is configured to rotate the tool base shaft 19 around a third axis being non-parallel with the first and second axes, by additionally transferring a movement of the third tool linkage TL3 to the tool base shaft 19. The third tool link 38 is at one end connected to a carriage via a third tool carriage joint 39, and at the other end connected to the tool base 140 with a third tool base joint 37. FIG. 4 thus illustrates that it is also possible to connect a third linkage TL3 to the tool platform 17b, whereby the process actuator 20 can also be rotated, thus obtaining three DOF control of the orientation of the process actuator. This requires that the shaft joint 24 is designed for three DOF, for example by mounting a rotation bearing on the tool base shaft 19 with the rotation axis coinciding with the center line of the tool base shaft 19. It is of course also possible to use a ball and socket shaft joint 24 in this case. In this embodiment with three tool linkages, the PKM is configured to move the tool base shaft 19 in six DOF.

FIG. 4 shows an alternative way to control the tilting angle 23 of the tool base shaft 19. Here the linear actuation, e.g. telescopic actuation, of the tool links 26, 29 illustrated in FIG. 3 has been replaced by two additional carriages, namely a fourth carriage 33 arranged to the first path 1, and a fifth carriage 34 arranged to the third path 3. The variable length tool links 26, 29 have now been replaced with tool links 31, 32 with constant or fixed lengths, here referred to as constant-length tool links. Also, the third tool link 38 is here a constant-length tool link. The tool carriage joints 27, 30 are mounted on mechanical interfaces on the added fourth carriage 33 and fifth carriage 34. When the fourth carriage 33 and the fifth carriage 34 are moved, the tool links 31, 32 will move the process actuator 20, which changes the angle 23. The same joints 25, 27, 28 and 30 can be use in this case as in the linearly actuated case in FIG. 3. In other words, the first tool link 31 is connected via the first tool carriage joint 27 to the fourth carriage 33 being different from the first, second and third carriages 4, 5, 6. The second tool link 32 of the second tool linkage TL2 is connected via the second tool carriage joint 30 to the fifth carriage 34 being different from the first, second third and fourth carriages 4, 5, 6, 33. A sixth carriage 120 is arranged to move along the second path 2. The third tool link 38 of the third tool linkage TL3 is connected via the third tool carriage joint 39 to the sixth carriage 120 being different from the first, second and third carriages 4, 5, 6. The sixth carriage 120 is here also different from the fourth and fifth carriages 33, 34. This sixth carriage 120 is mounted at higher Xb-values than the second carriage 5.

Advantages of using separate actuated carriages 33, 34, 120 instead of having carriages common with the support linkages SL1, SL2, SL3 and linear actuation (e.g. telescopic actuation) to control the tool platform 17b, is that higher stiffness can be obtained and that the mass inertia of the tool linkages and thus the PKM will be reduced. In FIG. 3 the stiffnesses of the variable length tool links 26 and 29 are coupled in series with the stiffnesses of the first carriages 4 and third carriage 6, respectively, while in FIG. 4 no such serial stiffness coupling takes place. However, when using the extra carriages 33, 34, 120 the paths need to be longer.

FIG. 4 also shows the control unit 127. Each carriage 4, 5, 6, 33, 34, 120 is arranged to be actuated by a respective motor 123, 121, 125, 124, 122, 126 to make the carriage move along a respective path. The motor is typically mounted on the carriage when a rack- and pinion linear actuation arrangement is used or when a direct driven linear motor is used. Each motor is also connected to the control unit 127, e.g. via a cable. One cable 130b is schematically illustrated in FIG. 4 connecting the motor 125 of the third carriage 6 to the control unit 127. The cable 130b is in the illustrated example mounted in a cable chain along the third path 3. The same type of cabling arrangement may be made to the other motors 123, 121, 124, 122, 126. If a ball screw actuator is used for the linear movement of the carriages, the motor can be fixed at one end of the respective guideway (path) and a cable chain is then not needed. However, the length of a ball screw arrangement is limited. Therefore, it is assumed in the following that each carriage 4, 5, 6 is driven by a rack- and pinion arrangement, however, other alternatives are also possible. Each carriage 33, 34, 120 may be actuated via a ball-screw arrangement between the carriage and the other carriage on each path, which does not avoid the cable chain but can increase stiffness, but also here the claims are independent of the practical actuation of the support linkages SL1, SL2, SL3. In other words, in some embodiments, the PKM comprises a first actuator 123 for moving the first carriage 4 along the first path 1, a second actuator 121 for moving the second carriage 5 along the second path 2, and a third actuator 125 for moving the third carriage 6 along the third path 3. This is true also for the other PKMs in this disclosure, although not always shown (see e.g. FIGS. 1, 14A, 15 and 16).

In at least all the embodiments illustrated in FIGS. 1, 3, 4 and 16, the first support linkage SL1, the second support linkage SL2 and the third support linkage SL3 are configured to constrain movement of the support platform 17a in six degrees of freedom, DOF. Also, in at least all the embodiments illustrated in FIGS. 1, 3, 4 and 16, the first support linkage SL1, the second support linkage SL2 and the third support linkage SL3 are configured to move of the support platform 17a in three degrees of freedom, DOF.

In the following a plurality of different arrangements will be illustrated, that can be used with any one of the disclosed PKMs.

Figure 5A:
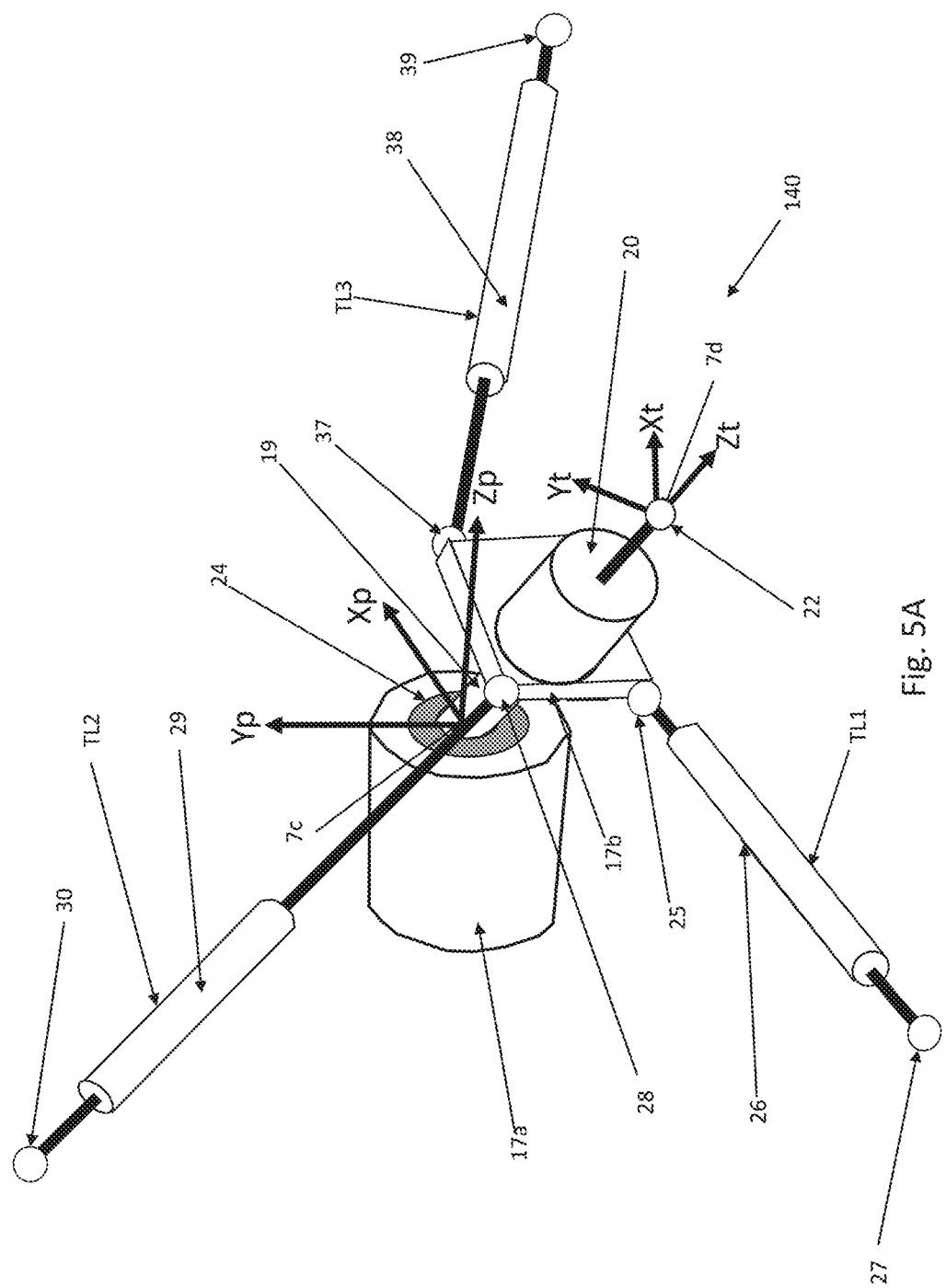
FIG. 5A illustrates an arrangement comprising a support platform, a tool base and three tool linkages, according to one embodiment of the disclosure.
Figure 5B:
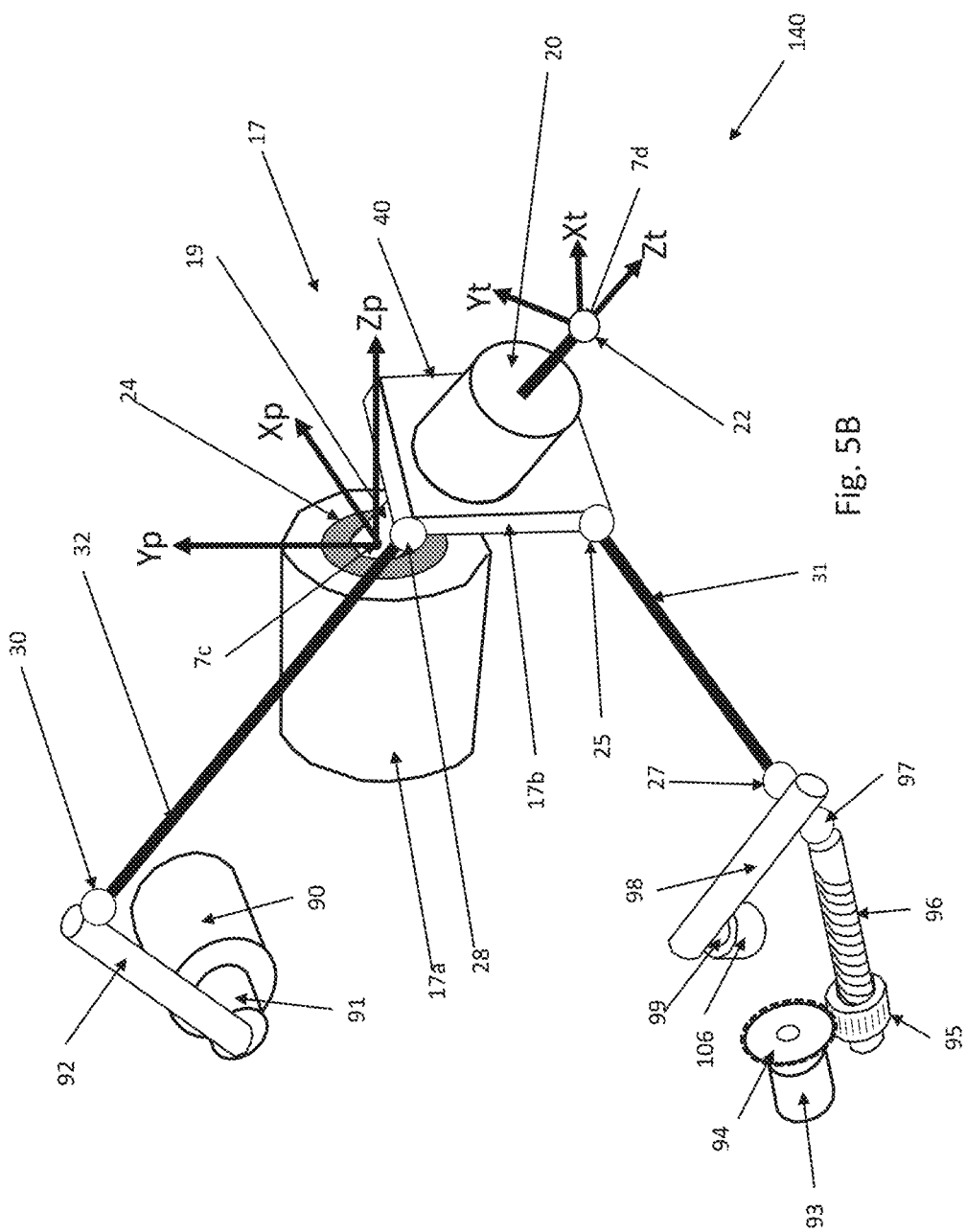
FIG. 5B illustrates an alternative arrangement comprising a support platform, a tool base and two tool linkages, with additional actuators mounted on the carriages and where these actuators rotate a lever connected to the links manipulating the orientation of the tool.

FIG. 5a illustrates an arrangement comprising a support platform 17a, a tool base 140 and three tool linkages TL1, TL2, TL3 in isolation, according to one example embodiment. The illustrated tool links 26, 29, 38 of the tool linkages TL1, TL2, TL3 are variable length links. In use, the tool carriage joints 27, 30, 39 are connected with carriages and the tool base joints 25, 28, 37 are connected to the tool base 140, as previously illustrated and explained. Specifically, the tool base joints 25, 28, 37 are connected, or mounted, directly to the tool platform 17b. It should be understood that the tool base joints 25, 28, 37 may be connected to any part of the tool base 140, for example the shaft joint 24, the tool base shaft 19, the tool platform 17b, or the process actuator 20 itself. The different tool base joints 25, 28, 37 may also be connected, thus mounted, to mutually different parts of the tool base 140. The arrangement in FIG. 5a may be used together with the support linkages SL1, SL2, SL3 and carriages shown in, for example, any of the FIGS. 3 and 4. For example, if the arrangement in FIG. 5a is used in the embodiment shown in FIG. 3, the third tool linkage TL3 may be connected to the second carriage 5, or to an added sixth carriage 120 as shown in FIG. 4. If the arrangement in FIG. 5a is used together with the embodiment shown in FIG. 4, the variable length tool links 26, 29, 38 would be exchanged for tool links with constant lengths. Actuation of the tool links 26, 29, 38 will make it possible to rotate the tool base shaft 19 around three axes parallel with the coordinate axes of the base coordinate system 7b. As mentioned, the variable length tool links 26, 29, 38 may be replaced with constant-length tool links, and then need to be connected to carriages configured to be actuated to control the movement of the constant-length tool links as illustrated in FIG. 4.

In FIG. 5A a support platform coordinate system 7c is illustrated. This coordinate system 7c has its origin in the center of the shaft joint 24, and has three coordinate axes Xp, Yp and Zp. Zp is a normal to the support platform 17a. The axes Xp and Yp are perpendicular to the ZP-axis. In the illustrated embodiments in FIGS. 1, 3 and 4, all the support linkages SL1, SL2, SL3 comprise pairs of links. Thus, each support linkage SL1, SL2, SL3 comprises two support links 8, 9; 10, 11; 12, 13 that are parallel and have the same length. Because of the use of pairs of links with the same length for each pair to control the support platform 17a, the support platform coordinate system 7c is just a parallel translation of the base coordinate system 7b, meaning that the coordinate axes are pairwise parallel. A tool coordinate system 7d is also depicted in the figure, originating at the process actuator 20. Using all three actuators (all three tool linkages TL1, TL2, TL3) the tool coordinate system 7*d* can be controlled to rotate around all the three axes of the support platform coordinate system 7*c*. If only the first tool linkage TL1 and the second tool linkage TL2 are used, thus, as in FIG. 3, the shaft joint 24 is mounted in such a way that the tool coordinate system 7*d* can be rotated only around the Xp- and Yp-axes of the support platform coordinate system 7*c*. As pointed out in connection with FIG. 3, it is advantageous to calculate optimal placements of the tool base joints 25, 29 in relation to where the tool base shaft 19 is mounted on the tool platform 17*b*. It is also advantageous to select an optimal placement of the shaft joint 24 on the support platform 17*a*, but in the figures the shaft joint 24 is placed at the center of the proximal face of the support platform 17*a*.

In FIG. 3 variable length tool links 26, 29 were used to tilt the tool platform 17*b* and in FIG. 4 separate actuated fourth carriage 33 and fifth carriage 34 on the first path 1 and third path 3, respectively, were used. FIG. 5B illustrates a further alternative arrangement with additional actuators mounted on the first carriage 4 and the third carriage 6. These actuators are arranged to rotate a first lever 92 and a second lever 98, respectively, and the first lever 92 is connected to the second tool link 32, and the second lever 98 is connected to the first tool link 31, to thereby manipulate the orientation of the tool platform 17*b*. Thus, FIG. 5B exemplifies how a rotating actuator 90 mounted on the carriage 6 (not shown in the figure), is arranged to turn the first lever 92 attached to a first shaft 91 of the actuator 90. In its other end the first lever 92 is connected to the second tool link 32 via the second tool carriage joint 30 with three degrees of freedom. The first tool link 31 is connected to the second lever 98, which is arranged to turn around a first bearing 106 via a second shaft 99. The first bearing 106 is mounted on the first carriage 4 and the angle of the second lever 98 is controlled by the ball screw actuator 93-96 via the joint 97. If the screw 96 is mounted perpendicular to the rotation axis of the second shaft 99, the joint 97 may have only one degree of freedom. The ball screw actuator 93-96 is designed to include the rotational actuator 93, the gear wheel 94, the combined gear wheel and ball screw nut 95 and the screw 96. There may also be bearings (not shown) holding the nut 95. The ball screw actuator 93-96 and the first bearing 106 are mounted on the first carriage 4. As an alternative to the ball screw actuator in the figure, the motor 93 can rotate the screw 96 while the joint 97 is mounted on the nut 95. In this case the second lever 98 can be omitted and the linear ball screw actuator can directly move the first tool carriage joint 27.

Figure 5C:
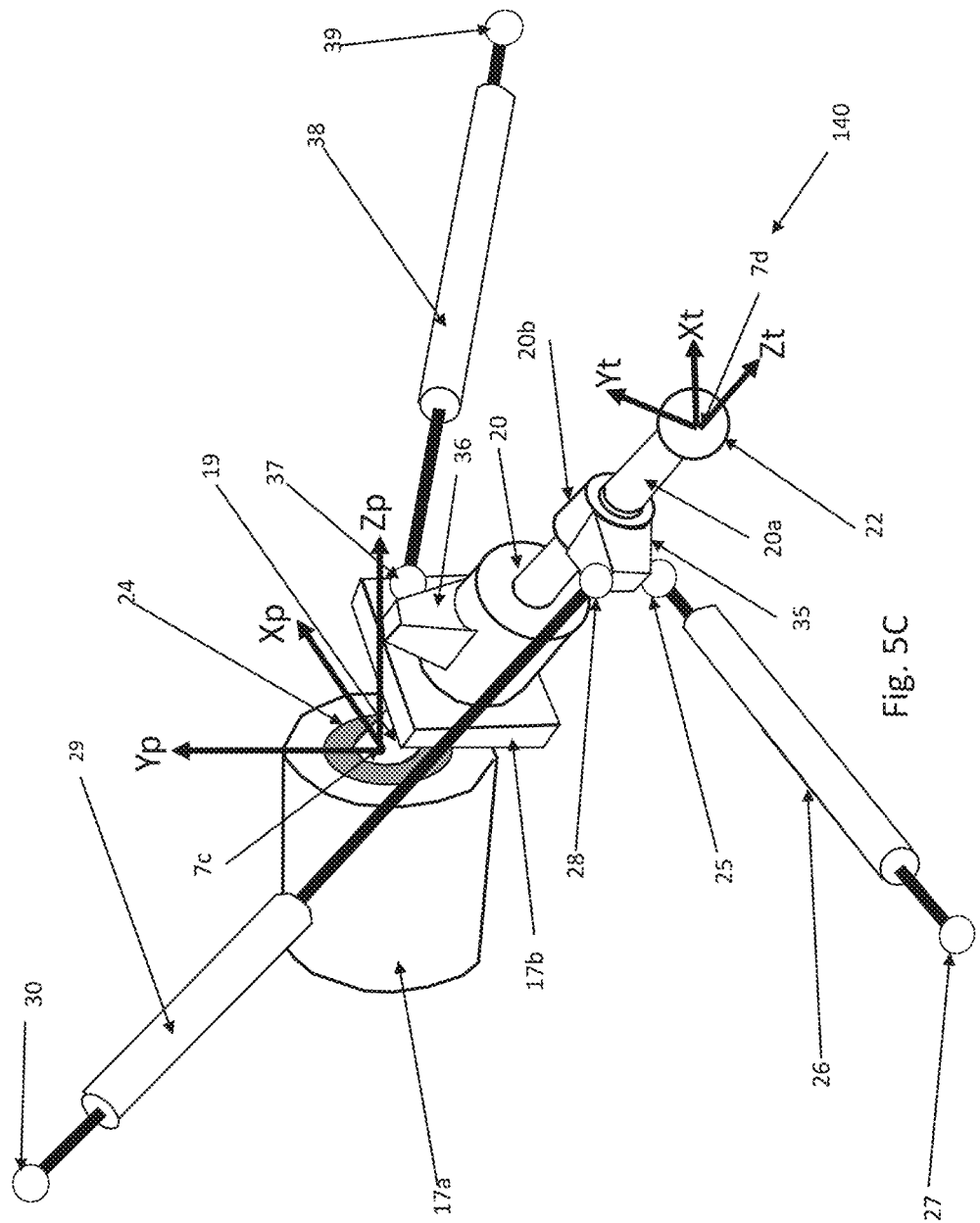
FIG. 5C illustrates a further alternative arrangement comprising a support platform, a tool base and three tool linkages, with an alternative mounting of the tool base joints.

FIG. 5C illustrates the same arrangement as FIG. 5A, but here the tool base joints 25, 28, 37 are not mounted directly on the tool platform 17*b*. Instead, the tool base joints 25, 28, 37 are mounted via mechanical interfaces, e.g. extensions or elements, directly to the process actuator 20. Thus, tool base joint 37 of the third tool linkage TL3 is mounted on a first mechanical interface 36 on the process actuator 20. The tool base joints 25, 28 of the first tool linkage TL1 and second tool linkage TL2 are mounted on a second mechanical interface 35 on a second bearing 20*b*, which is mounted on a rotating tool shaft 20*a* extending from the process actuator 20. The advantage with such mountings is that it enables mounting of the tool base joints 25, 28, 37 closer to the tool 22. Mounting close to the tool 22 usually increases the stiffness of the system. On the other hand, special arrangements are needed for each type of tool equipment and problems with accessibility can arise if the tool base joints 25, 28, 37 are mounted too close to the tool 22. Alternatively, the tool base joints 25, 28 of the first tool linkage TL1 and second tool linkage TL2 are also mounted on mechanical interfaces on the process actuator 20.

Figure 5E:
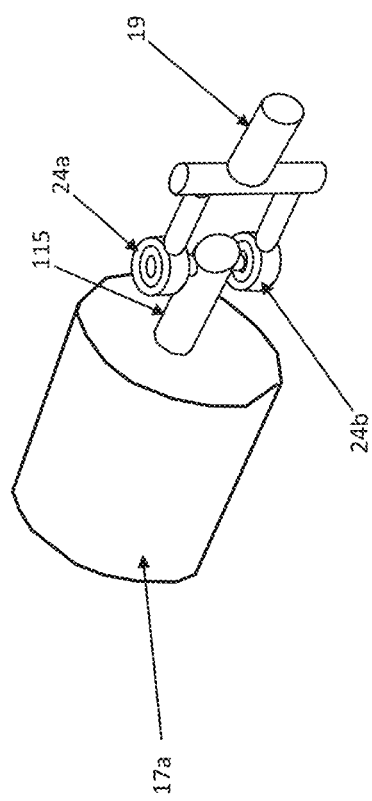
FIG. 5E illustrates one implementation of the shaft joint for the arrangement in FIG. 5D.
Figure 5D:
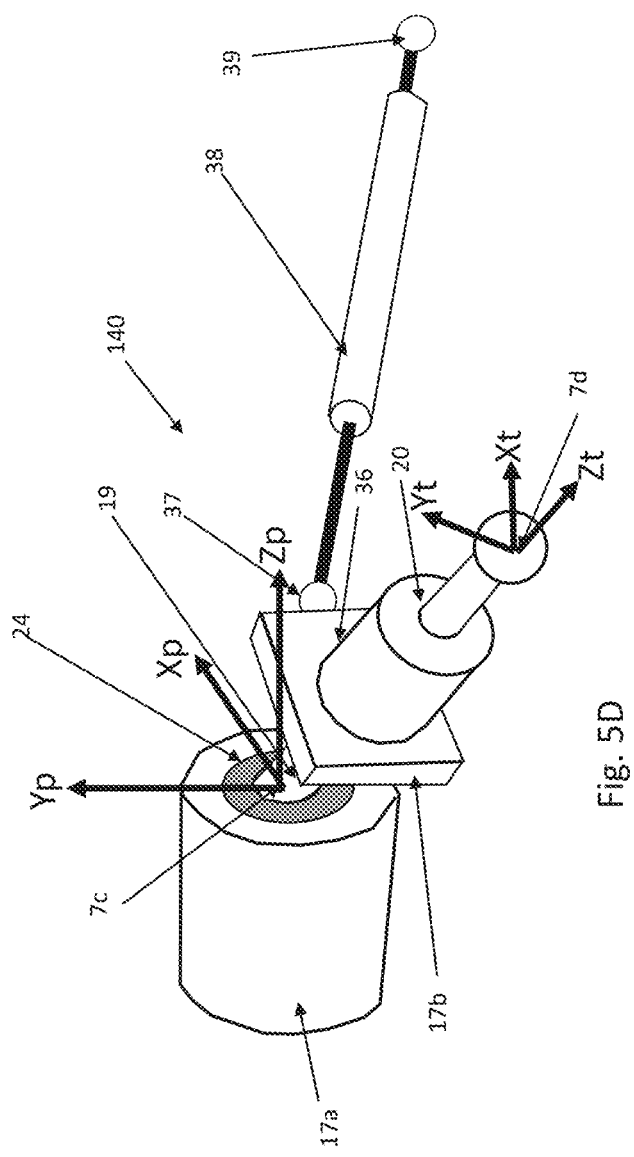
FIG. 5D illustrates an alternative arrangement comprising a support platform, a tool base and one tool linkage, where the tool platform can be rotated in only one DOF.

FIG. 5D illustrates an embodiment where the tool platform 17*b* can be rotated in only one DOF and around the Yp-axis, which may be useful for example when friction stir welding is made in corners having only vertical orientation. Thus, a one DOF shaft joint 24 is used and the tool base shaft 19 is tilted around the Yp-axis by means of the linkage 38, connected between the tool platform 17*b* and the second carriage 5 with the third tool platform joint 37 and the third tool carriage joint 39. As before, 17*a* is the support platform, 7*c* the support platform coordinate system, 20 the process actuator and 7*d* the tool coordinate system.

FIG. 5E illustrates one implementation of the shaft joint 24 for the tool platform configuration in FIG. 5D. Thus, two bearings 24*a*, 24*b*, a third bearing 24*a* and a fourth bearing 24*b*, are mounted, with their common rotation axis parallel with the Yp-axis, around a third shaft 115 rigidly connected to the support platform 17*a*. The tool base shaft 19 is connected to the bearings 24*a* and 24*b*, giving it one DOF with a rotation axis parallel with the Yp-axis. Of course, the rotation axis can be tilted relative to the Yp-axis by tilting the common rotation axis of the bearings 24*a* and 24*b*.

FIG. 5F illustrates an alternative arrangement comprising a support platform 17*a*, a tool base 140 and two tool linkages TL1, TL2, where the tool linkages TL1, TL2 are mounted to the tool base shaft 19 via an offset element 19*b*. With a large tool platform, the tool platform itself will implement the offset element and it is needed mainly when a slim platform is used as in the figure. Generally, the tool linkages TL1, TL2, and TL3 (if present) are mounted to the tool base 140 with an offset from a center line of the tool base shaft 19. FIG. 5F points out the importance of having a distance between the mounting of the first tool base joint 25 and the second tool base joint 28 and the center (line) of the tool base shaft 19. Thus, an offset element 19*b* is depicted to illustrate that the tool base joints 25, 28 are not directly mounted on the tool base shaft 19. In the previous figures the function of this offset element 19*b* is obtained by the tool platform 17*b* or a special element 35. The reason for this offset is that the linkages TL1 and TL2 are not at a right angle to the Z-axis of the support platform coordinate system. Thus, the offset will be needed to obtain a symmetric working range for the tool base shaft 19 around the Y-axis of the support platform coordinate system with the direction of the Z-axis being in the center of the working range for the shaft rotation around the Y-axis of the support platform coordinate system. Thus, in some embodiments, there is an offset between a mounting point of each tool linkage TL1, TL2 to the tool base 140 from the Zp-axis, with respect to the rotation angle around the Yp-axis. Thereby a symmetric working range around the Yp-axis can be obtained.

FIG. 5G illustrates a still further alternative arrangement comprising a support platform 17*a*, a tool base 140 and two tool linkages TL1, TL2, where the tool base shaft 19, 19C has a bent shape. FIG. 5G shows an alternative to obtain a symmetrical orientation range with respect to the Y-axis of the support platform coordinate system. Here, the center of the working range of the tool base shaft 19 is tilted around the Y-axis of the support platform coordinate system simultaneously with a corresponding tilting of the shaft joint 24. To obtain the tool coordinate system having its Z-axis parallel to the Z-axis of the support platform coordinate system when the tool base shaft 19 is tilted, the tool base shaft 19 has been extended with a shaft part 19*c*, bent in relation to the tool base shaft 19. The angle for this bending is selected such that the Z-axis of the tool coordinate system will be parallel with the Z-axis of the support platform coordinate system when the tool base shaft 19 is in its tilted reference angle. The tilted reference angle is defined as an angle that is created when the tool shaft 19 is tilted to be in the middle of its rotation working range around the Y-axis of the support platform coordinate system. The tool platform 17a is in this embodiment mounted on the shaft part 19c. Of course, the tool base joints may also be mounted on the shaft part 19c or the tool platform 17b. The tilted reference angle may alternatively be achieved by simply tilting the tool platform 17a (in relation to a center of the tool base shaft 19) when mounted on the tool base shaft 19. Thus, in some embodiments, the tool linkages TL1, TL2 (and TL3 if present) are mounted to the tool base 140 and in relation to the tool base shaft 19 such that a symmetrical working range is obtained with respect to the orientation of the tool platform 17b. This is thus achieved by mounting the tool platform 17b at an angle relative the tool base shaft 19, and/or by mounting the tool linkages TL1, TL2 (and TL3 if present) to the tool base 140 with an offset from a center line of the tool base shaft 19.

In the following figures, a plurality of different tool base 140 embodiments will be exemplified, which can be arranged as the tool base 140 in any of the previously explained figures, and thus combined with any of the previously explained embodiments.

FIG. 6 illustrates a tool base 140 according to a first embodiment, giving the possibility to mount the tool base joints 25, 28 on the tool base shaft 19 on the opposite side of the process actuator 20 relative the support platform 17a. In this embodiment, the tool base shaft 19 passes through the support platform 17a to enable connecting the tool base joints 25, 28 on the opposite side of the support platform 17a in relation to the process actuator 20. The shaft joint, between the support platform 17a and the tool base shaft 19, consists in this case of a disc or ring 101, which is connected to the support platform 17a by means of two bearings 102, 103, thus a fifth bearing 102 and a sixth bearing 103, having coinciding rotation axes. The ring 101 is in turn connected to the tool base shaft 19 by means of the bearings 104 and 105, thus a seventh bearing 104 and an eight bearing 105, also having coinciding axes. The reason for having this solution is that the accessibility for the process actuator 20 and the tool head 22 can be improved. However, as a consequence, the stiffness will be reduced because of higher forces on the support platform 17a and because of difficulties to obtain optimal placement of the platform joints on the support platform 17a for the support links 8-13. Of course, a third variable length link 38 as in FIG. 5C may be used also in this case and instead of variable length links, constant-length links connected to carriages can be used. Also, in this case a mechanical interface (e.g. an offset element) as in FIG. 5F is needed but is not illustrated.

FIG. 7 illustrates an example of a shaft joint 24 designed as a cardan joint. The cardan joint may be used as the shaft joint 24 connected between the support platform 17a and the tool base shaft 19 in the embodiments shown in FIGS. 1-5 (including 5A-5C and 5F-5G). The shaft joint 24 embodied as a cardan joint basically comprises a pair of hinges oriented perpendicular to each other and connected by a cross shaft. The tool base shaft 19 is mounted on a first bracket 49a embodying a first hinge of the cardan joint. In this example, the bracket has a U-shape, but other shapes can of course be used. The first bracket 49a includes two integrated bearings, a ninth bearing 47 and a tenth bearing 48, one on each side of the first bracket 49a. A first joint shaft 44 and a second joint shaft 46 are mounted into these bearings 47, 48, which makes it possible for the tool base shaft 19 to tilt around the axis defined by the coinciding rotation axes of the bearings 47 and 48. A third joint shaft 42 and a fourth joint shaft 43 are mounted at a right angle relative the first joint shaft 44 and the second joint shaft 46, via an interconnecting cube, and also mounted in two bearings, an eleventh bearing 40 and a twelfth bearing 41. These two bearings 40, 41 are integrated into a cylindrical support platform attachment part 49b, rigidly mounted to the outer end of the support platform 17a (not visible in the figure). Actually, the attachment part 49b can be the outer end of the cylindrical support platform 17a, shown in for example FIG. 1. The eleventh bearing 40 and the twelfth bearing 41 are here included in the shaft joint 24. The cylindrical support platform attachment part 49b has two projecting parts where the two bearings 40, 41 are mounted. The cylindrical support platform attachment part 49b embodies the second hinge of the cardan joint, and thus has a U-shape, however other shapes are possible. The first joint shaft 44, the second joint shaft 46, the third joint shaft 42, the fourth joint shaft 43 and the cube together make up a cardan joint cross 45. The geometries of the support platform attachment part 49b and the first bracket 49a are designed for high stiffness and large tilting capacity and can of course have different mechanical structures.

Figure 8:
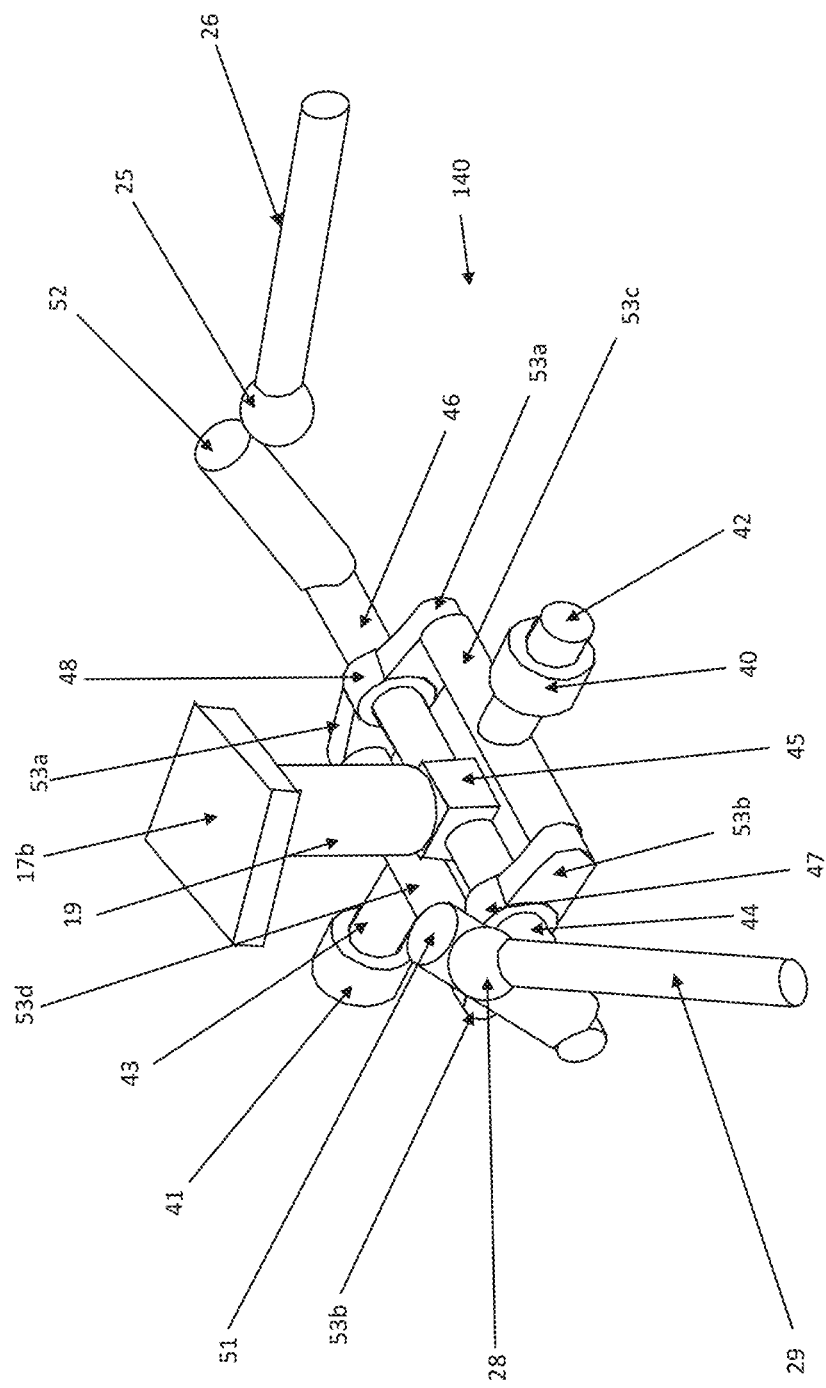
FIG. 8 illustrates tool base according to a second embodiment comprising an alternative design of the shaft joint in FIG. 7.

FIG. 8 illustrates tool base 140 according to a second embodiment comprising an alternative design of the shaft joint 24 in FIG. 7. This alternative design is also a cardan type joint. Here the tool base shaft 19 is mounted directly on the cardan joint cross 45, making it possible to move the tool links 26, 29 from the tool platform 17b as in FIG. 2-5B, or the actuation equipment as in FIG. 5C or the tool base shaft 19 itself as in FIG. 6 to first lever shaft 51 and second lever shaft 52. This will make it possible to obtain a larger distance between the process actuator 20 and the tool base joints 25, 28, entailing improved accessibility. This will also make it possible to obtain larger maximum rotation around the Ypl-axis of the platform coordinate system. However, the stiffness of the system may in this embodiment be reduced. The mounting of the tool links 26, 29 to carriages may be made as explained in any of the embodiments herein. The optimization of the rotation (tilting) of the tool base shaft 19 around the common axis of the bearings 47 and 48 is obtained by selecting the optimal angle between the tool base shaft 19 and the first and second lever shafts 51, 52 with respect to the common axis of the bearings 47 and 48. This corresponds to the optimization of the distance between the mounting position of the tool base shaft 19 on the tool platform 17b and the tool base joints 25, 28 as in the previous figures. The cardan joint cross 45 in FIG. 7 is with this solution split up and the third joint shaft 42 and the fourth joint shaft 43 are connected to the first joint shaft 44 and the second joint shaft 46 via extensions 53a, 53b, 53c, 53d and the two bearings 47 and 48. The extensions 53a, 53b, 53c, 53d together form a rectangular suspension for the cardan cross 45. As before, the bearings 40 and 41 are integrated into the support platform 17a, not included in this figure. It should be mentioned that the tool base shaft 19 will still be rotatable around the common rotation axes of the bearings 40 and 41. For example when the tool links 26, 29, which are only partly visible in the figure, are moved in different directions.

Figure 9:
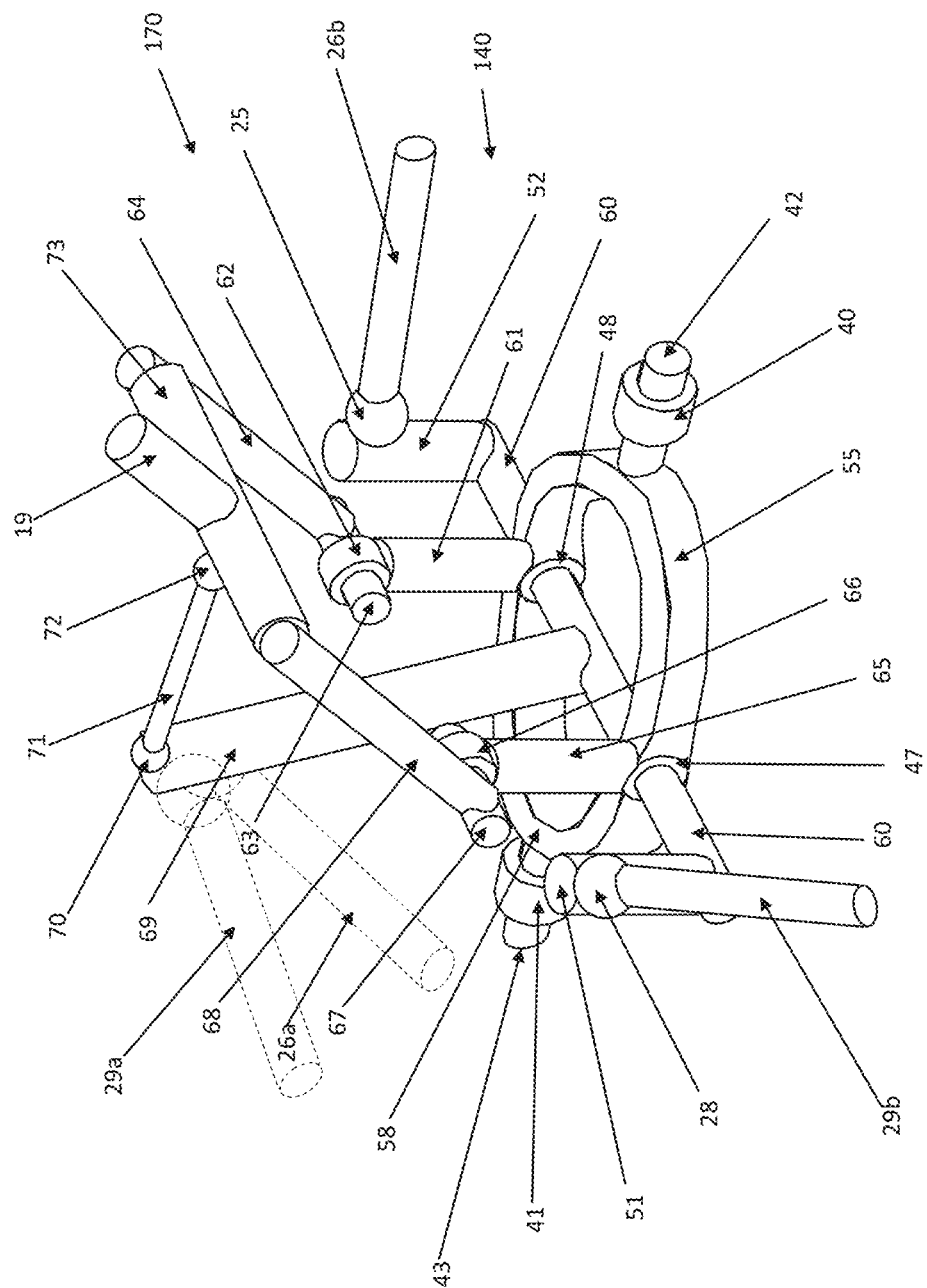
FIG. 9 illustrates a tool base according to a third embodiment, that introduces a concept to increase the tilting capability of the tool in one tilting direction.

FIG. 9 illustrates a tool base 140 according to a third embodiment. More in detail, in this embodiment, the tool base (only partly shown in FIG. 9) comprises a shaft joint transmission assembly 170 connecting the tool base shaft 19 and the support platform 17*a* (via the bearings 40, 41). Hence, the shaft joint 24 is included in the transmission assembly 170. The shaft joint transmission assembly 170 shows an alternative design of the shaft joint 24 in FIGS. 7 and 8, that introduces a concept to increase the tilting capability of the process actuator 20 in one tilting direction. Thus, the shaft joint transmission assembly 170 is arranged to increase orientation range of the tool base shaft 19. FIG. 9 shows how the cardan joint type presented in FIG. 8 can be used to include a backhoe mechanism including a backhoe transmission to enhance the tilting capacity in one direction of the tool base shaft 19. Thus, the shaft joint transmission assembly 170 comprises a backhoe mechanism configured to enhance the gearing ratio of the rotation of the tool base shaft 19. Several examples of backhoe mechanisms are described in the US patent application U.S. Ser. No. 16/418,913, filed 21 May 2019, and in PCT application PCT/EP2020/063573, filed 1 May 2020, which entire disclosures are incorporated herein by reference. In these applications it is described to connect several closed kinematic chains such that an amplified angle of rotation is achieved when actuating the mechanism. More in detail, the tool links 26 (illustrated in two different possible configurations 26*a* and 26*b*), 29 (illustrated in two different possible configurations 29*a* and 29*b*) rotate the third lever 69 via a first input shaft 60. This third lever 69 is connected to a first beam 73 via the connecting link 71 with a first connecting joint 70 and a second connecting joint 72 in each end. The connecting joints 70 and 72 may have 1, 2 or 3 DOF and are used to mount the connecting link 71 between the third lever 69 and the first beam 73. The first beam 73 carries the tool base shaft 19 and is mounted on a first connector 64 and a second connector 68, which can turn around the common rotation axis of two bearings, namely a thirteenth bearing 62 and a fourteenth bearing 66. A connector is here an elongated element for example a shaft or an arm. Thus, the second connector 68 is mounted on a sixth joint shaft 67, which in turn is mounted in the fourteenth bearing 66 and the first connector 64 is mounted on a seventh joint shaft 63 mounted in the thirteenth bearing 62. The bearings 62 and 66 are mounted on a first pillar 61 and a second pillar 65, respectively, which are mounted on common parts of a second bracket 55 and a third bracket 58. Thus the pillars 61 and 65 will turn with the rotation of the third joint shaft 42 and the fourth joint shaft 43 but not with rotation around the first input shaft 60. The second bracket 55 is mounted on the third joint shaft 42, which is mounted in the eleventh bearing 40, which is integrated in the support platform 17*a*. In the same way the third bracket 58 is mounted on the fourth joint shaft 43, mounted in the twelfth bearing 41, in turn integrated into the support platform 17*a*. Each of the brackets 55, 58 has a U-shape and are rigidly connected together to form an oval. The brackets 55, 58 together form a rigid common component. By selecting the length of the third lever 69 longer than the connectors 68 and 64, it is possible to obtain larger tilting angles of the tool base shaft 19 than the third lever 69. Of course, this arrangement will reduce the stiffness of the manipulator. However, the tilting capability around the common rotation axis of the bearings 40 and 41 will be the same.

The shaft joint 24 may be defined as the one or more joints (for example including one or more bearings) mounted to the support platform 17*a* and that belongs to the connection between the support platform 17*a* and the tool link 19. In the previous examples this connection is for example a cardan joint, or a modified cardan joint. In the following examples the connection is often illustrated as a shaft joint transmission assembly, that may include the shaft joint. Several more examples of the shaft joint and shaft joint transmission assemblies will be exemplified in the following FIGS. 10-30. It should be understood that the embodiments and examples as explained in the previous text and figures may be complemented or modified with any of, or parts of, the shaft joints and shaft joint transmission assemblies as will be explained in the following text and FIGS. 10-30.

Figure 10:
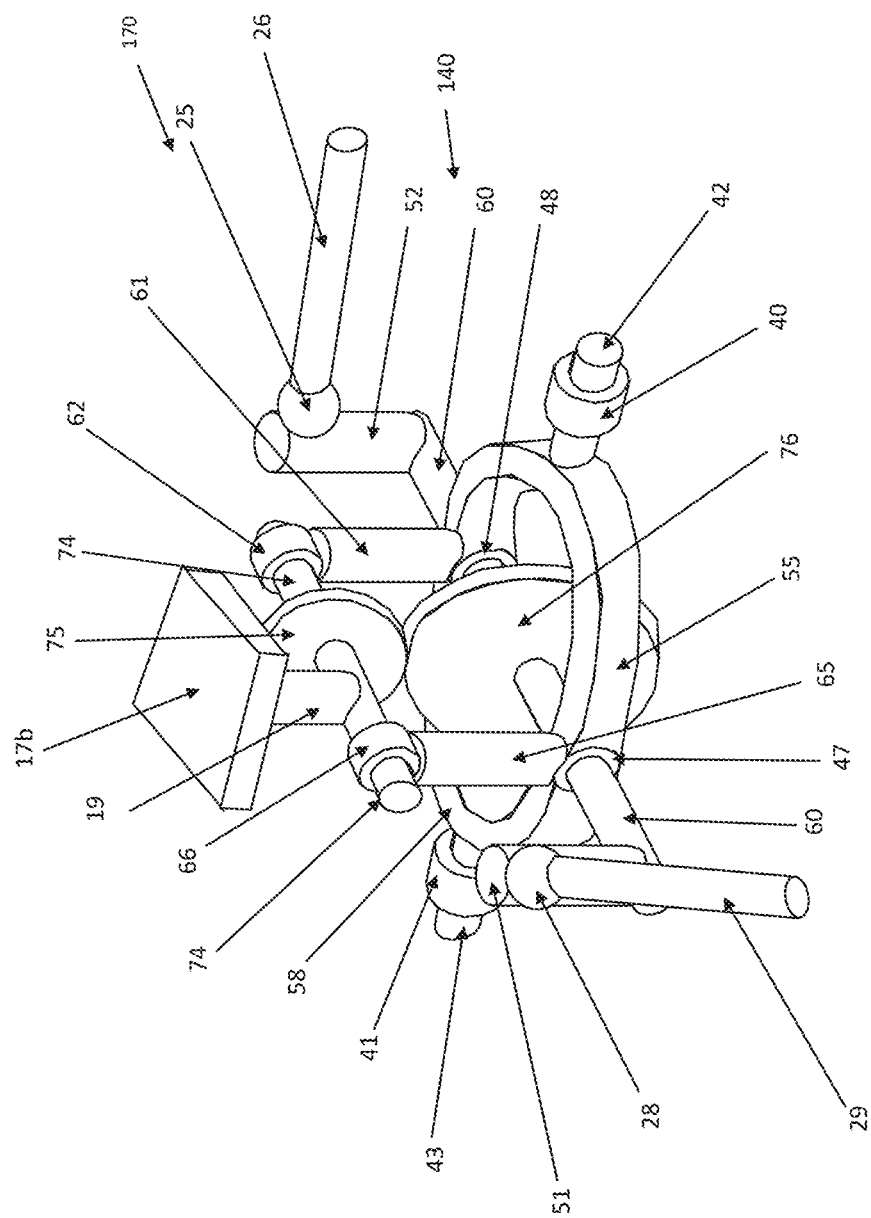
FIG. 10 illustrates a tool base according to a fourth embodiment. Here gear wheels are used instead of kinematic structures as in FIG. 9.

FIG. 10 illustrates a tool base 140 according to a fourth embodiment, designed to obtain enhanced tilting capability of the tool base shaft 19. In this fourth embodiment, gear wheels are used instead of the kinematic structures in FIG. 9. Thus, in this embodiment, the shaft joint transmission assembly 170 comprises gearing wheels configured to enhance the gear ratio of, or in other words, increase, the rotation of the tool base shaft 19. Thus, the gear ratio between rotation of the first input shaft 60 and rotation of the first gear shaft 74, thus between movements of the tool links 26/29 and the rotation of the tool base shaft 19 around the first gear shaft 74. In FIG. 10, a first gear wheel 76 is mounted on the first input shaft 60 to be rotated by the tool links 26, 29. The first gear wheel 76 engages a second gear wheel 75 having smaller diameter than the first gear wheel 76. The second gear wheel 75 is mounted on the first gear shaft 74, which is mounted in the bearings 62 and 66. These bearings are mounted on the two pillars 61 and 65, which are mounted on the common part of the brackets 55, 58. By having the first gear wheel 76 larger than second gear wheel 75, the tilting movements of the tool base shaft 19 will be larger than the tilting movements of the first lever shaft 51 and second lever shaft 52.

Figure 11:
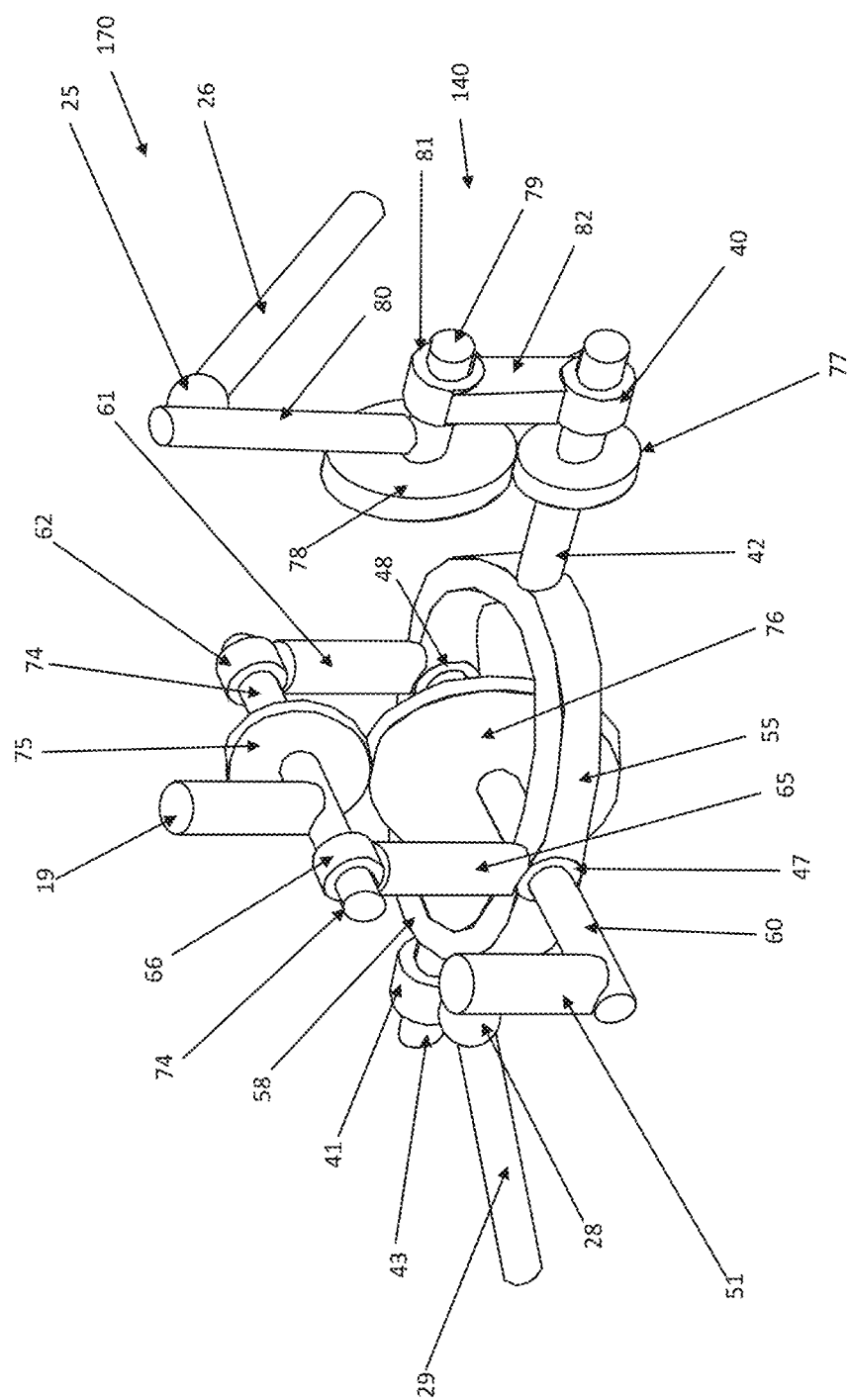
FIG. 11 illustrates a tool base according to a fifth embodiment. Here a second gear wheel transmission has been added in order to increase the tilting capability in two tilting directions.

FIG. 11 illustrates a tool base 140 according to a fifth embodiment. FIG. 11 illustrates an alternative to the design in FIG. 10. In FIG. 11 a second gear wheel transmission has been added in order to increase the tilting capability in two tilting directions. Thus, in this embodiment, the shaft joint transmission assembly 170 comprises gearing wheels configured to enhance the gear ratio of the rotation of the tool base shaft 19. In the transmission arrangement of FIG. 11, the brackets 55, 58 are rotated by means of a third gear wheel 77, mounted on the third joint shaft 42, rotating in the bearing 40. The bearings 40 and 41 are still integrated into the support platform 17*a*. The third gear wheel 77 is engaged by a larger fourth gear wheel 78, mounted on a second gear shaft 79, which is mounted on a fifteenth bearing 81, also integrated into the support platform 17*a*. A second beam 82 is included in the figure to show that the bearings 40 and 81 are mounted on the same structure of the support platform 17*a*. The first tool link 26 is connected to a third lever shaft 80 via the first tool base joint 25 and the third lever shaft 80 is mounted on the second gear shaft 79. Thus, movements of the first tool link 26 will rotate the fourth gear wheel 78 and thereby also rotate the third gear wheel 77, which will in turn rotate the brackets 55, 58 and thus the whole cardan system around the common rotation axis of the bearings 40 and 41. Fourth gear wheel 78 having a larger diameter than third gear wheel 77 implies that larger tilting angles will be obtained for the tool base shaft 19 around the axis of bearings 40 and 41. Thereby, the first and second gear wheels 76, 75 will give large tilt angles of the tool base shaft 19 around the common rotation axis of bearings 62 and 66 as in FIG. 10. One advantage of this gear concept compared with traditional gear concepts, used for example in robot wrists, is that there is a much lower coupling between the two degrees of freedom. When first tool link 26 moves, the cardan structure and the first lever shaft 51 will be rotated but the working range for the connection between second tool link 29 and the rotation of the first input shaft 60 will hardly be affected. Of course, moving second tool link 29 to rotate the first input shaft 60 will not affect the working range of tool link 26 at all.

Figure 12:
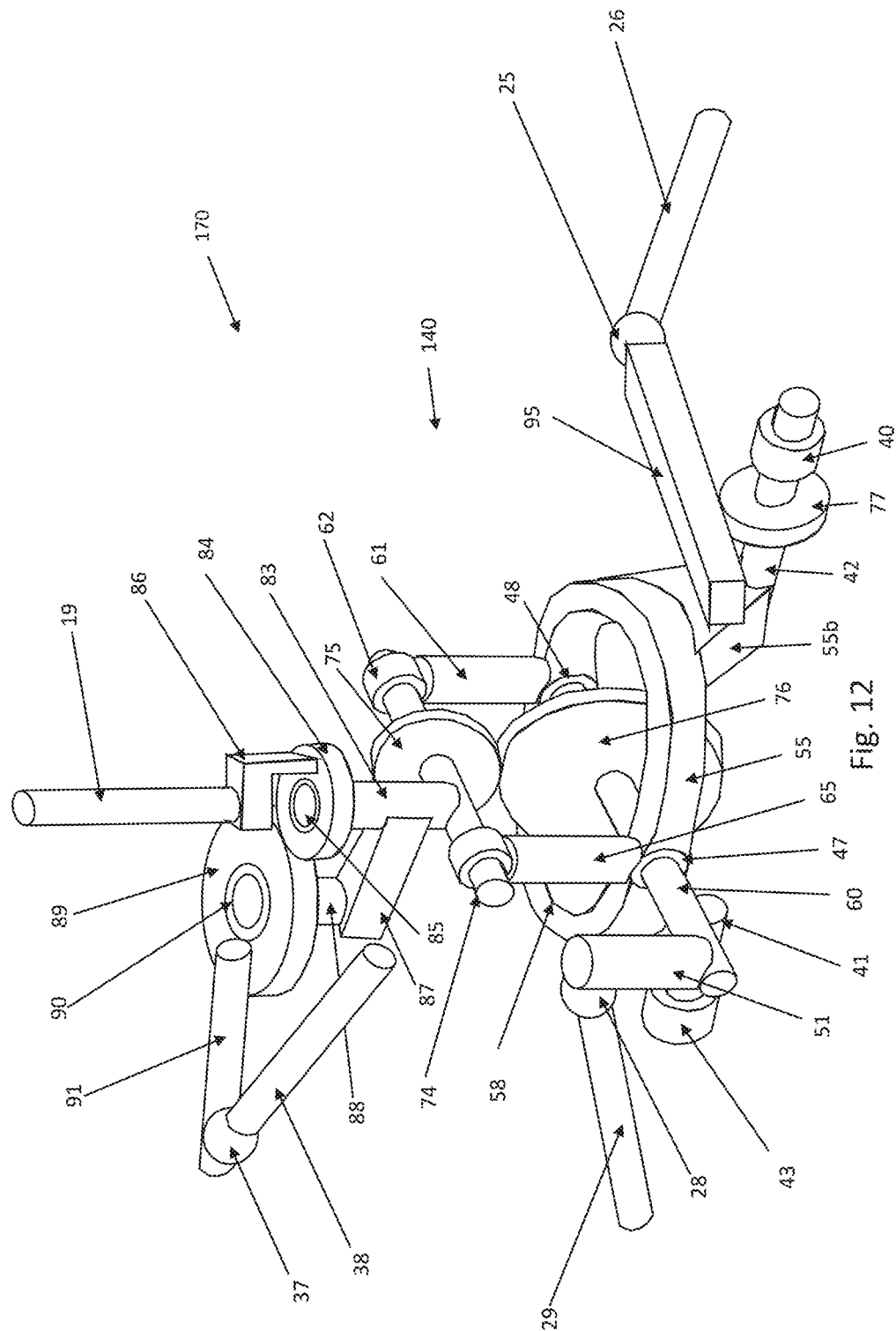
FIG. 12 illustrates a tool base according to a sixth embodiment. This embodiment has the possibility to increase the tilting capability in two tool tilting directions and in twisting.

FIG. 12 illustrates a tool base 140 according to a sixth embodiment. Also in this embodiment, the shaft joint transmission assembly 170 comprises gearing wheels configured to enhance the gear ratio of the rotation of the shaft 19. This embodiment has the possibility to increase the tilting capability in two tool tilting directions and in twisting. In the fourth embodiment, it is also exemplified to use the third tool link 38 to rotate the tool base shaft 19. Also in this case the couplings between the three degrees of freedom is low. The third tool link 38 is connected to a second lever arm 91 via the third tool base joint 37. Since the second lever arm 91 is mounted on a fifth gear wheel 89, it will rotate this gear wheel, which is mounted on a sixteenth bearing 90, which is in turn mounted on a third gear shaft 88. The third gear shaft 88 is mounted on the beam 87, attached to a fourth gear shaft 83, in turn mounted on the first gear shaft 74. The larger fifth gear wheel 89 engages a smaller sixth gear wheel 84, which is mounted on the fourth gear shaft 83 via a seventeenth bearing 85. Finally, the tool base shaft 19, is mounted on the sixth gear wheel 84 by means of a shelf 86. The shelf 86 is introduced just for clarity, in a real implementation the tool base shaft 19 will be mounted directly on the sixth gear wheel 84 with the seventeenth bearing 85 below the sixth gear wheel 84. A rack- and pinion gear solution has been used in the figure for the rotation of the second bracket 55 and the third bracket 58 around the third joint shaft 42. The tool link 26 moves the rack gear 95 to rotate the third gear wheel 77, that here is a pinion gear wheel, which is mounted on the third joint shaft 42. A linear bearing (not shown) for the rack 95 is mounted on the support platform 17a. The figure also shows that it is possible to introduce an offset between the cardan joint axes. Thus, an eighth joint shaft 41 and the third joint shaft 42 with a common axis of rotation are situated below the crossing axis constituted by the first input shaft 60. The offset is implemented with a shaft holder 55b. This offset will make it possible to obtain larger rotation angles of the tool base shaft 19 without collisions with the platform and the actuation transmission for third joint shaft 42. In summary, FIG. 12 shows how a three DOF large angle control of the tool base shaft 19 can be obtained by means of actuation of the tool links 26, 29 and 38.

Figure 13:
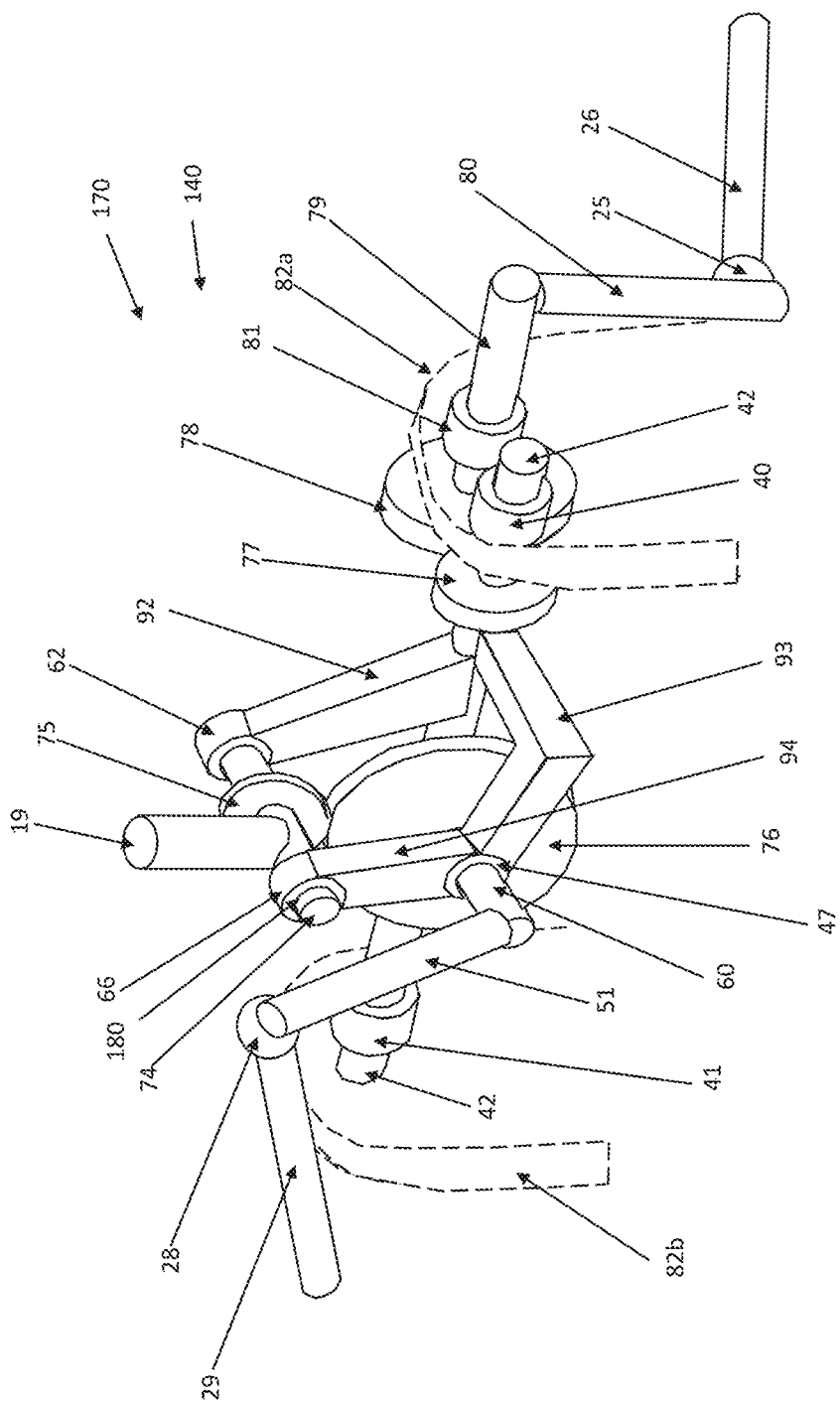
FIG. 13 illustrates a tool base according to a seventh embodiment. Here a compact mechanical solution to increase the tilting capability in two tilting directions is illustrated.

FIG. 13 illustrates a tool base 140 according to a seventh embodiment. Here a compact mechanical solution to increase the tilting capability in two tilting directions is illustrated. The seventh embodiment exemplifies how to arrange the gear transmissions for the two DOF case in order to avoid collisions when it is necessary to obtain tilting of the tool base shaft 19 up to +/−90 degrees in all directions. Now the fourth gear wheel 78 has been lowered and the third lever shaft 80 for the first tool link 26 is pointing downwards. The object 82a with broken lines illustrates the part of the support platform 17a that holds the eleventh bearing 40 and the fifteenth bearing 81 and the third lever shaft 80 rotates outside the platform part 82a. In this way the gear transmission 78-77 will not interfere when the tool base shaft 19 rotates around the first gear shaft 74. Another change from the previous figures is that the cardan structure has been made thinner with a third beam 93 and a fourth beam 94 holding the ninth bearing 47 and a eighteenth bearing 180 and a fifth beam 92 holding the thirteenth bearing 62. Not seen on the figure is another bearing (behind the first gear wheel 76) for the first input shaft 60, mounted on the third joint shaft 42. The first gear wheel 76 is rigidly mounted on the first input shaft 60 and the second gear wheel 75 is mounted on the first gear shaft 74 as also the tool base shaft 19. Another difference in relation to the previous figures is that the third joint shaft 42 is now going through the whole cardan joint and is thus mounted in the eleventh bearing 40 and the twelfth bearing 41, which in turn are integrated into a first gable 82a and a second gable 82b of the support platform 17a (also referred to as U-shaped parts of the support platform 17a). A first lever shaft 51 is mounted in such a way that it will not collide with the support platform 17a when the tool base shaft 19 is rotated +/−90 degrees around the third joint shaft 42. An even better mounting of the first lever shaft 51 is obtained if the first input shaft 60 is prolonged to the other side of the third joint shaft 42 making it possible to mount the first lever shaft 51 on that side of the third joint shaft 42. In that way the first lever shaft 51 can get closer to the third joint shaft 42 when it does not need to be outside the first gear wheel 76. Thus, in the FIGS. 8-13 the bracket is formed by a bracket assembly pivotally connected to the support platform 17a via two shafts 42, 43 to pivot around a first rotational axis (Xp-axis in the case shown in the figure, but could be any axis in the Xp/Yp-plane). The gearing wheels are pivotally connected to the bracket assembly via a first input shaft 60 to pivot around a second rotational axis (Yp-axis in the case shown in the figure), wherein the first rotational axis is perpendicular to the second rotational axis.

FIG. 14A illustrates a PKM according to a further embodiment. In this embodiment, the support platform 17a is supported by five support links 8, 9; 10; 12, 13. In comparison to the embodiments shown in FIGS. 1 to 4, the support link 11 has been removed. Moreover, the support platform 17a is designed as a rotational unit, which can be a shaft as depicted in FIG. 14A. The rotational unit rotates relative to, and passes though, all the support joints 8a, 9a, 10a, 12a, 13a. The support joints 8a, 9a, 10a, 12a, 13a are preferably designed according to FIG. 14B. Here, each support joint includes a bearing 100c. The support platform 17a in the shape of a rotational unit, is mounted inside the bearing 100c of each support joint. Each of the five such bearings then have the same coinciding centerline of rotation when the rotational unit is a shaft or similar. Other shapes of the rotational unit are possible as long as the centerlines of each bearing are essentially parallel. For simplicity of the control and of the following description, it is from now on assumed that the rotational unit is a shaft, and the bearing 100c is referred to as a shaft bearing.

In an example implementation of support joints according to FIG. 14B, a pair of connecting bearings 100a and 100b are mounted on the shaft bearing 100c with the common rotation axis of the connecting bearings 100a and 100b perpendicular to (and intersecting) the rotation axis of shaft bearing 100c. Mountings 110 and 111 correspond to the mountings of the connecting bearings 100a and 100b on the outer bearing ring of shaft bearing 100c. The five support links 8, 9; 10; 12, 13 are mounted on the outer rings of the connecting bearings 100a and 100b via the first beam 114 and the second and third beams 112 and 113. Of course, these parts in terms of beam 112-114 can form one part that is kinematically equivalent and efficiently manufactured. If some null-space rotation of each support link around its center axis is acceptable (for accuracy and cabling) the support joints according to FIG. 14B may instead consist of rod-ends, which results in lower cost but also lower stiffness in the Xb direction. With the arrangement according to FIG. 14B for all the five links, the support platform 17b can rotate free since there is no link mounted on the support platform 17b that constrains its rotational degree of freedom. This free platform rotation can be used to reduce the number of degrees of freedom for the shaft joint 24 with one degree of freedom. In the cases of FIGS. 3 and 4 when only the rotation of the tool base shaft 19 is made around axes parallel with the Xb- and Yb-axes of the base coordinate system, a shaft joint 24 with only one degree of freedom is needed as exemplified in FIG. 14C. Here, the third bearing 24a and the fourth bearing 24b have their common rotation axis perpendicular to the rotation axis of the support platform 17a. It should be noted that even if the common axis of rotation for bearings 24a, 24b in FIG. 14C is shown as intersecting with the rotation of the support platform 17a, that is not necessary. On the contrary, by displacing the bearings 24a, 24b away radially from tool platform 17a, and making this shaft hollow, actuation of wrist motions or of end-effector motions can more easily be transmitted through the support platform 17a to the tool platform 17b.

In FIG. 14A the shaft joint 24 according to the design in FIG. 14C is only schematically illustrated as a circle and for figure clarity mounted at the end of the support platform 17a. For higher stiffness, it should be mounted in the middle of the support platform 17a between the support joints 8a, 9a, 10a, 12a, 13a. In FIG. 14A the support links 8, 9; 10; 12, 13 are mounted in such a way that the free degree of freedom of the support platform 17a is a rotation parallel with the Xb-axis of the base coordinate system 7b. The link structure can also be mounted to obtain the support platform rotation axis parallel with the Yb-axis or Zb-axis of the base coordinate system. In all three cases (x-, y- and z-rotation of the shaft-shaped support platform 17a) the link pairs 8-9 and 12-13 should form parallelograms with pair-wise parallel links with essentially the same length. For each of the three cases, the parallelogram is mounted in a direction corresponding to the direction of the shaft-shaped support platform 17a. In this embodiment, the first support linkage SL1, the second support linkage SL2 and the third support linkage SL3 are configured to constrain movement of the support platform 17a in five degrees of freedom, DOF. Observe that tool linkages (TL) have not been included in FIG. 14A; they should of course be connected to the tool platform 17b, according to any of the embodiments as described herein. Optionally, the support platform 17a in the shape of the shaft in FIG. 14A can be provided with a rotational transmission. The rotational transmission may then comprise a tool linkage connected between a carriage and the support platform 17a, for example via a lever or backhoe mechanism. That is, due to the rotational character of the support platform in FIG. 14A, a tool link of the tool linkage may act via a lever or backhoe mechanism on the support platform 17a in the shape of a shaft, thereby giving more operational space around the tool platform 17b.

Figure 15B:
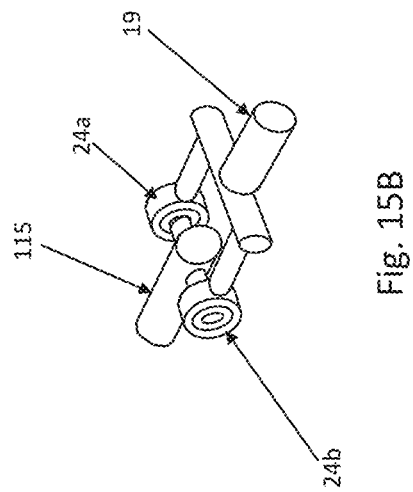
FIG. 15B illustrates a platform joint according to one embodiment.

If one of the support links 8, 9, 12 or 13 is removed in FIG. 14A, leaving only four support links connected to the support platform 17a, the support platform 17a will provide one more degree of freedom for the tool base shaft 19, which means that a tool base shaft joint 19 of one DOF will make two DOF rotation of the tool platform 17b possible. The concept in FIG. 14A with a freely rotating support platform 17a in the shape of a shaft has the advantage that the rotation is unlimited. Without this requirement of unlimited rotation, it is possible to obtain a free rotational degree of freedom of the support platform 17a by a design exemplified by FIG. 15. Here the support platform 17a will provide the tool base shaft 19 with a rotation around an axis parallel with the Yb-axis of the base coordinate system 7b. Then the shaft joint 24 will need to provide a rotation axis parallel with the Xb-axis in order to make it possible for the tool base shaft 19 to tilt in two different directions. Such a shaft joint 24 is shown in FIG. 15B. The inner rings of the bearings 24a, 24b are mounted on a beam 115, in turn mounted on the support platform 17a. The bearings 24a, 24b have a common axis of rotation perpendicular to the axis of rotation of the platform 17a, in this case the Yb-axis of the base coordinate system. The tool base shaft 19 is mounted on the outer rings of the bearings 24a, 24b as shown in FIG. 14C.

Figure 15A:
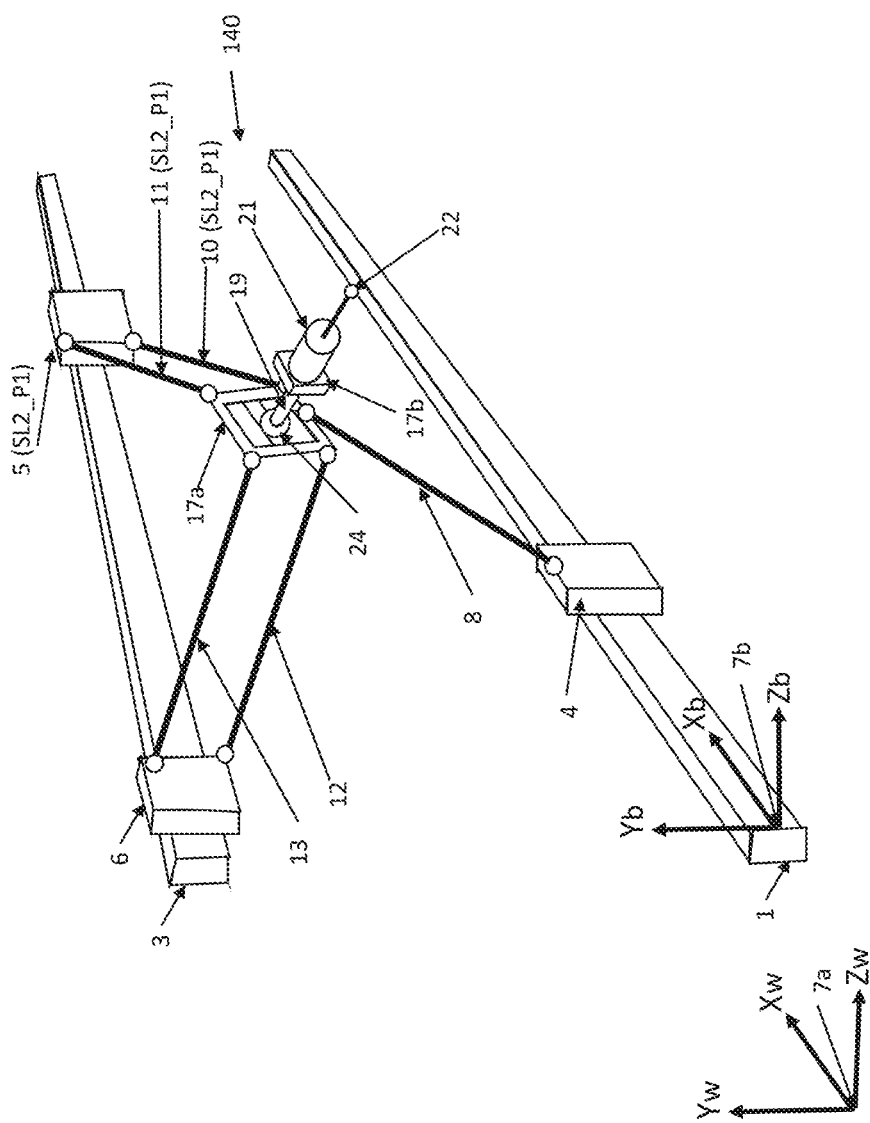
FIG. 15A illustrates a PKM with support linkages and two platforms, according to a further example embodiment with only five support links and only two linear guideways.

FIG. 15A also demonstrates the possibility to have two carriages (here the second carriage 5 and the third carriage 6) on the same path (here the third path 3), which means that only two paths are needed. However, this will reduce the workspace but is of interest for long narrow work objects. In the same way as the not constrained rotation axis of the support platform 17a can have different directions as for the concept in FIG. 14, the free rotation axis of the support platform in FIG. 15 can also be designed to be either parallel with the Xb-, Yb- or the Zb-axis of the base coordinate system.

In the embodiments of FIGS. 14A and 15A, the first support linkage SL1, the second support linkage SL2 and the third support linkage SL3 are configured to constrain movement of the support platform 17a in five degrees of freedom, DOF.

It is of course possible to remove two links and only use four links for the support platform 17a. The result would then be that a shaft joint 24 with one DOF will give the tool base shaft 19 three DOF to be controlled by three tool links. However, such a PKM will have a low stiffness and is typically of no interest for applications with large tool forces and/or tool torques.

Figure 16:
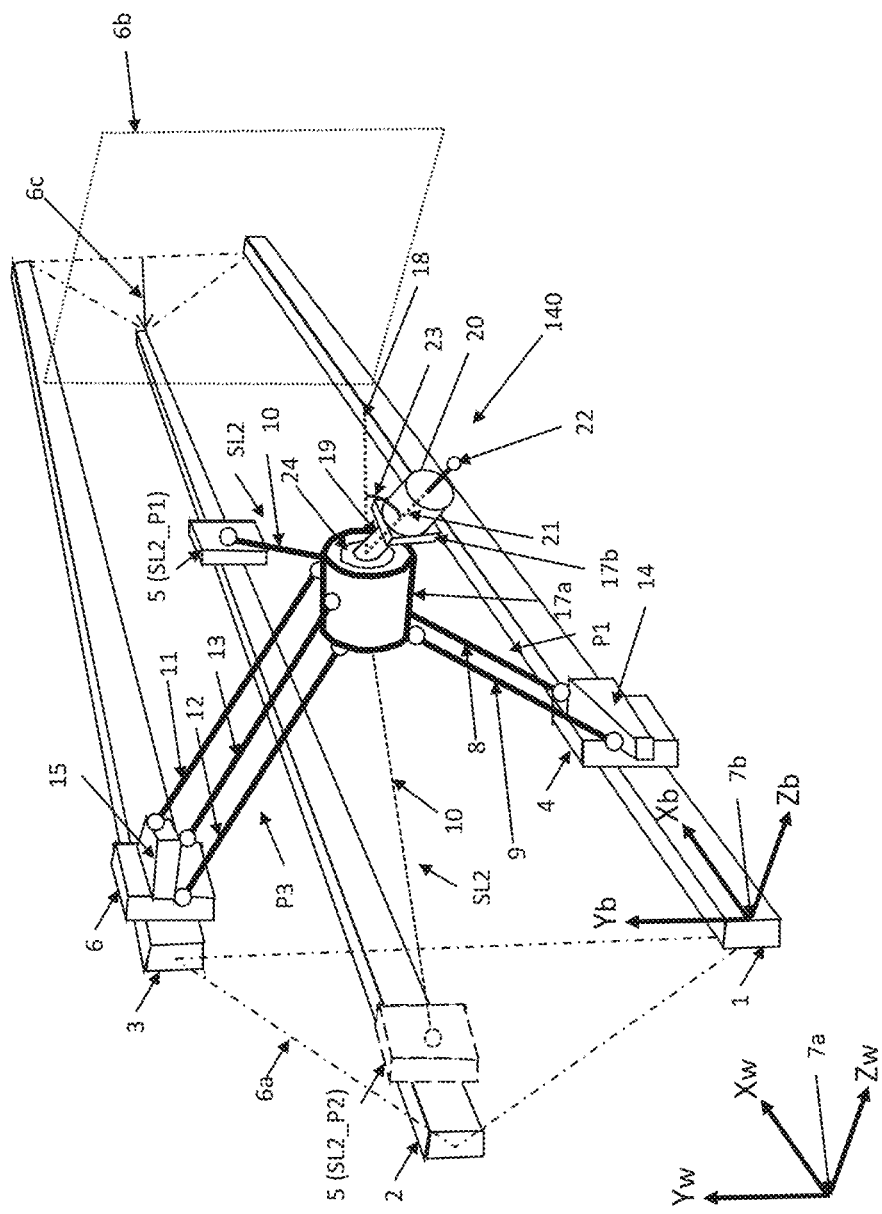
FIG. 16 illustrates a PKM with support linkages and two platforms, according to still another example embodiment with a different distribution of support links.

FIG. 16 illustrates a further alternative link configuration of the PKM. The PKM comprises six support links that are connected to the support platform 17a to constrain six DOF. However, the third support linkage SL3 now comprises three support links 11, 12 and 13, and the second support linkage SL2 comprises only one support link 10. The first support linkage SL1 still comprises two support links 8, 9. The support links of a support linkage are parallel and have the same length. This parallel kinematic structure has some advantages with respect to configuration control when in assembly mode P2b and with respect to control of platform rotation. It should be understood that any of the tool linkage arrangements as explained in the embodiments herein may be used in combination with the PKM in FIG. 16. Thus, the PKM in FIG. 16 is for example an alternative to the PKM illustrated in FIG. 1.

Figure 18:
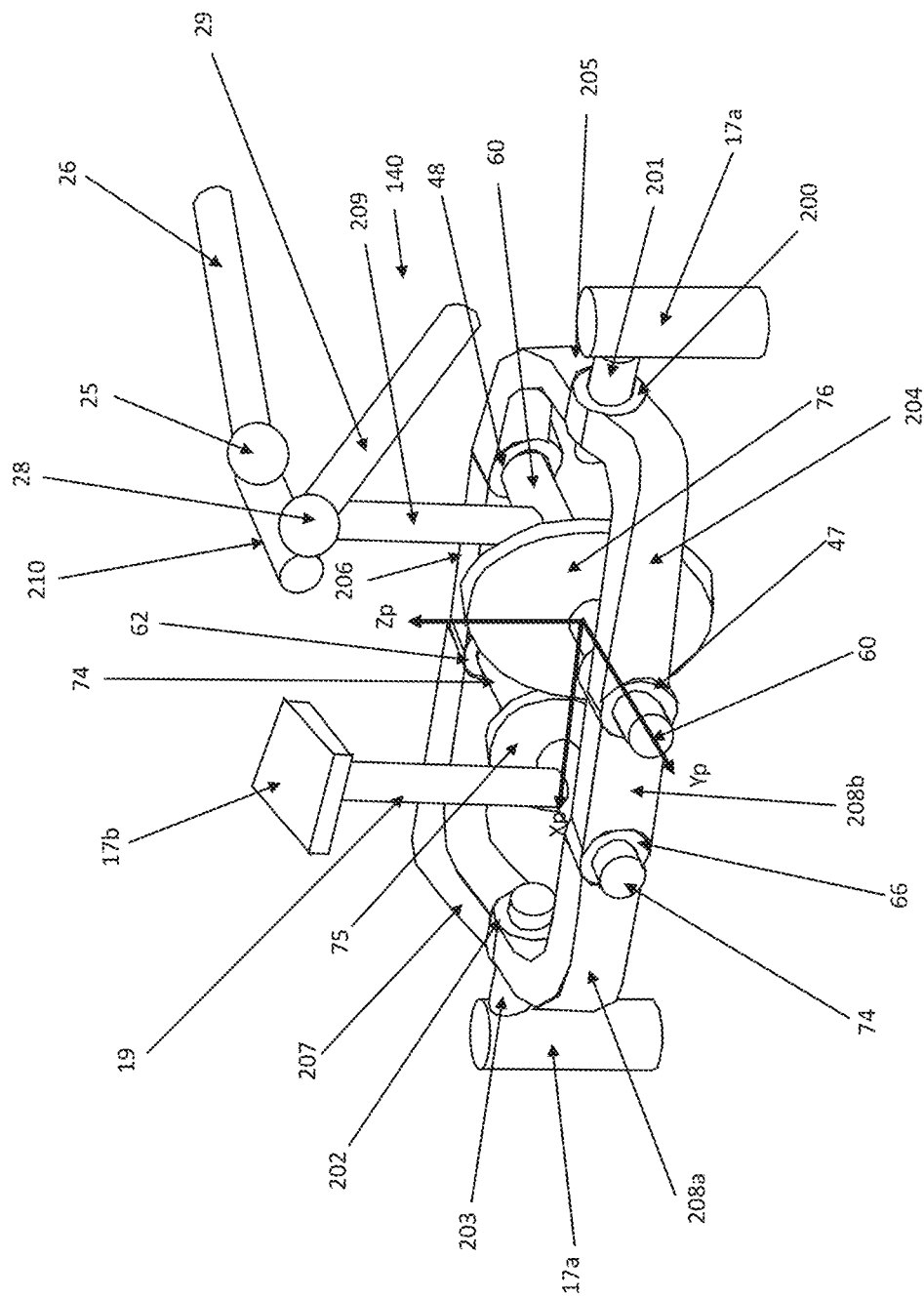
FIG. 18 illustrates a tool base according to an eight embodiment.

In the second embodiment of the shaft joint transmission assembly illustrated in FIG. 10, the first tool link 26 and the second tool link 29 are mounted on separate shafts, namely the second lever shaft 52 and the first lever shaft 51, respectively. In some cases, it is an advantage to have the tool links 26, 29 closer to each other and then sharing the same lever shaft. Such an arrangement is shown in FIG. 18, which illustrates a tool base according to an eighth embodiment. Here the first tool link 26 and the second tool link 29 are mounted on a common control lever shaft 209 via the first tool base joint 25 and the second tool base joint 28, respectively, and a bar 210. The first tool link 26 and the second tool link 29 are arranged to the bar 210 via the first tool base joint 25 and the second tool base joint 28, respectively, and the bar 210 is rigidly mounted between the common control lever shaft 209 and the first tool base joint 25 and the second tool base joint 28. The control lever shaft 209 is mounted on the first input shaft 60 with the ninth bearing 47 and the tenth bearing 48 in its ends. These bearings 47, 48 are mounted in a bracket formed by a first bracket beam 204, a second bracket beam 205, a third bracket beam 206, a fourth bracket beam 207, a fifth bracket beam 208*a* and a sixth bracket beam 208*b*. The bracket beams are rigidly mounted together and form a rectangular body with a through going hole in the middle. A first gear joint shaft 74 is also mounted on the bracket by means of the thirteenth bearing 62 and the fourteenth bearing 66. The first input shaft 60 and the first gear shaft 74 are parallel and include a gear transmission with the first gear wheel 76 mounted on the first input shaft 60 and the second gear wheel 75 mounted on first gear shaft 74. To obtain a gear ratio larger than one, the input first gear wheel 76 has a larger diameter than the output second gear wheel 75. The tool platform 17*b* is mounted on the first gear shaft 74 via the tool base shaft 19. Thus, by controlling the tool links 26, 29 in such a way that the control lever shaft 209 is rotated around the Yp-axis of the support platform coordinate system, then the tool base shaft 19 will rotate around the center axis of the first gear shaft 74 with a larger angle than the control lever shaft 209. When the control lever shaft 209 is controlled to rotate around the Xp-axis, the whole bracket will rotate around the common center axis of a nineteenth bearing 200 and a first mechanism bearing 202, which are mounted on the bracket. Thus, the one or more tool linkages TL1, TL2, TL3 are connected to the first input shaft 60 via the respective tool base joint 25, 28 and one or more lever shafts 209. The nineteenth bearing 200 is mounted on a ninth joint shaft 201, and the first mechanism 202 is mounted on a first mechanism shaft 203. The ninth joint shaft 201 and the first mechanism shaft 203 are in turn mounted on the support platform 17*a* (see previous figures). Thus, the shaft joint 24 here includes the first mechanism bearing 202 and the nineteenth bearing 200. The functionality is thus that when the control lever shaft 209 is controlled to rotate around the Xp- and Yp-axes, the tool platform 17*b* will tilt with magnification=1 around the Xp-axis and a magnification>1 around the Yp-axis. The Yp-axis is parallel with the rotational axis of the first input shaft 60. The Xp-axis is perpendicular to the Yp-axis, and parallel with a common rotational axis of the ninth joint shaft 201 and the first mechanism shaft 203.

Figure 19:
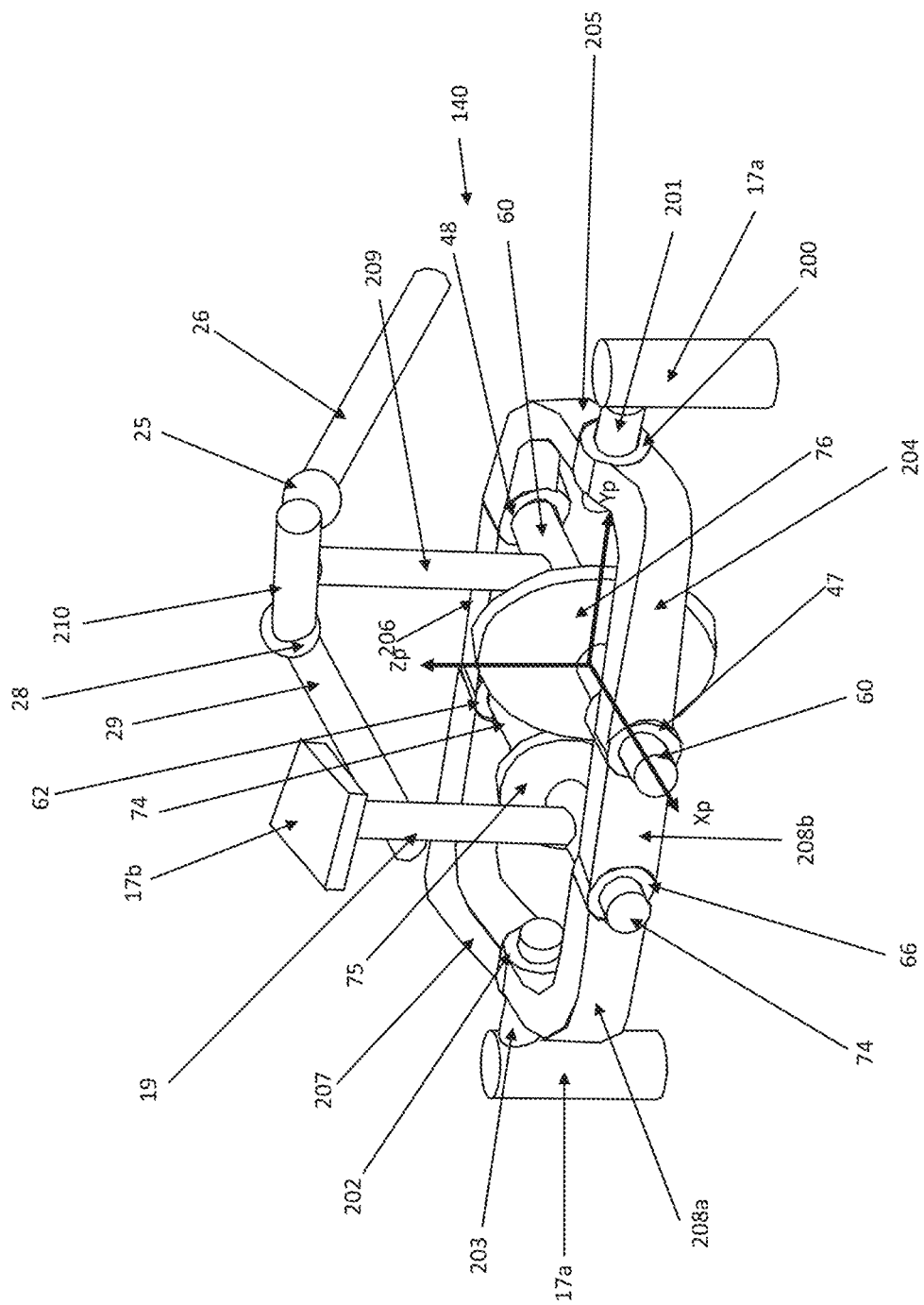
FIG. 19 illustrates a tool base according to a seventh embodiment.

FIG. 19 illustrates a tool base according to a seventh embodiment. FIG. 19 illustrates the same concept as in FIG. 18. The difference is that the magnification of the rotation of the control lever shaft 209 is now made around the Xp-axis instead of around the Yp-axis as in FIG. 18. Thus, the first input shaft 60 is now oriented in the Xp-direction and when the tool links 26, 29 are controlled to rotate the control lever shaft 209 around the Xp-axis, the tool base shaft 19 will be tilted with larger angle than the control lever shaft 209. When the control lever shaft 209 is rotated around the Yp-axis, the tool base shaft 19 will tilt with the same angle as the control lever shaft 209. Thus, in the FIGS. 18-19 the bracket is formed by a bracket assembly pivotally connected to the support platform 17*a* via two shafts 201, 203 to pivot around a first rotational axis (Xp-axis in the case shown in the figure, but could be any axis in the Xp/Yp-plane). The gearing wheels are pivotally connected to the bracket assembly via the first input shaft 60 to pivot around a second rotational axis (Yp-axis in the case shown in the figure), wherein the first rotational axis is perpendicular to the second rotational axis.

FIGS. 18 and 19 illustrate a concept for obtaining the same advantage with the tool links TL mountings as in FIG. 3 with the tool links 26, 29 mounted close to each other och a common control lever shaft 209 (corresponding to the tool shaft in FIG. 3). Thus, it may be possible to maintain full stiffness in the rotation around a first axis with +/−50 degrees range and simultaneously obtain large rotation (for example +/−100 degrees) around a second axis. For the second axis full stiffness is obtained all the way to the input shaft of the gear assembly and the only stiffness reduction is caused by the gear assembly, which can of course also be a backhoe as in FIG. 9. These features have been obtained by the following features, singly or in combination: a control lever shaft 209 for mounting of the tool base joints 25, 28 has been mounted on the first input shaft 60 of an assembly (gear or backhoe) that magnifies the rotation of the first input shaft 60; the first input shaft 60 and a first gear shaft 74 are mounted with bearings 47, 48 in a common structure, which in turn is mounted in the support structure with bearings 200, 202; the tool shaft 19 is mounted on the output shaft. When the control lever shaft 209 is rotated in a first direction, the input shaft 60 rotates relative the common structure and when the lever shaft is rotated in a second direction orthogonal to the first direction, the whole common structure will rotate around the shafts 201, 202 of the support structure.

Figure 20:
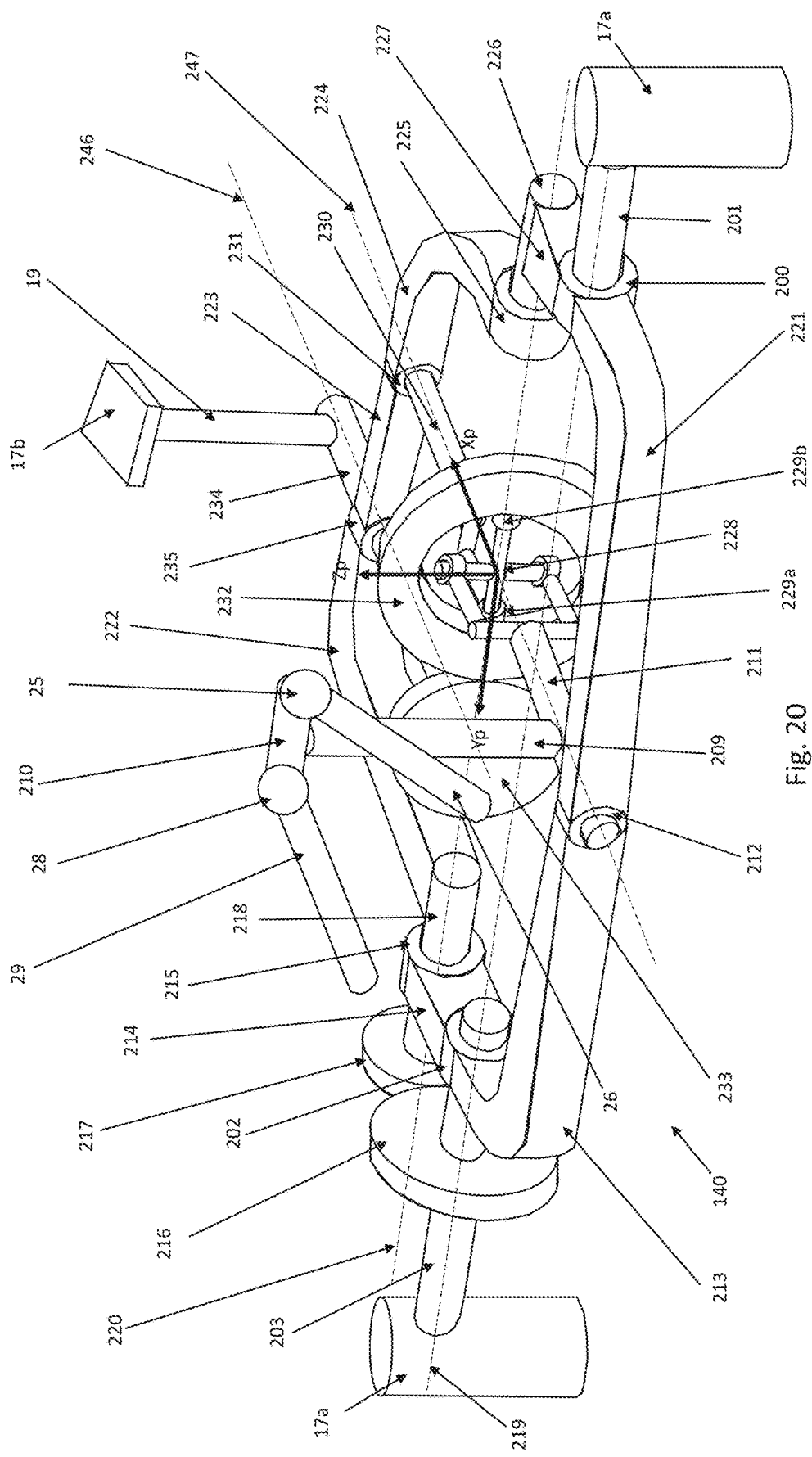
FIG. 20 illustrates a tool base according to an eight embodiment.

FIG. 20 illustrates a tool base according to an eight embodiment. In more detail, FIG. 20 illustrates a solution to obtain magnification of tilting of the control lever shaft 209 both around the Xp-axis and the Yp-axis. Thus, the control lever shaft 209 is mounted on a second input shaft 211 with a center of rotation along a hatched line 247, also referred to as another distal axis of rotation 247. The second input shaft 211 is mounted in a bracket comprising a seventh bracket beam 213 and an eight bracket beam 300 by means of a twenty-first bearing 212. The seventh bracket beam 213 and the eight bracket beam 300 are rigidly mounted to each other and when mounted have the shape of a U. The eight bracket beam 300 is mounted on the nineteenth bearing 200 and has an axis of rotation 219 (also referred to as proximal axis of rotation) parallel with the direction of Yp. The nineteenth bearing 200 is in turn mounted on the ninth joint shaft 201, which is mounted on the support platform 17*a* (see previous figures). The seventh bracket beam 213 is mounted on the first mechanism bearing 202, which has a rotation axis along hatched line 219, parallel with the direction of Yp. The first mechanism bearing 202 is mounted on the first mechanism shaft 203, which is mounted on the support platform 17*a*. A first gear wheel 216 is mounted on the first mechanism shaft 203, but it can also be mounted in other ways directly on the support platform 17*a*. The seventh bracket beam 213 is rigidly connected to a first support arm 214, in the figure via the outer ring of the first mechanism bearing 202 to simplify the drawing. The same drawing simplification is made for other bearings in the figure. A second mechanism bearing 215 is mounted at the end of the first support arm 214. The rotational axis of the second mechanism bearing 215 is given by the hatched line 220, referred to as a distal axis of rotation, which is parallel with the hatched line 219. A second mechanism shaft 218 is mounted in the second mechanism bearing 215 and the second mechanism shaft 218 is made to rotate by the second gear wheel 217, which is engaged by the first gear wheel 216. The second mechanism shaft 218 is connected to a tenth bracket beam 222, on which another second mechanism bearing 235 with another proximal axis of rotation 246 is mounted. Another second mechanism shaft 234 is mounted into the other second mechanism bearing 235 and is rotated with the other proximal axis of rotation 246 by means of the third gear wheel 233. The tool base shaft 19 supporting the tool platform 17*b* is mounted on the other second mechanism shaft 234. The other second mechanism bearing 235 is connected to a twenty-fourth bearing 225 by means of a fifth bracket beam 223 and a sixth bracket beam 224. The rotation axis of twenty-fourth bearing 225, thus the distal axis of rotation, is denoted 220 and the twenty-fourth bearing 225 is mounted on a fourteenth joint shaft 226, which is rigidly connected to the eighth bracket beam 300 via a seventh bracket beam 227. The bracket beams or arm parts 300, 213, 214, 227 together form one bracket, and the bracket beams 222, 224 together make up another bracket.

The second input shaft 211 is connected to a cardan joint 228, which is in turn connected to a fifteenth joint shaft 230, which is mounted in the twenty-fifth bearing 231 with the other proximal axis of rotation 246. The twenty-fifth bearing 231 is mounted between the fifth bracket beam 223 and the sixth bracket beam 224. A twenty-sixth bearing 229*a* and a twenty-seventh bearing 229*b* are mounted on an inner ring of a fourth gear wheel 232 and the fifteenth joint shaft 230 is connected either directly to the fourth gear wheel 232 or to the twenty-sixth bearing 229*a* and to the twenty-seventh bearing 229*b*. The fourth gear wheel 232 engages the third gear wheel 233.

Now, controlling the actuated tool links 26 and 29 in such a way that control lever shaft 209 is rotated around the Xp-axis, the second input shaft 211 will rotate and thus also the fourth gear wheel 232 via the cardan joint 228. The axis of rotation of the fourth gear wheel 232 is controlled by the fifteenth joint shaft 230. The fourth gear wheel 232 will make the third gear wheel 233 to rotate and will thus change the tilting angle of the tool base shaft 19. Since the input fourth gear wheel 232 has a larger diameter than the output third gear wheel 233, the induced tilting angle of the tool base shaft 19 will be larger than the controlled tilting angle of the control lever shaft 209.

Now, assume that the control lever shaft 209 is controlled to rotate around an axis parallel with the Yp-axis. Then the bracket formed by the seventh bracket beam 213 and the parts 214, 300, 227 will rotate around the proximal axis of rotation axis 219 by means of the nineteenth bearing 200 and the first mechanism bearing 202. If, for example, the rotation is made in such a way that the second mechanism bearing 215 is moved in the negative Zp-direction (downwards in the figure), then the second gear wheel 217 will rotate clockwise around the Yp-axis and the other second mechanism bearing 235 and the twenty-fifth bearing 231 will move further in the negative Zp-direction. The result will thus be that the other second mechanism shaft 234 and the fifteenth joint shaft 230 are rotated around the distal axis of rotation 220 making the fourth gear wheel 232 and the third gear wheel 232 to rotate around the distal axis of rotation 220. However, because of the cardan joint 228, the second input shaft 211 can still rotate the fourth gear wheel 232 around the fifteenth joint shaft 230. Since the other second mechanism shaft 234 is rotated around the distal axis of rotation 220, the tool base shaft 19 and the tool platform 17*b* will also rotate around the distal axis of rotation 220. In relation to the support platform 17*a*, the tool base shaft 19 will however be rotated with the sum of the rotation of the control lever shaft 209 around the proximal axis of rotation 219 and the other second mechanism shaft 234 around the distal axis of rotation 220.

Thus, FIG. 20 illustrates a parallel kinematic solution, making it possible to connect both tool base joints 25, 28 to the common control lever shaft 209. The functionality is obtained based on the previously mentioned features of having a control lever shaft 209 for mounting of the tool base joints 25 and 28 mounted on a second input shaft 211 of an assembly (gear or backhoe) that magnifies the rotation of the second input shaft 211. The second input shaft 211 and an output shaft 234 are mounted with bearings 231, 235 in a common structure 227, 223, 224, which in turn is mounted in a support structure 213, 214, 221, 227, 223, 224 with bearings 200, 202. The tool shaft 19 is mounted on the second mechanism shaft 234. In order to get parallel amplification of 2 DOF, the support structure is divided into two support structures, connected with at least one bearing (215). A first support structure 213, 214, 221, 227 is mounted on the support platform 17*a* with bearings 200, 202. The second support structure is mounted on the first support structure with the bearings 215, 225. The second support structure is tilted relative the first support structure by means of a transmission (gear or link), where the input to the transmission (first mechanism shaft 203 with first gear wheel 216 in the figure) is fixedly mounted on the support platform 17*a*. Moreover, the second input shaft 211 is connected to the second support structure via a transmission that can transfer a rotation at an angle to the tool platform 17*b*, for example a cardan joint or a link arrangement.

Figure 21:
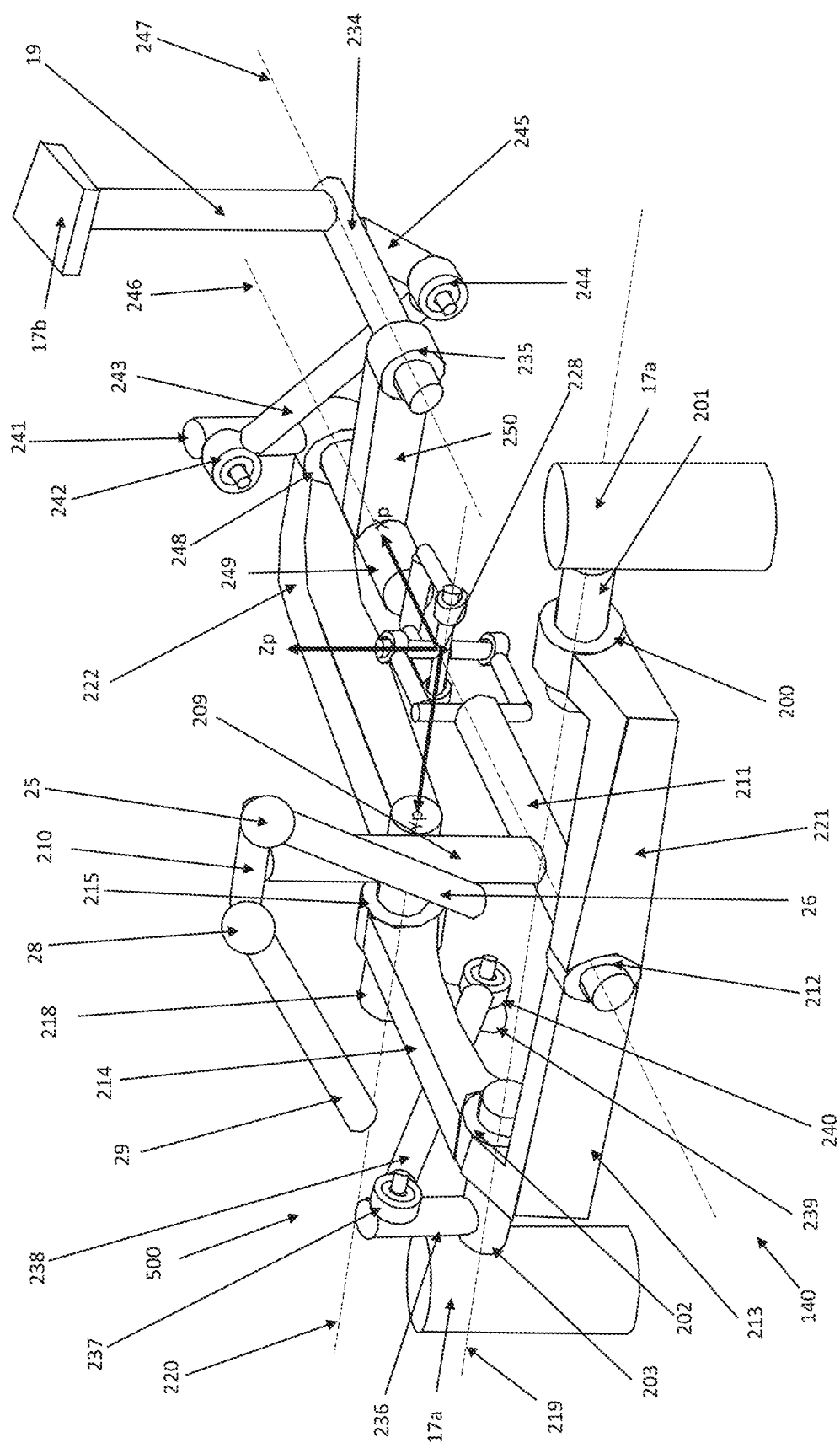
FIG. 21 illustrates a tool base according to a ninth embodiment.

FIG. 21 illustrates a tool base according to a ninth embodiment. FIG. 21 shows the possibility to replace the gears in the previous figures with simple link transmissions that will be further explained in connection with the following figures, especially FIG. 24. If the control lever shaft 209 is controlled to rotate around an axis parallel with the Yp-axis, the bracket beams 300, 213 and the first support arm 214 will be rotated around the proximal axis of rotation 219 as defined by the nineteenth bearing 200 and the first mechanism bearing 202. The ninth joint shaft 201 of nineteenth bearing 200 is mounted on the support platform 17*a* and the first mechanism shaft 203 of first mechanism bearing 202 is also mounted on the support platform 17*a*. A first mechanism link 238 is rigidly connected to the support platform 17*a* via a first gearing bearing 237. In the figure the first gearing bearing 237 is mounted on a first mechanism lever arm 236, which is mounted on the first mechanism shaft 203, which is mounted on the support platform 17*a*. In the other end the first mechanism link 238 is mounted via a second gearing bearing 240 on a second mechanism lever arm 239. The first mechanism lever arm 239 is mounted on the second mechanism shaft 218, which is mounted in the second mechanism bearing 215. The tenth bracket beam 222 is mounted on the second mechanism shaft 218. Now, assume that the first support arm 214 connecting the first mechanism bearing 202 with the second mechanism bearing 215 is rotated around the proximal axis of rotation 219 in such a way that the second mechanism bearing 215 is moved upwards in the figure. Then the first mechanism link 238 will force the tenth bracket beam 222 to move upwards by rotating around the distal axis of rotation 220. In relation to the support platform 17*a*, the tenth bracket beam 222 will rotate the sum of the rotations around the axes of rotation 219 and 220. Since the tenth bracket beam 222 is connected to the tool platform 17*b* via another mechanism comprising another first mechanism bearing 248, a sixteenth joint shaft 249, a fourth shaft 250, the other second mechanism bearing 235, the other second mechanism shaft 234 (in parallel with another first mechanism link 243), and the tool base shaft 19, the tool platform 17*b* will be rotated as the sum of the rotation of the control lever shaft 209 and the rotation of the second mechanism shaft 218. If for example the control lever shaft 209 is rotated 50 degrees and the link arrangement 236-239 is designed to give additional 50 degrees of rotation, the tool platform 17*b* can be tilted 100 degrees around an axis parallel with the Yp-axis.

Now, if the tool links 26, 29 are controlled to rotate the control lever shaft 209 around the Xp-axis, the second input shaft 211 will rotate the sixteenth joint shaft 249 via the cardan joint 228. When the sixteenth joint shaft 249 is rotated the fourth shaft 250 will swing and because of the other first mechanism link 243 the other second mechanism shaft 234 will rotate around the other distal axis of rotation 247. However, the other second mechanism shaft 234 will also rotate around the other proximal axis of rotation 246 and in total the tool base shaft 19 and the tool platform 17b will rotate with the sum of the rotation of sixteenth joint shaft 249 relative the support platform 17a and the rotation of other second mechanism shaft 234 relative the fourth shaft 250. The other first mechanism link 243 is mounted on one side on a fifth shaft 241 via a thirty-first bearing 242. The fifth shaft 241 is rigidly mounted on the tenth bracket beam 222, in the figure via the outer ring of the other first mechanism bearing 248. On the other side the other first mechanism link 243 is mounted on the sixth shaft 245 via a thirty-second bearing 244. The sixth shaft 245 is mounted on the other second mechanism shaft 234, which is mounted in the other second mechanism bearing 235. Thus, rotating the fourth shaft 250, for example downwards, will rotate the other second mechanism shaft 234 around the other distal axis of rotation 247 (which is parallel with the Xp-axis) in the same direction as the sixteenth joint shaft 249.

Thus, FIG. 21 has the same basic structure as FIG. 20, but here the gear wheels have been replaced with links 238, 243. Important features are that these links are mounted with levers 236/239 and 241/245 that are at different directions relative to the links. This means that the joints 237 and 240 are on opposite sides of a plane defined by the rotation centers of the bearings 202 and 215 and that the joints 242 and 244 are on opposite sides of a plane defined by the rotation centers of the bearings 248 and 235. The input lever is fixedly mounted on the foregoing structure, meaning the support platform 17a for the first mechanism lever arm 236 and the second support structure (here tenth bracket beam 222) for the second mechanism lever arm 241. The functionality obtained with this is that the rotation of the tool shaft 19 around axes 219 and 220 will be the sum of the rotations of the foregoing structure and the next structure. In the same way the rotation of the tool shaft 19 around the axes 246 and 247 is the sum of the rotations of the shaft 211 and the shaft 234. The rotation of the foregoing structure 213, 222 is the rotation of the control lever shaft 209 around the axis 219 and the rotation of the shaft 211 is the rotation of the control lever shaft 209 around the axis 246.

Figure 22:
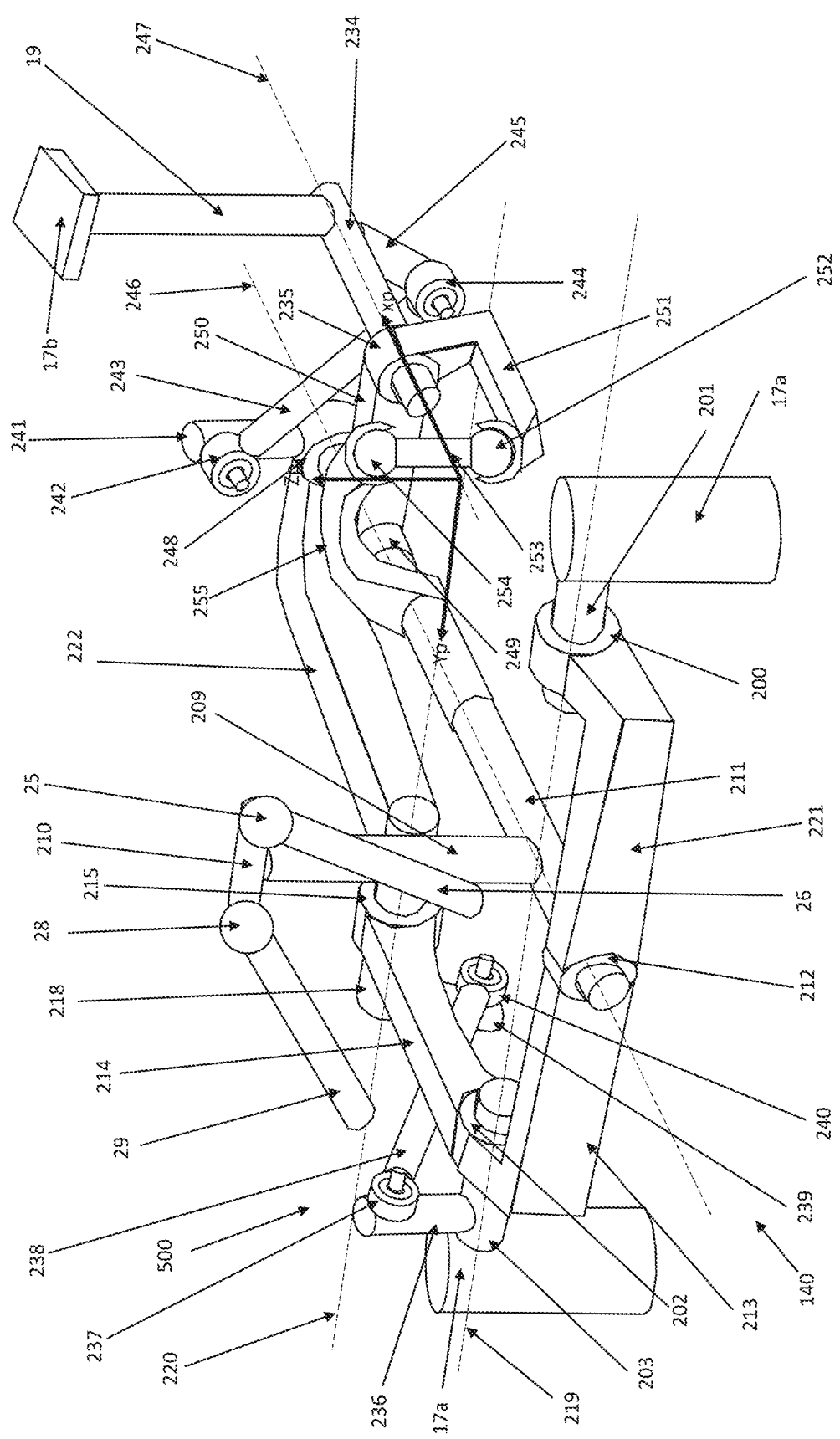
FIG. 22 illustrates a tool base according to a tenth embodiment.

FIG. 22 illustrates a tool base according to a tenth embodiment. FIG. 22 shows the same basic structure as in FIG. 21, with the difference that the cardan joint 228 has been replaced by a link transmission. Thus, rotation of the second input shaft 211 will move a thereto connected link 253 up or down and thus rotate the fourth shaft 250 around the other proximal axis of rotation 246. The link 253 has a joint in each end with an upper joint 254 mounted on a fourth lever shaft 255 and a lower joint 252 mounted on a beam 251. The beam 251 is mounted on the fourth shaft 250 (in the figure via the outer ring of the thirty-second bearing 244). Generally, in the FIGS. 20-23 the bracket is formed by a bracket assembly pivotally connected to the support platform 17a via two shafts 201, 203 to pivot around a first rotational axis, here a proximal axis of rotation 219 (parallel with the Yp-axis in the case shown in the figure). The link transmission is pivotally connected to the bracket assembly via a second input shaft 211 to pivot around a second rotational axis, here another proximal axis of rotation 246 (parallel with the Xp-axis in the case shown in the figure), wherein the first rotational axis is perpendicular to the second rotational axis.

Figure 23A:
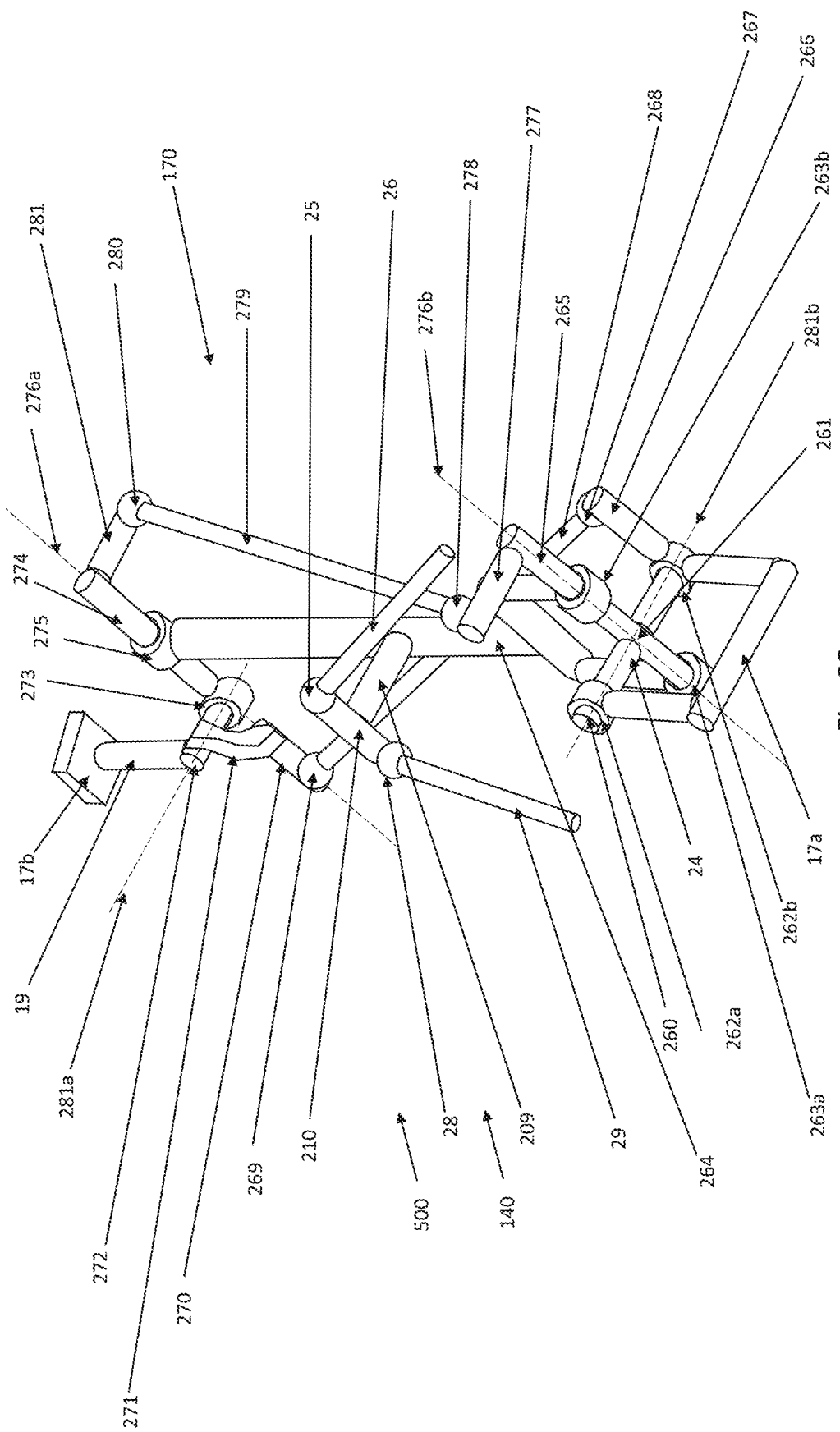
FIG. 23a illustrates a tool base according to an eleventh embodiment.

FIG. 23a illustrates a tool base 140 according to an eleventh embodiment. FIG. 23a illustrates the possibility to connect two modules of the type illustrated in FIG. 24 in parallel. Thus, a mechanism link 268 and another mechanism link 279 in FIG. 23a have the same function as first mechanism link 238 in FIG. 24. A thirty-third bearing 262a and a thirty-fourth bearing 262b of a cardan joint cross 261 of a cardan joint are connected to the support platform 17a (or in the general case a robot arm). The cardan joint arrangement with the bearing pairs 262 a,b and 263a,b is used to obtain high stiffness. However, it is of course possible to use only two bearings to obtain the rotation axes 276b and 281b. The thirty-third bearing 262a and a thirty-fourth bearing 262b may also be referred to as first mechanism bearings. The thirty-third bearing 262a and the thirty-fourth bearing 262b are here included in the shaft joint 24. The mechanism link 268 is connected to a shaft 260 via a first gearing joint 267, the arm 266 and the outer ring of the thirty-fourth bearing 262b. This corresponds to the first mechanism link 238, the first gearing bearing 237 and the first mechanism lever arm 236 in FIG. 24. The other end of mechanism link 268 is connected to the link combination 270-271 (compare with second mechanism lever arm 239 in FIG. 23a and FIG. 23b) via the second gearing joint 269 (compare with second gearing bearing 240 in FIG. 23a and FIG. 23b). Actuating the tool links 26 and 29 to rotate a first support arm 264 (via the control lever shaft 209, a twenty-eight bearing 263a and twenty-ninth bearing 263b and the cardan cross) around a first proximal axis of rotation 281b (defined by the thirty-third bearing 262a and thirty-fourth bearing 262b) will rotate the tool platform 17b and the tool base shaft 19 around the first proximal axis of rotation 281b. Simultaneously the mechanism link 268 will rotate a first distal shaft 272 via the link combination 270-271 and thus rotate the tool base shaft 19 and the tool platform 17b also around a first distal axis of rotation 281a. Thus, the tool base shaft 19 with the tool platform 17b will rotate as the sum of the rotations around the axes of rotations 281a and 281b.

To obtain one more degree of freedom, an eighteenth joint shaft 265, which is an elongation one of the cross shafts of the cardan joint 261, is used to mount an arm 277. The other mechanism link 279 has another first gearing joint 278 and another second gearing joint 280 in each end, respectively, the other first gearing joint 278 is connected to the arm 277 and the other second gearing joint 280 to an arm 281. Another arm 282 is mounted on a second distal shaft 274, which is mounted on the first support arm 264 by means of another second mechanism bearing 275. The tool platform 17b is connected to the second distal shaft 274 via the tool base shaft 19, a twentieth joint shaft 271 and a thirty-sixth bearing 273. Now, if the tool links 26, 29 are controlled to rotate the first support arm 264 around the second proximal axis of rotation 276b, the tool platform 17b will be rotated around both a second distal axis of rotation 276a and the second proximal axis of rotation 276b and the rotations are added. This structure is most useful in applications where rotations are made separately in the two degrees of freedom. In other words, the shaft joint 24 defines a first proximal axis of rotation 281b and a second proximal axis of rotation 276b that is perpendicular to the first proximal axis of rotation 281b.

The tool base 140 further comprises a first distal shaft 272 defining a first distal axis of rotation 281a. The tool base 140 also comprises a second distal shaft 274 defining a second distal axis of rotation 276a being perpendicular to the first distal axis of rotation 281a. The tool base shaft 19 is arranged to rotate with movement of the first distal shaft 272 around the first distal axis of rotation 281a and with movement of the second distal shaft 274 around the second distal axis of rotation 276a. The tool base 140 further comprises the first support arm 264 pivotally connecting the shaft joint 24 with the first distal shaft 272 and the second distal shaft 274. The tool base 140 also comprises a first gearing linkage 266, 267, 268, 269, 270 connected between the shaft joint 24 and the first distal shaft 272 arranged to transfer rotation of the first support arm 264 around the first proximal axis of rotation 281b to a correspondingly increased rotational movement of the tool base shaft 19 around the first distal axis of rotation 281a. The tool base 140 further comprises a second gearing linkage 277, 278, 279, 280, 281 connected between the shaft joint 24 and the second distal shaft 274 arranged to transfer rotation of the first support arm 264 around the second proximal axis of rotation 276b to a correspondingly increased rotational movement of the tool base shaft 19 around the second distal axis of rotation 276a. Thus, increased rotational movement in two DOF is achieved.

As illustrated in FIG. 23a, each of the first gearing linkage 266, 267, 268, 269 and the second gearing linkage 277, 278, 279, 280, 281 comprises a pair of a first gearing joint 267, 278 and a second gearing joint 269, 280, a mechanism link 268, 279 and a mechanism lever 270, 281. The mechanism link 268, 279 is connected at each end to one of the first gearing joint 267, 278 and the second gearing joint 269, 280. The first gearing joint 267, 278 is connected to the shaft joint 24 at a distance from the first proximal axis of rotation 281b. The second gearing joint 269, 280 is connected to the first distal shaft 272 or the second distal shaft 274 via the mechanism lever 270, 281. The first gearing joint 267, 278 and the second gearing joint 269, 280 of each pair are arranged at different sides of a plane defined by the first distal axis of rotation 281a and the first proximal axis of rotation 281b, or a plane defined by the second distal axis of rotation 276a and the second proximal axis of rotation 276b, respectively. In other words, if the first gearing joint 267 is arranged at a first side of the plane defined by the first distal axis of rotation 281a and the first proximal axis of rotation 281b, the second gearing joint 269 is arranged at the other side of the plane. If the other first gearing joint 278 is arranged at a first side of a plane defined by the second distal axis of rotation 276a and the second proximal axis of rotation 276b, the other second gearing joint 280 is arranged on the other side of the same plane. The gearing mechanism 500 in FIG. 23a may be complemented with one or more of the embodiments of the gearing mechanisms that are illustrated in FIGS. 24-30, and that will be explained in the coming text.

Figure 23B:
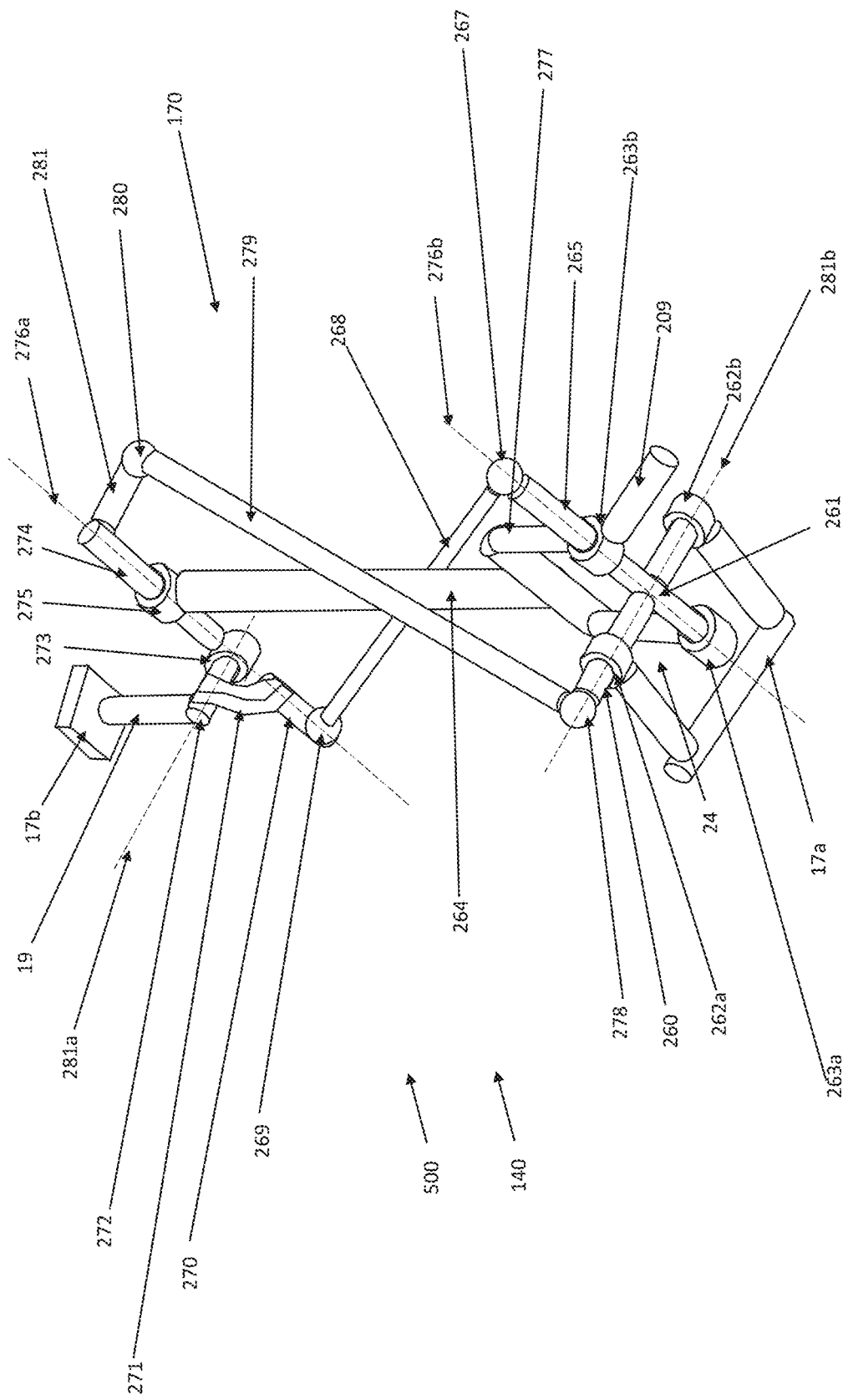

FIG. 23b shows an alternative version of FIG. 23a, where the gearing joints 267 and 278 have been moved to be mounted on positions on the axes of rotations 276b and 281b, respectively. In this way the coupling between the rotations around the axes of rotation 276b and 281b will be reduced. The figure also shows the possibility to mount the control lever shaft 209 on one of the bearings 263a and 263b, which will avoid collisions between the control lever shaft 209 and the mechanism links 268 and 279. The cardan joint cross 261 is here mounted at 90 degrees relative to the support platform 17a, which means that the rotation of the tool platform 17b will have an offset of 90 degrees relative the design in FIG. 23a. For clarity of the figure, the tool links 26 and 29 have not been illustrated in FIG. 23b but are of course included to control the movement of tool platform 17b.

Figure 24:
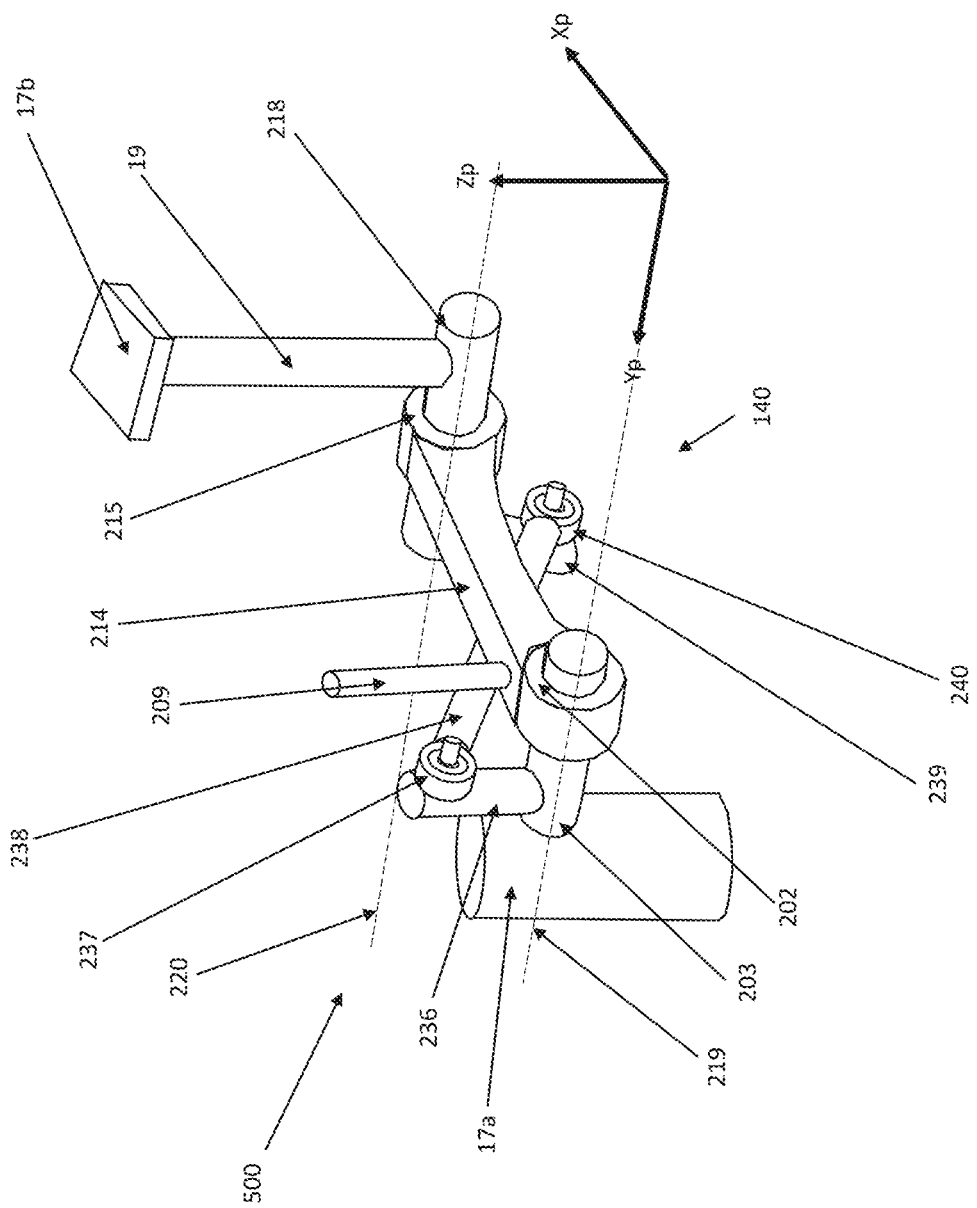
FIG. 24 illustrates a tool base according to a twelfth embodiment.

FIG. 24 illustrates a tool base 140 according to a twelfth embodiment. More in detail, FIG. 24 illustrates a basic module, comprising a shaft joint transmission assembly with a gearing mechanism 500, used to obtain the magnification of the rotation of the control lever shaft 209 in the embodiments illustrated in previous FIGS. 21 to 23, in isolation. In some embodiments, the gearing mechanism 500 exchanges the previously used gearing mechanism including gear wheels 216, 217 in FIGS. 18-20. It should be understood that the first mechanism shaft 203 is fixed to the support platform 17a as previously explained, or other previous mechanical system. The first support arm 214 is configured to rotate around the first mechanism shaft 203 by means of the first mechanism bearing 202. In the other end the first support arm 214 has the second mechanism bearing 215, in which the second mechanism shaft 218 is mounted. On the first mechanism shaft 203, a first mechanism lever arm 236 is mounted and a corresponding second mechanism lever arm 239 is mounted on the second mechanism shaft 218. Between the first and second mechanism lever arms 236, 239, a first mechanism link 238 with the first gearing bearing 237 and the second gearing bearing 240 is mounted. The first and second mechanism lever arms 236, 239 are mounted in different directions in relation to the first mechanism link 238. Rotating the first support arm 214 will rotate the second mechanism shaft 218 with a larger angle than the first support arm 214 is rotated. Thus, in other words, the gearing mechanism 500 comprises the first support arm 214, the first mechanism bearing 202 and the second mechanism bearing 215 connected by the first support arm 214. The first mechanism shaft 203 defines a proximal axis of rotation 219. The first mechanism bearing 202 is mounted to the first mechanism shaft 203. The first mechanism shaft 203 is rigidly connected to the support platform 17a. The second mechanism shaft 218 defines a distal axis of rotation 220. The second mechanism bearing 215 is mounted to the second mechanism shaft 218. A gearing linkage connects the first mechanism shaft 203 to the second mechanism shaft 218. The gearing linkage comprises a first gearing joint, here a first gearing bearing 237, a second gearing joint, here a second gearing bearing 240, and a mechanism link 238. The mechanism link 238 is connected to the support platform 17a via the first gearing bearing 237 and is connected to the second mechanism shaft 218 via the second gearing bearing 240. The first gearing bearing 237 and the second gearing bearing 240 are arranged at different sides of a plane defined by the proximal axis of rotation 219 and the distal axis of rotation 220. The gearing mechanism 500 is arranged to transfer rotation of the first support arm 214 around the proximal axis of rotation 219 to a correspondingly increased rotational movement around the distal axis of rotation 220 in a same direction as the first support arm 214, of the tool base shaft (19).

Besides using only a single module of the type shown in FIG. 24, two or three of these modules can be connected to obtain a wrist with 2 or 3 degrees of freedom. They can be oriented in different directions in relation to a support platform, a robot arm or robot arm system. Thus, the proximal axis of rotation 219 can be parallel with either the Xp-, Yp- or Zp-axis. To further increase the rotation magnification two or more of the modules can be connected in series and then with the proximal axis of rotation 219 parallel for the two modules. The first mechanism lever arm 236 of the second module is mounted on the first support arm 214 of the first module. In this case the second module can also be mounted in the opposite direction of the first module. However, it is then necessary that the first mechanism lever arm 236 and the second mechanism lever arm 239 of the first module are mounted to be at the same side of the first mechanism link 238. Another way to increase the rotation capability is to make a more elaborate link system, replacing the first mechanism link 238 with a link system, such as, for example, a backhoe mechanism.

Figure 25:
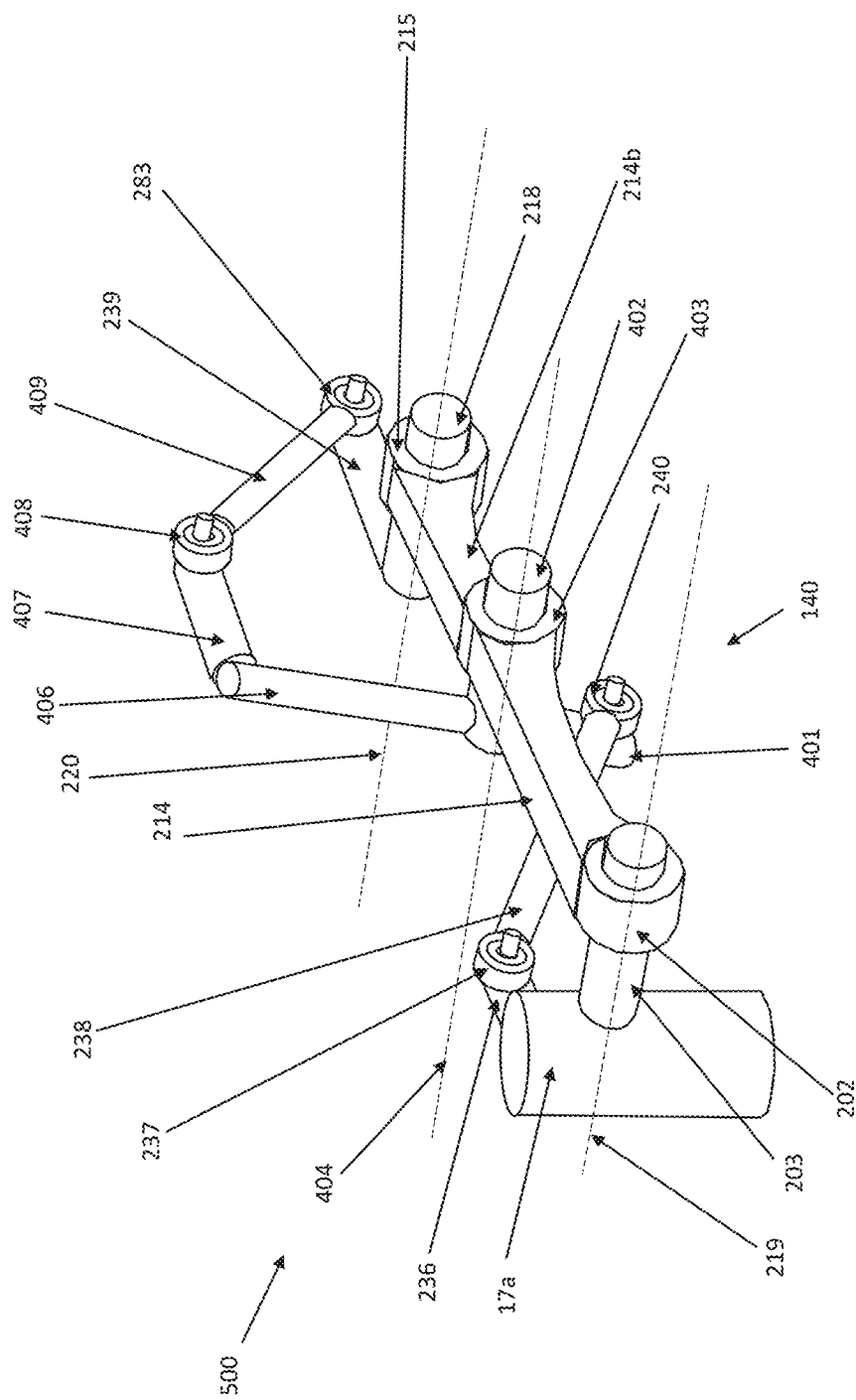
FIG. 25 illustrates a tool base according to a thirteenth embodiment.

FIG. 25 illustrates a tool base 140 according to a thirteenth embodiment. FIG. 25 illustrates another way to increase the rotation magnification of a module of the type shown in FIG. 24. Here an intermediate axis shaft, referred to as a third mechanism shaft 402, has been placed between the first mechanism shaft 203 and the second mechanism shaft 218. The third mechanism shaft 402 is mounted in a third mechanism bearing 403, which is mounted on the first support arm 214. Between the new third mechanism bearing 403 and the second mechanism bearing 215 a new second support arm 214b is mounted. The first support arm 214 is thus supplemented with a second support arm 214b. Actually, the first support arm 214 and the second support arm 214b form a common support arm with three bearings 202, 403 and 215. As before, the first mechanism shaft 203 is mounted on the support platform or a robot arm and the same with the first gearing bearing 237, which in the figure is mounted on a first mechanism lever arm 236, which is supposed to be mounted directly on the support platform 17a or a robot arm. A lever arm 401 is now mounted on the third mechanism shaft 402, which will thus rotate when the first support arm 214 plus the second support arm 214b is rotated around the fixed first mechanism shaft 203. A lever arm with the beams 406 and 407 are mounted on the third mechanism shaft 402 (preferably, 401+406+407 is a common mechanical structure). A first link bearing 408 is mounted on the lever arm part 407 and is connected to the second mechanism lever arm 239 via a link 409 and a bearing 283. Now, when rotating the arms 214+214b around the proximal axis of rotation 219, for example clockwise, the third mechanism shaft 402 will rotate clockwise around a third distal axis of rotation 404, meaning that the third mechanism shaft 402 will rotate in relation to the fixed first mechanism shaft 203 as the sum of the rotation of the arms 214+214b around the fixed first mechanism shaft 203 and the rotation of the third mechanism shaft 402 around the arms 214+214b. Now, the link arrangement formed by the components 406, 407, 408, 409, 283 and 239 form a backhoe arrangement, which amplifies the rotation of the third mechanism shaft 402 in relation to the arms 214+214b. Thus, the rotation of the second mechanism shaft 218, also referred to as an output shaft, in relation to the fixed first mechanism shaft 203, will be the sum of the rotation of the arms 214+214b around the fixed first mechanism shaft 203 and the backhoe magnified rotation of the third mechanism shaft 402 around the arms 214+214b. With a rotation of the arms 214+214b of +/−50 degrees it will then be possible to obtain a rotation of the output shaft of up to +/−140 degrees. In other words, the gearing mechanism 500 includes a third mechanism shaft 402 defining another distal axis of rotation 404, and a third mechanism bearing 403.

Figure 26:
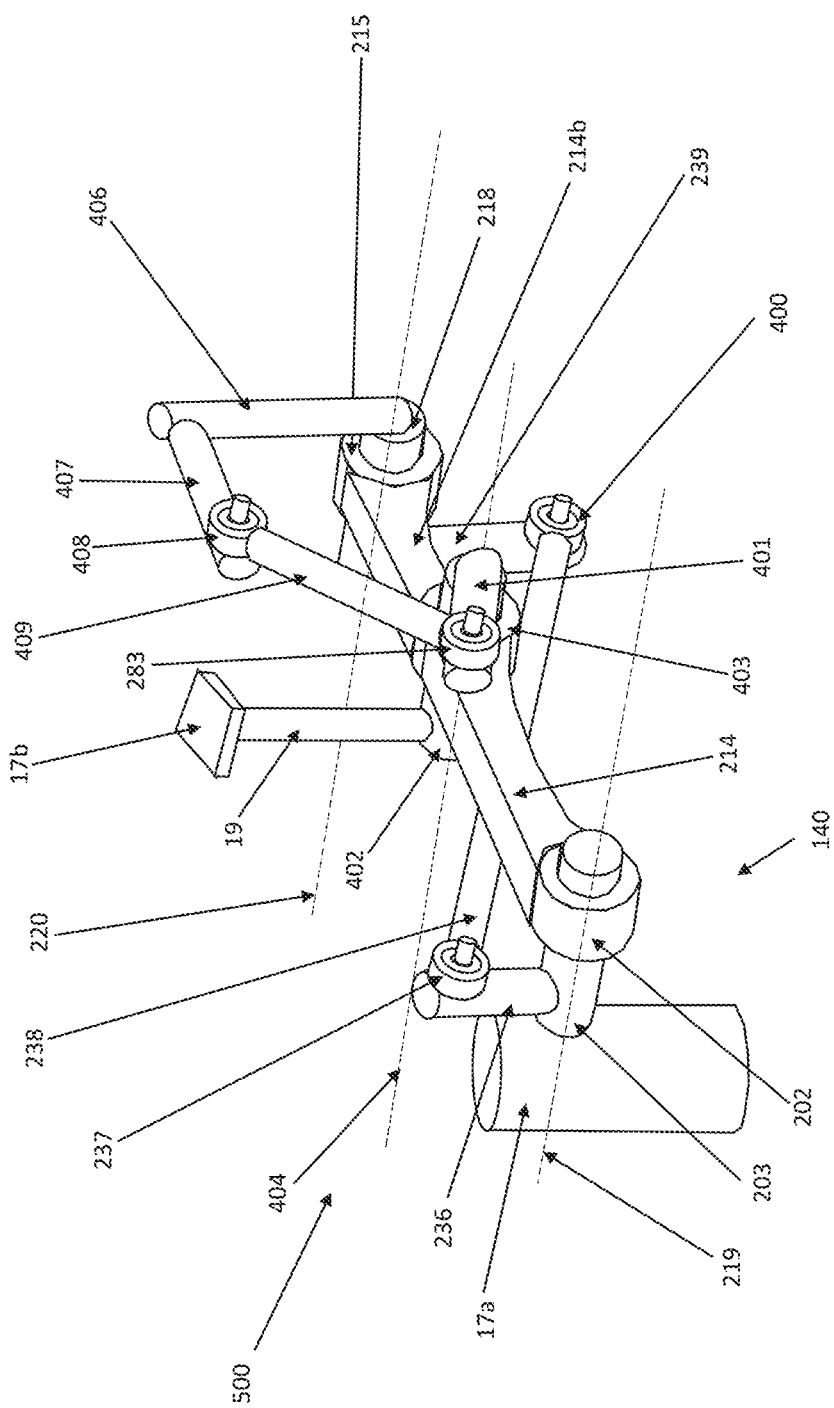
FIG. 26 illustrates a tool base according to a fourteenth embodiment.

The third mechanism shaft 402 is connected via the third mechanism bearing 403 to the first support arm 214. The first support arm 214 is supplemented with a second support arm 214b. The third mechanism bearing 403 is mounted on the first support arm 214 and the second mechanism bearing 215 is mounted on the second support arm 214b. The second support arm 214b is mounted on the first support arm 214. The links 238, 406, 407, 409, 239 connect the first support arm 214 via the third mechanism bearing 403 and the third mechanism shaft 402, with the second mechanism shaft 218. The first support arm 214 and the second support arm 214b are rigidly mounted to each other FIG. 26 illustrates a tool base 140 according to a fourteenth embodiment. FIG. 26 illustrates the possibility to make the third mechanism shaft 402 to an output shaft instead of the second mechanism shaft 218 as in FIG. 25. Thus, the backhoe linkage 406-401 is now working in the direction from second mechanism shaft 218 to third mechanism shaft 402. This also implies that the first mechanism link 238 now connects the support platform 17a or robot arm with the second mechanism shaft 218 instead of third mechanism shaft 402 as in FIG. 25. The advantage with the arrangement in FIG. 26 is that the third mechanism shaft 402 will be closer to first mechanism shaft 203, reducing the inertia around first mechanism shaft 203 with respect to the tools connected to the output shaft. Moreover, the structure will be shorter since the second mechanism lever arm 239 does not point outwards from the arms 214+214b. The second mechanism bearing is here denoted 400. If the first gearing bearing 237 is mounted to be above the first mechanism shaft 203, the second mechanism bearing 400 is mounted to be below the second mechanism shaft 218. The opposite relationship is of course also valid.

Figure 27:
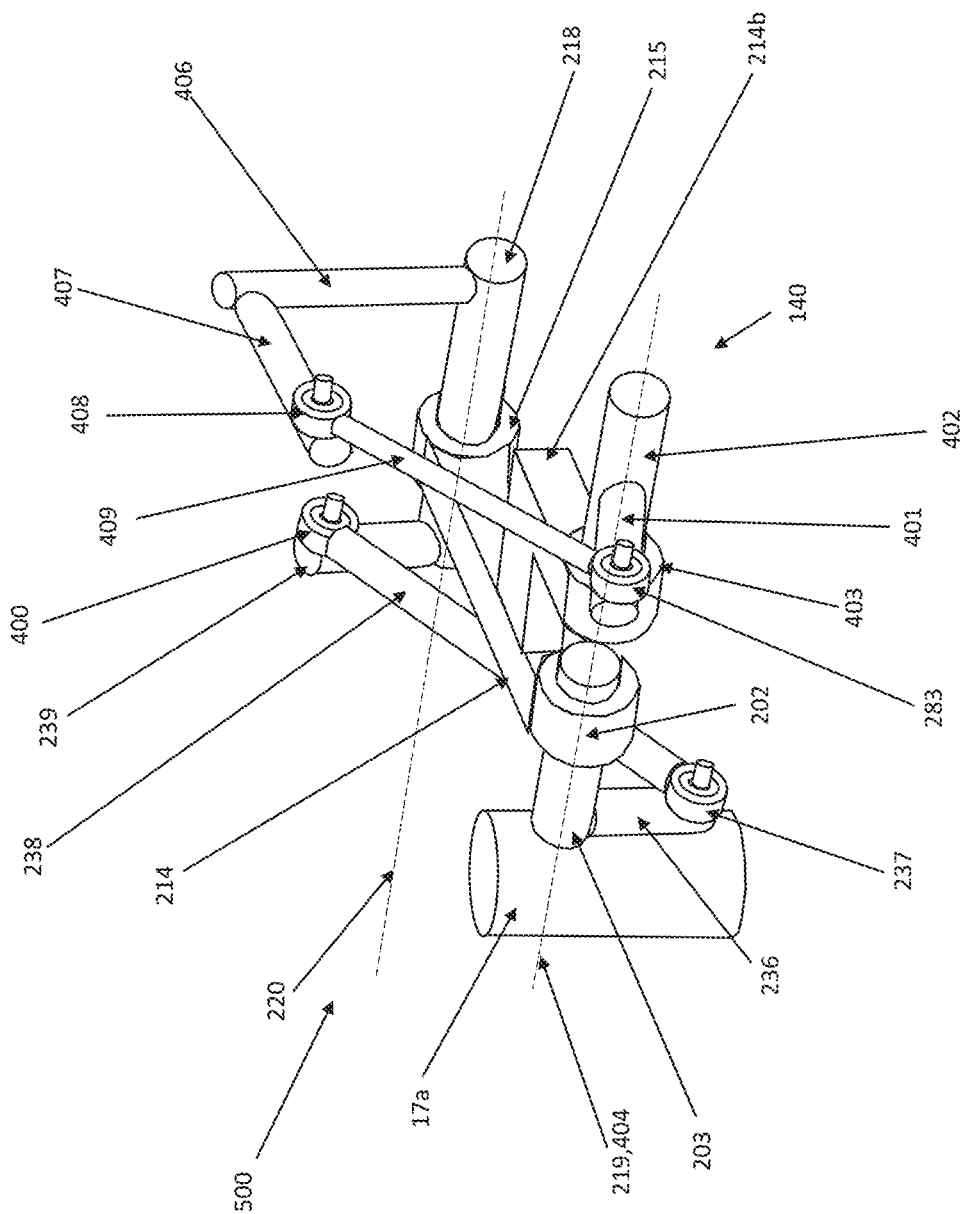
FIG. 27 illustrates a tool base according to a fifteenth embodiment.

FIG. 27 illustrates a tool base according to a fifteenth embodiment. The embodiment in FIG. 27 illustrates that it is possible to reduce the length of the mechanical structure and the inertia with respect to the tool further by the arrangement in FIG. 27, in which the axes of rotation 219 and 404 coincide. In comparison with FIG. 26, the second support arm 214b has been removed and the second mechanism shaft 218 has been moved to the place where the third mechanism shaft 402 is situated in FIG. 26. Thus, the second mechanism shaft 218 is mounted on the first support arm 214 via the second mechanism bearing 215 and is rotated by means of the first mechanism link 238 when the first support arm 214 is rotated around the fixed first mechanism shaft 203. When the second mechanism shaft 218 rotates, the link 409 will rotate the output third mechanism shaft 402 in the same way as in FIG. 26. The third mechanism shaft 402 rotates in the third mechanism bearing 403 with its rotation center being the third axis of rotation 404, which coincides with the proximal axis of rotation 219 of the first mechanism bearing 202. The third mechanism bearing 403 is mounted on the first support arm 214 with a second support arm 214b, here a mechanical interface, arranged to the first support arm 214. If the first gearing bearing 237 is mounted to be below the first mechanism shaft 203, the second gearing bearing 400 is mounted to be above the second mechanism shaft 218. The opposite relationship is of course also valid. More in detail, the gearing mechanism 500 in FIG. 27 includes a third mechanism shaft 402 defining another distal axis of rotation 404, and a third mechanism bearing 403. The third mechanism shaft 402 is connected via the third mechanism bearing 403 to the first support arm 214. The first support arm 214 is supplemented with a second support arm 214b. The third mechanism bearing 403 is mounted on the first support arm 214 and the second mechanism bearing 215 is mounted on the second support arm 214b. The second support arm 214b is mounted on the first support arm 214. The links 238, 406, 407, 409 connect the first support arm 214 via the third mechanism bearing 403 and the third mechanism shaft 402, with the second mechanism shaft 218. The first support arm 214 and the second support arm 214b are rigidly mounted to each other.

The amplification of the rotation of the arm relative to the first mechanism shaft 203 is the same for the structures in FIGS. 25-27. To further increase the amplification of the rotation, more linkages are needed.

Figure 28:
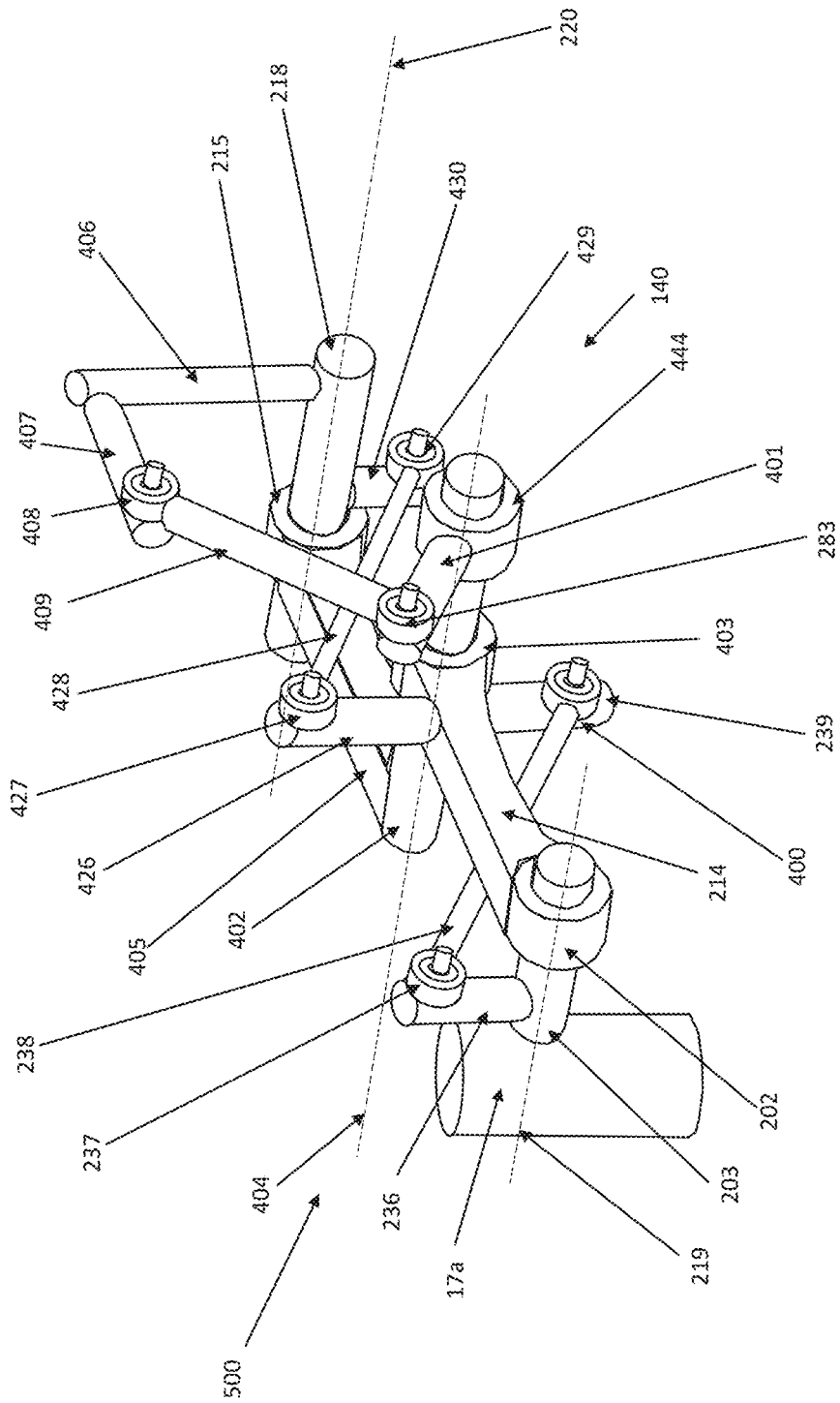
FIG. 28 illustrates a tool base according to a sixteenth embodiment.

FIG. 28 illustrates a tool base 140 according to a sixteenth embodiment, where more linkages have been added. FIG. 28 illustrates an embodiment, where about +/50 degrees have been added by splitting up the common support arm 214+214*b* in FIG. 26 into two arms, where a second support arm 405 is connected to the first support arm 214 via the third mechanism bearing 403 and the third mechanism shaft 402. The second support arm 405 is rotated by means of the second mechanism lever arm 239, connected to the fixed first gearing bearing 237 via the first mechanism link 238 and the first gearing bearing 237. The second mechanism shaft 218 mounted on the second support arm 405 via the second mechanism bearing 215 is rotated by means of a second lever arm 430, connected to a beam 426 via a second mechanism link 428 with a bearing 427, 429 (a third gearing bearing 427 and a fourth bearing gearing 429) at each end. The beam 426 is mounted directly on the first support arm 214. The lever arm with the beam 406 is mounted on the second mechanism shaft 218 and is part of the same link structure 406, 407, 408, 409, 283, 401 as shown in FIG. 26. The lever arm 401 rotates a bearing 444 around the third mechanism shaft 402. The tool base shaft 19 and the tool platform 17*b* shall in this case be connected to the bearing 444 but are not disclosed for ease of illustration. If the first support arm 214 is rotated for example clockwise around the fixed first mechanism shaft 203, the third mechanism shaft 402 will also rotate clockwise and both arms 214 and 405 will move downwards. When second support arm 405 moves downwards relative first support arm 214, the second mechanism link 428 will rotate the second mechanism shaft 218 clockwise and the link 409 will rotate the bearing 444 clockwise. If the first gearing bearing 237 is mounted to be above the first mechanism shaft 203, the second gearing bearing 240 is mounted to be below the second mechanism shaft 218. If the third gearing bearing 427 is mounted to be above the third mechanism shaft 402, the fourth gearing bearing 429 is mounted to be below the second mechanism shaft 218. The opposite relationship is of course also valid. In other words, the gearing mechanism 500 in FIG. 28 includes the third mechanism shaft 402 defining another distal axis of rotation 404 and a third mechanism bearing 403. The third mechanism shaft 402 is connected via the third mechanism bearing 403 to the first support arm 214. The first support arm 214 is supplemented with a second support arm 405. The third mechanism bearing 403 is mounted on the first support arm 214 and the second mechanism bearing 215 is mounted on the second support arm 405. The second support arm 405 is mounted on the third mechanism shaft 402. The links 238, 428 connect the first support arm 214 directly with the second mechanism shaft 218. The second support arm 405 is here movable (rotational movement) in relation to the first support arm 214.

Figure 29:
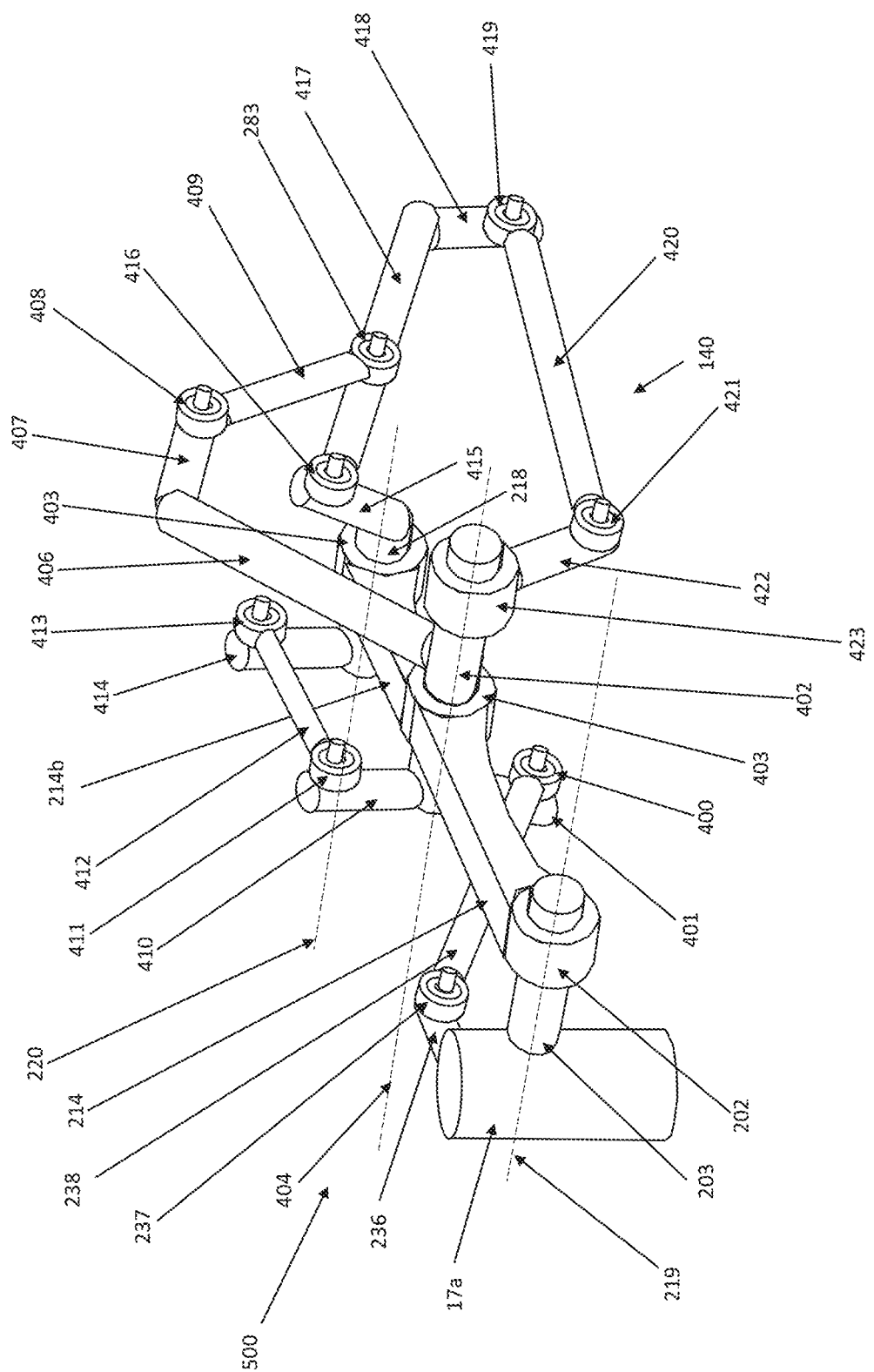
FIG. 29 illustrates a tool base according to a seventeenth embodiment.

FIG. 29 illustrates a tool base 140 according to a seventeenth embodiment. FIG. 29 illustrates a further way to increase the rotation amplification by introducing more links. To explain FIG. 29, it is an advantage to have in mind that the structure is a further development of the gearing mechanism 500 in FIG. 25. Between third mechanism shaft 402 and second mechanism shaft 218 a link transmission has been introduced with a fifth mechanism lever arm 410 and a sixth mechanism lever arm 414 and a link 412 with a fifth mechanism bearing 411 and a sixth mechanism bearing 413. The fifth mechanism lever arm 410 is mounted on the third mechanism shaft 402 and the sixth mechanism lever arm 414 is mounted on the second mechanism shaft 218. The link transmission will make the second mechanism shaft 218 rotate in the same direction as the third mechanism shaft 402. As in FIG. 25 a lever arm with the two beams 406+407 is mounted on the third mechanism shaft 402 and this lever arm is connected to a seventh mechanism lever arm 417 via the first link bearing 408, the link 409 and the bearing 283. The seventh mechanism lever arm 417 rotates around a fourth link bearing 416, which is mounted on an eighth mechanism lever arm 415, which in turn is mounted on the second mechanism shaft 218. The output of the structure is an output bearing 423, which is rotated by a ninth mechanism lever arm 422, connected to the seventh mechanism lever arm 417 via a second link bearing 421, a link 420, a third link bearing 419 and a tenth mechanism lever arm 418. Now, assume that the support arms 214+214*b* rotate clockwise around the fixed first mechanism shaft 203. Then the arms 214+214*b* will move downwards, both the third mechanism shaft 402 and the second mechanism shaft 218 will rotate clockwise, the lever arm with the beams 406+407 will rotate clockwise, and, because of the link 409, the seventh mechanism lever arm 417 will rotate clockwise around the fourth link bearing 416. Rotating the seventh mechanism lever arm 417 clockwise will, via the link 420, make the output bearing 423 rotate clockwise. Thus, the rotation of the output bearing 423 will be the sum of the rotations of arms 214+214*b*, the third mechanism shaft 402 with magnification, the second mechanism shaft 218 because of the eighth mechanism lever arm 415 and the seventh mechanism lever arm 417 with magnification.

Of course, the structures shown in FIGS. 25-29 can be combined in different ways to obtain a structure that fits the application. Even though there are several applications for mechanical rotation amplification as in excavators or steering mechanisms, the main target for these structures is found in robotics. Besides the use in the parallel kinematic machine depicted in FIGS. 1-4, the tool bases can as well be used for other parallel kinematic machines, hybrid kinematic robots, serial kinematic robots or even CNC and CMM manipulators.

Figure 30:
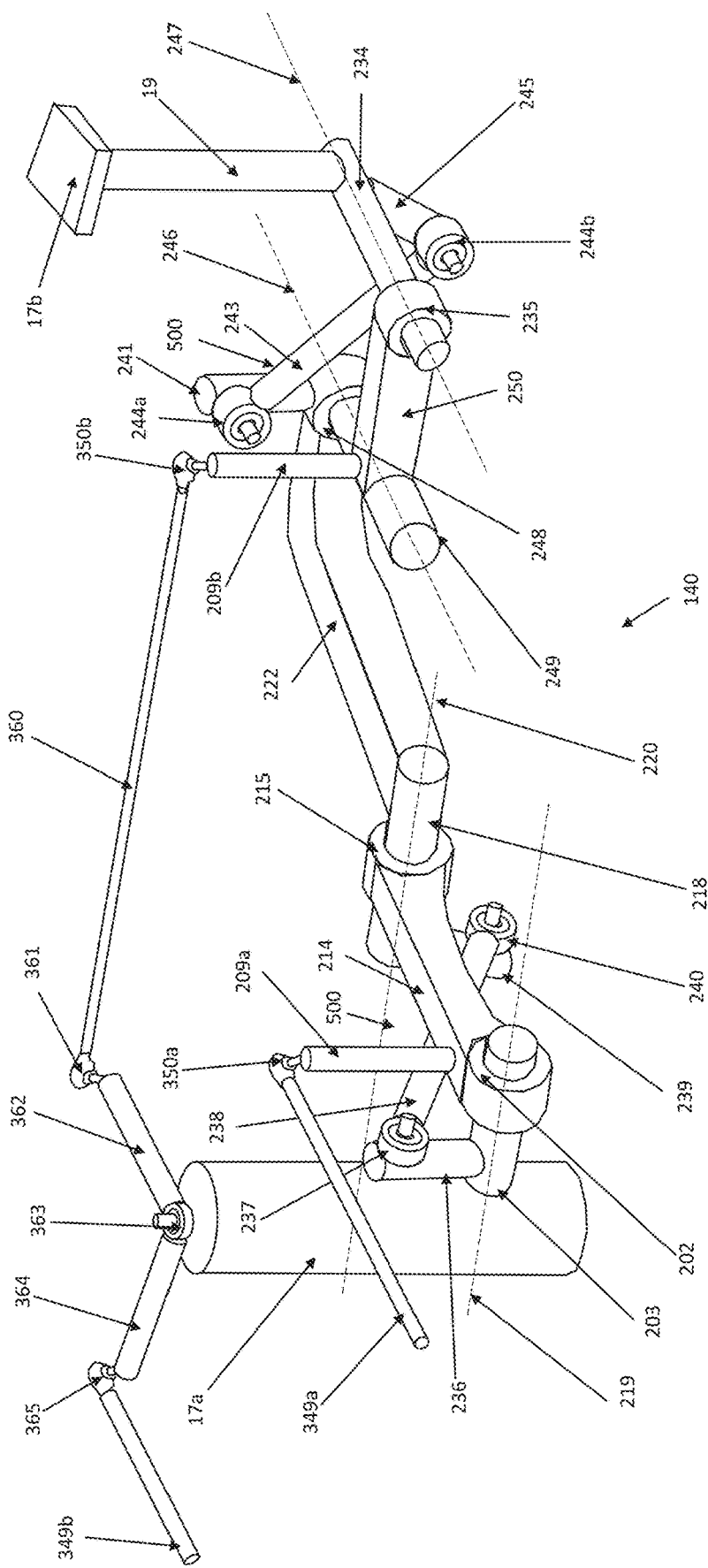
FIG. 30 illustrates a tool base according to an eighteenth embodiment.

FIG. 30 illustrates a tool base according to an eighteenth embodiment. In more detail, FIG. 30 illustrates how a two degrees of freedom mechanism as shown in FIGS. 21 and 22 can be connected to tool links as illustrated in previous figures. The common control lever shaft 209 for controlling two degrees of freedom in FIGS. 21 and 22 has here been replaced by two separate lever shafts, thus a first control lever shaft 209*a* and a second control lever shaft 209*b*, one for each degree of freedom. The first control lever shaft 209*a* is connected to a first control link 349*a* via a third connecting joint 350*a*. The first control link 349*a* is connected to the robot main structure. The second control lever shaft 209*b* is connected to a second control link 360, which has about 90 degrees different direction than the first control link 349*a* in order to be able to rotate the first control lever shafts 209 and the second control lever shaft 249 around the other proximal axis of rotation 246 of the other first mechanism bearing 248. The tenth bracket beam 222 is bent in such a way that the center axis of the second mechanism bearing 215, thus distal axis of rotation 220, is at a right angle to the center axis 346 of the other first mechanism bearing 248. To connect the second control link 360 via a link system to an actuator (not shown), a 90 degrees connection 362-364 is mounted on the support platform 17*a*. Thus, the second control link 360 is connected to a twelfth mechanism lever arm 362 via a fourth connecting joint 361 and the rotation of the twelfth mechanism lever arm 362 is connected to a thirteenth mechanism lever arm 364 at a right angel. The lever arms 362 and 364 are mounted on a control bearing 363, which is mounted on the support platform 17a. The thirteenth mechanism lever arm 364 is connected to a third control link 349b via a fifth connecting joint 365. In order to control the third control link 349b a second link system to a second actuator (not shown) may be included.

Generally, FIGS. 21-30 disclose different embodiments of a tool base 140 for increasing orientation range of a tool base shaft 19 by means of a gearing mechanism 500 comprising links. These embodiments of the tool base 140 may be arranged to different kinds of manipulators or robots, such as the PKM as explained herein, or to another kind of serial or parallel kinematic machine. A basic gearing mechanism 500 is illustrated in FIG. 24. Thus, also the tool bases 140 in FIGS. 21-23 includes the mechanism 500, or variants of the mechanism 500. These tool bases 140 comprises the tool base shaft 19, a tool platform 17b and the tool base shaft 19 being rigidly connected, and the gearing mechanism 500. The gearing mechanism 500 comprises a first support arm 214; 264. The gearing mechanism 500 further comprises a first mechanism bearing 202, 262a, 262b and a second mechanism bearing 215, 275, 403 connected by the first support arm 214; 264. The gearing mechanism 500 further comprises a first mechanism shaft 203; 265 defining a proximal axis of rotation 219; 276b. The first mechanism bearing 202, 262a, 262b is mounted to the first mechanism shaft 203; 265. The first mechanism shaft 203; 265 is rigidly connected to the support platform 17a. The gearing mechanism 500 further comprises a second mechanism shaft 218, 402, 274 defining a distal axis of rotation 220, 401, 404, 276a. The second mechanism bearing 215, 275, 403 is mounted to the second mechanism shaft 218, 402, 274. The gearing mechanism 500 further comprises a gearing linkage connecting the first mechanism shaft 203; 265 to the second mechanism shaft 218, 402, 274. The gearing linkage comprises a first gearing joint 237, 278, a second gearing joint 240, 280, and a mechanism link 238, 279. The mechanism link 238, 279 is connected to the support platform 17a via the first gearing joint 237, 278 and connected to the second mechanism shaft 218, 402, 234 via the second gearing joint 240, 280. The first gearing joint 237, 278 and the second gearing joint 240, 280 are arranged at different sides of a plane defined by the proximal axis of rotation 219, 276b and the distal axis of rotation 220, 276a. The gearing mechanism 500 is arranged to transfer rotation of the first support arm 214; 264 around the proximal axis of rotation 219, 276b to a correspondingly increased rotational movement around the distal axis of rotation 220, 276a, 401, 404, 247 in a same direction as the first support arm 214, 264, of the tool base shaft 19.

More in detail, the gearing mechanism 500 in FIGS. 21-22 and 24-30 comprises a first support arm 214, a first mechanism bearing 202 and a second mechanism bearing 215 connected by the first support arm 214. The gearing mechanism 500 further comprises a first mechanism shaft 203 defining a proximal axis of rotation 219. The first mechanism bearing 202 is mounted to the first mechanism shaft 203. The first mechanism shaft 203 is arranged to be rigidly connected to a support platform 17a. The gearing mechanism 500 further comprises a second mechanism shaft 218, 402 defining a distal axis of rotation 220, 404. The second mechanism bearing 215, 403 is mounted to the second mechanism shaft 218, 402. The gearing mechanism 500 further comprises a gearing linkage connecting the first mechanism shaft 203 to the second mechanism shaft 218, 402. The gearing linkage comprises: a first gearing bearing 237, a second gearing bearing 240, and a first mechanism link 238. The first mechanism link 238 is arranged to be connected to a support platform 17a via the first gearing bearing 237 and connected to the second mechanism shaft 218, 402, 234 via the second gearing bearing 240. The first gearing bearing 237 and the second gearing bearing 240 are arranged at different sides of a plane defined by the proximal axis of rotation 219 and the distal axis of rotation 220. The gearing mechanism 500 is thus arranged to transfer rotation of the first support arm 214 around the proximal axis of rotation 219 to a correspondingly increased rotational movement around the distal axis of rotation 220, 404, 247, of the tool base shaft 19 is connected to the second mechanism shaft 218, 402, 234. The correspondingly increased rotational movement around the distal axis of rotation 220, 404 has the same rotational direction as the rotation of the first support arm 214. The gearing mechanism 500 in FIG. 23a has previously been explained in connection with this figure.

The gearing mechanism 500 is especially useful as a component in a robot wrist. More in detail, the first mechanism bearing 202 is mounted on the first mechanism shaft 203. The first mechanism shaft 203 is arranged to be rigidly connected to the support platform 17a. The second mechanism bearing 215, 403 is mounted on the second mechanism shaft 218, 402. The second mechanism shaft 218, 402 is arranged to be connected to the support platform 17a via a mechanism transmission. The mechanism transmission comprises a first mechanism lever arm 236 arranged to be mounted to the first platform 17a, a second mechanism lever arm 239 mounted on the second mechanism shaft 218, 402, a transmission link 238 mounted in one end with a first gearing bearing 237 on the first mechanism lever arm 236 of the platform 17a, and in the other end with a second gearing bearing 240 on the second mechanism lever arm 239. The first gearing bearing 237 and second gearing bearing 240 are mounted to be at different sides of the first support arm 214 to make the second mechanism shaft 218, 402 rotate in the same direction as the first support arm 214.

In some embodiments, the tool base 140 comprises a control lever 209 for controlling motion of the tool base shaft 19, wherein the control lever 209 is mounted directly or via a bearing to the first support arm 214, 264.

In some embodiments, the gearing linkage comprises a second mechanism link 428 connected in series with the first mechanism link 238. The second mechanism link 428 is arranged to further increase the rotational movement around the distal axis of rotation 220, 404, of the tool base shaft 19 connected to the second mechanism shaft 218, 402. The gearing linkage further comprises a third mechanism bearing 427 and a fourth mechanism bearing 429. The second mechanism link 428 is pivotally connected to the first support arm 214 via the third mechanism bearing 427 and pivotally connected to the second mechanism shaft 218 via the fourth mechanism bearing 429. The third mechanism bearing 427 and the fourth mechanism bearing 429 are arranged at different sides of a plane defined by the proximal axis of rotation 219 and the distal axis of rotation 220. In more detail, the second support arm 405 is mounted on the second mechanism shaft 218. At least one second mechanism link 428 includes the third mechanism bearing 427 in one end and a fourth mechanism bearing 429 in its other end. The fourth mechanism bearing 429 is mounted on a second lever arm 430, which is mounted on the third mechanism shaft 402. The third mechanism bearing 427 is mounted on an extension 426 of the first support arm 214. The third mechanism bearing 427 and fourth mechanism bearing 429 are mounted to be at different sides of the second support arm 405 to make the third mechanism shaft 402 rotate in the same direction as the first support arm 214.

In some embodiments, the gearing mechanism 500 comprises a third mechanism shaft 402 defining another distal axis of rotation, thus a third axis of rotation 404, and a third mechanism bearing 403, wherein the third mechanism shaft 402 is connected via the third mechanism bearing 403 to the first support arm 214, 264. Thus, in some embodiments, the gearing mechanism 500 comprises a third mechanism bearing 403 and a third mechanism shaft 402, where the third mechanism shaft 402 is mounted in the third mechanism bearing 403. The first support arm 214, 264 is here supplemented with a second support arm 405. The third mechanism bearing 403 is mounted on the first support arm 214, 264 and the second mechanism bearing 215 then is mounted on the second support arm 405. The second support arm 405 is mounted on either the first support arm 214, 264 or on the second mechanism shaft 218. At least one link 409, 238, 412, 428 connects the first support arm 214, 264 directly or via the second mechanism bearing 215 and the second mechanism shaft 218 with the third mechanism shaft 402. Thus, in other words, the gearing mechanism 500 includes a third mechanism shaft 402 defining another distal axis of rotation 404 and a third mechanism bearing 403. The third mechanism shaft 402 is connected via the third mechanism bearing 403 to the first support arm 214; 264. The first support arm 214; 264 is further supplemented with a second support arm 214b, 405. The third mechanism bearing 403 is mounted on the first support arm 214; 264 and the second mechanism bearing 215 is mounted on the second support arm 214b, 405. The second support arm 214b, 405 is mounted on either the first support arm 214 or on the third mechanism shaft 402. The at least one link 409, 238, 412, 428 connects the first support arm 214, 264 directly, or via the third mechanism bearing 403 and the third mechanism shaft 402, with the second mechanism shaft 218.

In some embodiments, the gearing linkage comprises a backhoe mechanism 406, 407, 408, 409, 283, 400 arranged in series with the first mechanism link 238. The backhoe mechanism is connected between the third mechanism bearing 403 and the second mechanism shaft 218 and is arranged to further increase the rotational movement around the distal axis of rotation 220, 404, of the tool base shaft 19 connected to the second mechanism shaft 218.

In some embodiments, the first support arm 214, 264 is supplemented with a second support arm 405 pivotally connected by means of the third mechanism shaft 402 and the third mechanism bearing 403.

In some embodiments, the distal axis of rotation 404 coincides with the proximal axis of rotation 219.

In some embodiments, the gearing mechanism 500 comprises another first support arm 250, another first mechanism bearing 248 and another second mechanism bearing 235 connected by the other first support arm 250. The other first mechanism bearing 248 is rigidly connected to the second mechanism shaft 218. The gearing mechanism 500 further comprises another first mechanism shaft 249 defining another proximal axis of rotation 246, the other first mechanism bearing 248 is mounted to the other first mechanism shaft 249. The gearing mechanism 500 further comprises another second mechanism shaft 234 defining another distal axis of rotation 247. The other second mechanism bearing 235 is mounted to the other second mechanism shaft 218, 402 and arranged in the other first support arm 250. The gearing mechanism 500 further comprises another gearing linkage connecting the other first mechanism shaft 249 to the other second mechanism shaft 234. The other gearing linkage comprises another first mechanism bearing 244a, another second mechanism bearing 244b and another first mechanism link 243. The other proximal axis of rotation 246 and the other distal axis of rotation 247 are perpendicular to the proximal axis of rotation 219 and the distal axis of rotation 220, 404. The gearing mechanism 500 is arranged to transfer rotation of the other first support arm 250 around the other proximal axis of rotation 246 to a correspondingly increased rotational movement around the other distal axis of rotation 247, of the tool base shaft 19 connected to the other second mechanism shaft 234.

In some embodiments, the second support arm 214b is mounted directly on the first support arm 214, 264. For example, in FIG. 29 the link 412 has a fifth mechanism bearing 411 in one end and a sixth mechanism bearing 413 in its other end. The sixth mechanism bearing 413 is mounted on a sixth mechanism lever arm 414, which is mounted on the third mechanism shaft 402. The fifth mechanism bearing 411 is mounted on a fifth mechanism lever arm 410, which is mounted on the second mechanism shaft 218. The fifth mechanism bearing 411 and the fourth mechanism bearing 413 are mounted to be on the same side of the second support arm 214b to make the third mechanism shaft 402 rotate in the same direction as the first support arm 214, 264.

In some embodiments, the gearing mechanism 500 comprises a backhoe mechanism mounted between the second mechanism shaft 218 and the third mechanism shaft 402.

In some embodiments, the gearing mechanism 500 for rotational amplification comprises two mechanisms for rotational amplification connected in series.

In some embodiments, the axes of rotation 219, 220 of one of the mechanisms are perpendicular to one of the axes of rotation 246, 247 of the other mechanism.

In some embodiments, the gearing mechanism 500 for rotational amplification comprises a tool platform 17b mounted on the third mechanism shaft 402 directly or via a bearing 423.

The disclosure also relates to a manipulator comprising a tool base 140 as described herein, wherein the tool base 140 is arranged to increase orientation range of a tool arranged to the tool platform 17b. The manipulator may be a PKM as described herein, or another kind of parallel or serial manipulator/robot.

The disclosure also relates to a method for controlling movement of a parallel kinematic machine, PKM. The PKM may be any one of the embodiments as described herein. Generally, the PKM comprises a support platform 17a, a first support linkage SL1 arranged to transfer a first movement to the support platform 17a, a second support linkage SL2 arranged to transfer a second movement to the support platform 17a, and a third support linkage SL3 arranged to transfer a third movement to the support platform 17a. The first support linkage SL1, the second support linkage SL2 and the third support linkage SL3 together comprise at least five support links 8, 9, 10, 11, 12, 13. The PKM also comprises a tool base 140 comprising a shaft joint 24, a tool base shaft 19 and a tool platform 17b. The tool base shaft 19 is connected to the support platform 17a via the shaft joint 24, and to the tool platform 17b.

Figure 17:
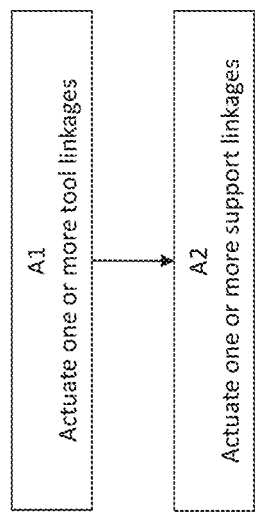
FIG. 17 illustrates a flowchart of a method according to some embodiments of the disclosure.

The method will now be described with reference to the flowchart in FIG. 17. The method comprises actuating A1 one or more tool linkages TL1, TL2, TL3 to transfer a respective movement of the one or more tool linkages TL1, TL2, TL3 to the tool base shaft 19 causing the tool base shaft 19 to rotate around at least one axis relative the support platform 17. The one or more tool linkages TL1, TL2, TL3 each comprises a tool link 26, 31; 29, 32; 38 connected at one end via a tool base joint 25, 28, 37 to the tool base 140 and at the other end connected via a tool carriage joint 27, 30, 39 to a carriage arranged for movement along a path. The actuating is typically performed automatically by means of actuating equipment and a control unit, as previously explained.

According to some embodiments, the actuating A1 comprising actuating two or more tool linkages TL1, TL2, TL3 causing the tool base shaft 19 to rotate around at least two non-parallel axes relative the support platform 17.

According to some embodiments, the method comprises actuating A2 one or more of the first support linkage SL1, the second support linkage SL2 and the third support linkage SL3, to transfer a respective first movement, second movement or third movement, to the support platform, causing the support platform to be positioned in a target position.

The present invention is not limited to the above-described preferred embodiments. Various alternatives, modifications and equivalents may be used. Therefore, the above embodiments should not be taken as limiting the scope of the invention, which is defined by the appending claims.

What is claimed is:

1. A parallel kinematic machine (PKM), comprising:
   a support platform;
   a first support linkage, comprising one or more first support links, each of the first support links connected at a first end to the support platform via a first support joint, and at a second end connected to a first carriage via a first carriage joint, wherein the first carriage is movable along a first path, and wherein the first support linkage is arranged to transfer a first movement to the support platform;
   a second support linkage, comprising one or more second support links, each of the second support links connected at a first end to the support platform via a second support joint, and at a second end connected to a second carriage via a second carriage joint, wherein the second carriage is movable along a second path, and wherein the second support linkage is arranged to transfer a second movement to the support platform;
   a third support linkage comprising, one or more third support links, each of the third support links connected at a first end to the support platform via a third support joint, and at a second end connected to a third carriage via a third carriage joint;
   wherein the third carriage is movable along a third path, and the third support linkage is arranged to transfer a third movement to the support platform; and wherein the first support linkage, the second support linkage, and the third support linkage together comprise at least five support links;
   wherein the PKM further comprises:
      a tool base, comprising a shaft joint and a tool platform, wherein the tool platform is connected to the support platform via the shaft joint; and
      one or more tool linkages, each of the tool linkages comprising a tool link connected at a first end, via a tool base joint, to the tool base, and at a second end connected, via a tool carriage joint, to a carriage arranged for movement along a path, wherein at least one of the one or more tool linkages is configured to have a controllable, variable length;
      wherein each of the tool linkages is configured to rotate the tool platform around at least one axis relative to the support platform, by transferring a movement of the respective tool linkage to the tool base platform.

2. The PKM according to claim 1, wherein the at least one of the one or more tool linkages comprises a tool link being a telescopic link.

3. The PKM according to claim 2, wherein the telescopic link comprises an outer section and an inner section, wherein the inner section is arranged to move inside the outer section, and wherein the telescopic link further comprises a movement mechanism arranged for facilitating movement of the inner section inside the outer section.

4. The PKM according to claim 3, wherein the movement mechanism comprises a spring mechanism to account for a varying distance between the outer section and inner section caused by manufacturing and/or assembly errors.

5. The PKM according to claim 4, wherein the movement mechanism further comprises a structure connected to the inner section and a linear motion guideway block connected to the outer section, wherein the structure and the linear motion guideway block together form a motion pair of a prismatic joint of the telescopic link.

6. The PKM according to claim 5, wherein the movement mechanism further comprises one or more linear motion guideways comprising one or more linear rails of the structure.

7. The PKM according to claim 4, wherein the spring mechanism further comprises springs accommodated in throughgoing cutouts of the linear motion guideway block.

8. The PKM according to claim 4, wherein the spring mechanism comprises several springs arranged in the respective groove between the shaft of each roller and the tube-shaped holder element, whereby the rollers become preloaded with springs.

9. The PKM according to claim 3, wherein the movement mechanism further comprises one or more roller mechanisms comprising a tube-shaped holder element including one or more rollers, wherein each roller is positioned on a respective shaft and is accommodated in a respective groove in the outer surface of the tube-shaped holder element.

10. The PKM according to claim 9, wherein each of the one or more roller mechanisms comprises a revolute joint.

11. The PKM according to claim 3, wherein the outer section and the inner section are made of carbon fiber.

12. The PKM according to claim 11, wherein the one or more tool linkages further comprises a second tool linkage that, in turn, comprises a second tool link connected via a second tool carriage joint to a carriage arranged for movement along a path different from the path of the first tool carriage joint;
   wherein the second tool linkage is configured to rotate the tool platform around a second axis relative the support platform, the second axis being non-parallel with the first axis, by additionally transferring a movement of the second tool linkage to the tool platform.

13. The PKM according to claim 1, wherein the one or more tool linkages comprises a first tool linkage that, in turn, comprises a first tool link connected via a first tool carriage joint to one of the first, second and third carriages, wherein the first tool linkage is configured to rotate the tool platform around a first axis relative the support platform, by transferring a movement of the first tool linkage to the tool platform.

14. The PKM according to claim 1, wherein the one or more tool linkages comprises a first tool linkage comprising a first tool link connected via a first tool carriage joint to a fourth carriage.

15. The PKM according to claim 13, wherein the first tool linkage is connected, via the first tool carriage joint, to one of the first carriage and the fourth carriage being movable along the first path, and wherein the second tool linkage is connected, via the second tool carriage joint, to one of the third carriage and a fifth carriage being movable along the third path, and where the second path is arranged between the first path and the third path.

16. The PKM according to claim 1, wherein each tool linkage includes only one tool link, and wherein each tool link is mounted on a different carriage.

17. The PKM according to claim 1, wherein the shaft joint comprises a cardan joint.

18. The PKM according to claim 1, wherein the one or more tool linkages comprises a third tool linkage that comprises a third tool link, wherein the third tool linkage is configured to rotate the tool platform around a third axis that is non-parallel with the first and second axes, by additionally transferring a movement of the third tool linkage to the tool platform.

19. The PKM according to claim 1, wherein the tool link of at least one tool linkage is connected, via the tool carriage joint, to a carriage arranged for movement along a different one of the first path, the second path, and the third path.

20. The PKM according to claim 1, further comprising a control unit configured to control rotation of the tool base shaft by controlling movement of the one or more tool linkages.

\* \* \* \* \*